US012569988B2

(12) United States Patent
Pivac

(10) Patent No.: US 12,569,988 B2
(45) Date of Patent: Mar. 10, 2026

(54) COMMUNICATION SYSTEM FOR AN INTERACTION SYSTEM

(71) Applicant: FASTBRICK IP PTY LTD, High Wycombe (AU)

(72) Inventor: Mark Joseph Pivac, Lesmurdie (AU)

(73) Assignee: FASTBRICK IP PTY LTD, High Wycombe (AU)

( * ) Notice: Subject to any disclaimer, the term of this patent is extended or adjusted under 35 U.S.C. 154(b) by 0 days.

(21) Appl. No.: 18/612,270

(22) Filed: Mar. 21, 2024

(65) Prior Publication Data

US 2025/0050499 A1     Feb. 13, 2025

Related U.S. Application Data

(63) Continuation of application No. 16/639,485, filed as application No. PCT/AU2018/050868 on Aug. 16, 2018, now Pat. No. 11,958,193.

(30) Foreign Application Priority Data

Aug. 17, 2017    (AU) ................................ 2017903312

(51) Int. Cl.
*B25J 9/16*          (2006.01)
*B25J 5/00*          (2006.01)
(Continued)

(52) U.S. Cl.
CPC ................. *B25J 9/162* (2013.01); *B25J 5/00* (2013.01); *B25J 9/1664* (2013.01); *B25J 9/1694* (2013.01);
(Continued)

(58) Field of Classification Search
CPC ........ B25J 13/08; B25J 19/0025; B25J 9/162; B25J 9/1697; B25J 9/1664; B25J 9/1694;
(Continued)

(56) References Cited

U.S. PATENT DOCUMENTS 1,633,192 A    6/1927  Reagan
1,829,435 A   10/1931  Barnhart
(Continued)

FOREIGN PATENT DOCUMENTS

AU          645640 B2   1/1994
CH          673498 A    3/1990
(Continued)

OTHER PUBLICATIONS

"Critical Damping Ratio Explained." EngineerExcel. 2022. 16 pages.

(Continued)

*Primary Examiner* — Stephen Holwerda
(74) *Attorney, Agent, or Firm* — Perkins Coie LLP

(57) ABSTRACT

A system for performing interactions within a physical environment, the system including: a robot having a robot base that undergoes movement relative to the environment and a robot arm mounted to the robot base, the robot arm including an end effector mounted thereon; a communications system including a fieldbus network; a tracking system including a tracking base positioned in the environment and connected to the fieldbus network, and a tracking target mounted to a component of the robot, wherein the tracking base is configured to detect the tracking target to allow a position and/or orientation of the tracking target relative to the tracking base to be determined; and a control system that communicates with the tracking system via the fieldbus network to determine the relative position and/or orientation of the tracking target and controls the robot arm in accordance with the relative position and/or orientation of the tracking target.

19 Claims, 18 Drawing Sheets

(51) Int. Cl.

| | |
|---|---|
| *B25J 13/08* | (2006.01) |
| *B25J 19/00* | (2006.01) |
| *E04G 21/16* | (2006.01) |
| *G01S 17/42* | (2006.01) |
| *G01S 17/66* | (2006.01) |
| *G05B 19/4155* | (2006.01) |

(52) U.S. Cl.
CPC ............. *B25J 9/1697* (2013.01); *B25J 13/08* (2013.01); *B25J 13/089* (2013.01); *B25J 19/0025* (2013.01); *E04G 21/16* (2013.01); *G01S 17/42* (2013.01); *G01S 17/66* (2013.01); *G05B 19/4155* (2013.01); *G05B 2219/33099* (2013.01); *G05B 2219/39172* (2013.01); *G05B 2219/39215* (2013.01); *G05B 2219/39222* (2013.01); *G05B 2219/45086* (2013.01)

(58) Field of Classification Search
CPC . B25J 5/00; B25J 13/089; G01S 17/66; G01S 17/42; G01S 17/88; E04G 21/22; E04G 21/16; G05B 19/4155; G05B 2219/33099; G05B 2219/39222; G05B 2219/40562; G05B 2219/40623; G05B 2219/39215; G05B 2219/45086; G05B 2219/40298; G05B 2219/39172; G05B 2219/31145; Y02P 90/02
See application file for complete search history.

(56) References Cited

U.S. PATENT DOCUMENTS

| | | | |
|---|---|---|---|
| 3,438,171 | A | 4/1969 | Demarest |
| 3,757,484 | A | 9/1973 | Williamson et al. |
| 3,790,428 | A | 2/1974 | Lingl |
| RE28,305 | E | 1/1975 | Williamson et al. |
| 3,930,929 | A | 1/1976 | Lingl |
| 3,950,914 | A | 4/1976 | Lowen |
| 4,033,463 | A | 7/1977 | Cervin |
| 4,106,259 | A | 8/1978 | Taylor-smith |
| 4,221,258 | A | 9/1980 | Richard |
| 4,245,451 | A | 1/1981 | Taylor-smith |
| 4,303,363 | A | 12/1981 | Cervin |
| 4,523,100 | A | 6/1985 | Payne |
| 4,708,562 | A | 11/1987 | Melan et al. |
| 4,714,339 | A * | 12/1987 | Lau .......................... G01S 17/42 |
| | | | 356/139.08 |
| 4,758,036 | A | 7/1988 | Legille et al. |
| 4,765,789 | A | 8/1988 | Lonardi et al. |
| 4,790,651 | A | 12/1988 | Brown et al. |
| 4,827,689 | A | 5/1989 | Lonardi et al. |
| 4,852,237 | A | 8/1989 | Tradt et al. |
| 4,911,595 | A | 3/1990 | Kirchen et al. |
| 4,945,493 | A | 7/1990 | Huang et al. |
| 4,952,772 | A | 8/1990 | Zana |
| 4,954,762 | A | 9/1990 | Miyake et al. |
| 4,969,789 | A | 11/1990 | Searle |
| 5,004,844 | A | 4/1991 | Van Leeuwen et al. |
| 5,013,986 | A | 5/1991 | Gauggel |
| 5,018,923 | A | 5/1991 | Melan et al. |
| 5,049,797 | A | 9/1991 | Phillips |
| 5,080,415 | A | 1/1992 | Bjornson |
| 5,196,900 | A | 3/1993 | Pettersen |
| 5,284,000 | A | 2/1994 | Milne et al. |
| 5,321,353 | A | 6/1994 | Furness |
| 5,403,140 | A | 4/1995 | Carmichael et al. |
| 5,413,454 | A | 5/1995 | Movsesian |
| 5,419,669 | A | 5/1995 | Kremer et al. |
| 5,420,489 | A | 5/1995 | Hansen et al. |
| 5,469,531 | A * | 11/1995 | Faure ................... B25J 17/0216 |
| | | | 700/262 |
| 5,497,061 | A | 3/1996 | Nonaka et al. |
| 5,523,663 | A | 6/1996 | Tsuge et al. |
| 5,527,145 | A | 6/1996 | Duncan |

| | | | |
|---|---|---|---|
| 5,557,397 | A | 9/1996 | Hyde et al. |
| 5,737,500 | A | 4/1998 | Seraji et al. |
| 5,838,882 | A | 11/1998 | Gan et al. |
| 6,018,923 | A | 2/2000 | Wendt |
| 6,049,377 | A | 4/2000 | Lau et al. |
| 6,101,455 | A | 8/2000 | Davis |
| 6,134,507 | A | 10/2000 | Markey, Jr. et al. |
| 6,166,809 | A | 12/2000 | Pettersen et al. |
| 6,166,811 | A | 12/2000 | Long et al. |
| 6,172,754 | B1 | 1/2001 | Niebuhr |
| 6,213,309 | B1 | 4/2001 | Dadisho |
| 6,285,959 | B1 | 9/2001 | Greer |
| 6,310,644 | B1 | 10/2001 | Keightley |
| 6,330,503 | B1 | 12/2001 | Sharp et al. |
| 6,370,837 | B1 | 4/2002 | Mcmahon et al. |
| 6,427,122 | B1 | 7/2002 | Lin |
| 6,429,016 | B1 | 8/2002 | Mcneil |
| 6,512,993 | B2 | 1/2003 | Kacyra et al. |
| 6,516,272 | B2 | 2/2003 | Lin |
| 6,584,378 | B1 | 6/2003 | Anfindsen |
| 6,611,141 | B1 | 8/2003 | Schulz |
| 6,618,496 | B1 | 9/2003 | Tassakos et al. |
| 6,628,322 | B1 | 9/2003 | Cerruti |
| 6,643,002 | B2 | 11/2003 | Drake, Jr. |
| 6,664,529 | B2 | 12/2003 | Pack et al. |
| 6,681,145 | B1 | 1/2004 | Greenwood et al. |
| 6,683,694 | B2 | 1/2004 | Cornil |
| 6,704,619 | B1 | 3/2004 | Coleman et al. |
| 6,741,364 | B2 | 5/2004 | Lange et al. |
| 6,825,937 | B1 | 11/2004 | Gebauer et al. |
| 6,850,946 | B1 | 2/2005 | Rappaport et al. |
| 6,859,729 | B2 | 2/2005 | Breakfield et al. |
| 6,864,966 | B2 | 3/2005 | Giger |
| 6,868,847 | B2 | 3/2005 | Ainedter et al. |
| 6,873,880 | B2 | 3/2005 | Hooke et al. |
| 6,917,893 | B2 | 7/2005 | Dietsch et al. |
| 6,935,036 | B2 | 8/2005 | Barber et al. |
| 6,957,496 | B2 | 10/2005 | Raab et al. |
| 6,965,843 | B2 | 11/2005 | Hobden et al. |
| 6,970,802 | B2 | 11/2005 | Ban et al. |
| 6,996,912 | B2 | 2/2006 | Raab et al. |
| 7,044,314 | B2 | 5/2006 | Nayfeh |
| 7,050,930 | B2 | 5/2006 | Hobden et al. |
| 7,051,450 | B2 | 5/2006 | Barber et al. |
| 7,069,664 | B2 | 7/2006 | Barber et al. |
| 7,107,144 | B2 | 9/2006 | Capozzi et al. |
| 7,111,437 | B2 | 9/2006 | Ainedter |
| 7,130,034 | B2 | 10/2006 | Barvosa-carter et al. |
| 7,142,981 | B2 | 11/2006 | Hablani |
| 7,145,647 | B2 | 12/2006 | Suphellen et al. |
| 7,153,454 | B2 | 12/2006 | Khoshnevis |
| 7,174,651 | B2 | 2/2007 | Barber et al. |
| 7,230,689 | B2 | 6/2007 | Lau |
| 7,246,030 | B2 | 7/2007 | Raab et al. |
| 7,269,910 | B2 | 9/2007 | Raab et al. |
| 7,305,094 | B2 | 12/2007 | Kashani |
| 7,347,311 | B2 | 3/2008 | Rudge |
| 7,519,493 | B2 | 4/2009 | Atwell et al. |
| 7,551,121 | B1 | 6/2009 | Oconnell et al. |
| 7,564,538 | B2 | 7/2009 | Sakimura et al. |
| 7,570,371 | B1 | 8/2009 | Storm |
| 7,576,836 | B2 | 8/2009 | Bridges |
| 7,576,847 | B2 | 8/2009 | Bridges |
| 7,591,078 | B2 | 9/2009 | Crampton |
| 7,639,347 | B2 | 12/2009 | Eaton |
| 7,693,325 | B2 | 4/2010 | Pulla et al. |
| 7,701,587 | B2 | 4/2010 | Shioda et al. |
| 7,774,159 | B2 | 8/2010 | Cheng et al. |
| 7,800,758 | B1 | 9/2010 | Bridges et al. |
| 7,804,602 | B2 | 9/2010 | Raab |
| RE42,055 | E | 1/2011 | Raab et al. |
| RE42,082 | E | 2/2011 | Raab et al. |
| 7,881,896 | B2 | 2/2011 | Atwell et al. |
| 7,967,549 | B2 | 6/2011 | Geist et al. |
| 7,993,289 | B2 | 8/2011 | Quistgaard et al. |
| 8,036,452 | B2 | 10/2011 | Pettersson et al. |
| 8,054,451 | B2 | 11/2011 | Karazi et al. |
| 8,060,344 | B2 | 11/2011 | Stathis |
| 8,145,446 | B2 | 3/2012 | Atwell et al. |

(56)  References Cited

U.S. PATENT DOCUMENTS

| | | | |
|---|---|---|---|
| 8,166,727 | B2 | 5/2012 | Pivac et al. |
| 8,169,604 | B2 | 5/2012 | Braghiroli et al. |
| 8,185,240 | B2 | 5/2012 | Williams et al. |
| 8,195,368 | B1 | 6/2012 | Leban et al. |
| 8,229,208 | B2 | 7/2012 | Pulla et al. |
| 8,233,153 | B2 | 7/2012 | Knuettel |
| 8,244,030 | B2 | 8/2012 | Pettersson et al. |
| 8,248,620 | B2 | 8/2012 | Wicks et al. |
| 8,269,984 | B2 | 9/2012 | Hinderling et al. |
| 8,287,522 | B2 | 10/2012 | Moses |
| 8,322,468 | B2 | 12/2012 | Nagasaka |
| 8,327,555 | B2 | 12/2012 | Champ |
| 8,337,407 | B2 | 12/2012 | Quistgaard et al. |
| 8,345,926 | B2 | 1/2013 | Clark et al. |
| 8,346,392 | B2 | 1/2013 | Walser et al. |
| 8,352,129 | B2 | 1/2013 | Yuan et al. |
| 8,401,698 | B2 | 3/2013 | Kamrani |
| 8,405,716 | B2 | 3/2013 | Yu et al. |
| 8,467,072 | B2 | 6/2013 | Cramer et al. |
| 8,467,888 | B2 | 6/2013 | Gahinet |
| 8,537,372 | B2 | 9/2013 | Siercks et al. |
| 8,537,376 | B2 | 9/2013 | Day et al. |
| 8,558,992 | B2 | 10/2013 | Steffey |
| 8,588,974 | B2 | 11/2013 | Aoba |
| 8,593,648 | B2 | 11/2013 | Cramer et al. |
| 8,595,948 | B2 | 12/2013 | Raab et al. |
| 8,606,399 | B2 | 12/2013 | Williams et al. |
| 8,634,950 | B2 | 1/2014 | Simonetti et al. |
| 8,644,964 | B2 | 2/2014 | Hendron et al. |
| 8,670,114 | B2 | 3/2014 | Bridges et al. |
| 8,677,643 | B2 | 3/2014 | Bridges et al. |
| 8,792,709 | B2 | 7/2014 | Pulla et al. |
| 8,803,055 | B2 | 8/2014 | Lau et al. |
| 8,812,155 | B2 | 8/2014 | Brethe |
| 8,825,208 | B1 | 9/2014 | Benson |
| 8,832,954 | B2 | 9/2014 | Atwell et al. |
| 8,848,203 | B2 | 9/2014 | Bridges et al. |
| 8,875,409 | B2 | 11/2014 | Kretschmer et al. |
| 8,898,919 | B2 | 12/2014 | Bridges et al. |
| 8,902,408 | B2 | 12/2014 | Bridges |
| 8,913,814 | B2 | 12/2014 | Gandyra |
| 8,931,182 | B2 | 1/2015 | Raab et al. |
| 8,942,940 | B2 | 1/2015 | York |
| 8,965,571 | B2 | 2/2015 | Peters et al. |
| 8,996,244 | B2 | 3/2015 | Summer et al. |
| 8,997,362 | B2 | 4/2015 | Briggs et al. |
| 9,020,240 | B2 | 4/2015 | Pettersson et al. |
| 9,033,998 | B1 | 5/2015 | Schaible et al. |
| RE45,565 | E | 6/2015 | Bridges et al. |
| 9,046,360 | B2 | 6/2015 | Atwell et al. |
| 9,074,381 | B1 | 7/2015 | Drew |
| 9,109,877 | B2 | 8/2015 | Thierman |
| 9,146,315 | B2 | 9/2015 | Bosse et al. |
| 9,151,830 | B2 | 10/2015 | Bridges |
| 9,163,922 | B2 | 10/2015 | Bridges et al. |
| 9,170,096 | B2 | 10/2015 | Fowler et al. |
| 9,188,430 | B2 | 11/2015 | Atwell et al. |
| 9,207,309 | B2 | 12/2015 | Bridges |
| 9,223,025 | B2 | 12/2015 | Debrunner et al. |
| 9,229,108 | B2 | 1/2016 | Debrunner et al. |
| 9,266,238 | B2 | 2/2016 | Huettenhofer |
| 9,267,784 | B2 | 2/2016 | Atwell et al. |
| 9,278,448 | B2 | 3/2016 | Freeman |
| 9,279,661 | B2 | 3/2016 | Tateno et al. |
| 9,303,988 | B2 | 4/2016 | Tani |
| 9,353,519 | B2 | 5/2016 | Williams |
| 9,354,051 | B2 | 5/2016 | Dunne et al. |
| 9,358,688 | B2 | 6/2016 | Drew |
| 9,367,741 | B2 | 6/2016 | Le Marec |
| 9,377,301 | B2 | 6/2016 | Neier et al. |
| 9,383,200 | B2 | 7/2016 | Hulm et al. |
| 9,395,174 | B2 | 7/2016 | Bridges |
| 9,405,293 | B2 | 8/2016 | Meuleau |
| 9,423,282 | B2 | 8/2016 | Moy |
| 9,437,005 | B2 | 9/2016 | Tateno et al. |
| 9,443,308 | B2 | 9/2016 | Pettersson et al. |
| 9,452,533 | B2 | 9/2016 | Calkins et al. |
| 9,454,818 | B2 | 9/2016 | Cramer |
| 9,476,695 | B2 | 10/2016 | Becker et al. |
| 9,482,524 | B2 | 11/2016 | Metzler et al. |
| 9,482,525 | B2 | 11/2016 | Bridges |
| 9,482,746 | B2 | 11/2016 | Bridges |
| 9,494,686 | B2 | 11/2016 | Maryfield et al. |
| 9,513,100 | B2 | 12/2016 | Raab et al. |
| 9,536,163 | B2 | 1/2017 | Veeser et al. |
| 9,541,371 | B2 | 1/2017 | Pettersson et al. |
| 9,561,019 | B2 | 2/2017 | Mihailescu et al. |
| 9,593,046 | B2 | 3/2017 | Bastelberger |
| 9,607,239 | B2 | 3/2017 | Bridges et al. |
| 9,618,620 | B2 | 4/2017 | Zweigle et al. |
| 9,658,061 | B2 | 5/2017 | Wilson et al. |
| 9,671,221 | B2 | 6/2017 | Ruhland et al. |
| 9,679,385 | B2 | 6/2017 | Suzuki et al. |
| 9,686,532 | B2 | 6/2017 | Tohme |
| 9,708,079 | B2 | 7/2017 | Desjardien et al. |
| 9,715,730 | B2 | 7/2017 | Suzuki |
| 9,720,087 | B2 | 8/2017 | Christen et al. |
| 9,734,609 | B2 | 8/2017 | Pulla et al. |
| 9,739,595 | B2 | 8/2017 | Lau |
| 9,746,308 | B2 | 8/2017 | Gong |
| 9,757,859 | B1 | 9/2017 | Kolb et al. |
| 9,768,837 | B2 | 9/2017 | Charvat et al. |
| 9,772,173 | B2 | 9/2017 | Atwell et al. |
| 9,803,969 | B2 | 10/2017 | Gong |
| 9,816,813 | B2 | 11/2017 | Lettau et al. |
| 9,829,305 | B2 | 11/2017 | Gong |
| 9,835,717 | B2 | 12/2017 | Bosse et al. |
| 9,844,792 | B2 | 12/2017 | Pettersson et al. |
| 9,879,976 | B2 | 1/2018 | Bridges et al. |
| 9,897,442 | B2 | 2/2018 | Pettersson et al. |
| 9,903,939 | B2 | 2/2018 | Charvat et al. |
| 9,909,855 | B2 | 3/2018 | Becker et al. |
| 9,915,733 | B2 | 3/2018 | Fried et al. |
| 9,921,046 | B2 | 3/2018 | Gong |
| 9,958,268 | B2 | 5/2018 | Ohtomo et al. |
| 9,958,545 | B2 | 5/2018 | Eichenholz et al. |
| 9,964,398 | B2 | 5/2018 | Becker et al. |
| 9,964,402 | B2 | 5/2018 | Tohme et al. |
| 9,967,545 | B2 | 5/2018 | Tohme |
| 9,987,746 | B2 | 6/2018 | Bradski |
| 9,989,353 | B2 | 6/2018 | Bartmann et al. |
| 10,012,732 | B2 | 7/2018 | Eichenholz et al. |
| 10,030,972 | B2 | 7/2018 | Iseli et al. |
| 10,041,793 | B2 | 8/2018 | Metzler et al. |
| 10,054,422 | B2 | 8/2018 | Böckem et al. |
| 10,058,394 | B2 | 8/2018 | Johnson et al. |
| 10,059,003 | B1 | 8/2018 | Linnell et al. |
| 10,073,162 | B2 | 9/2018 | Charvat et al. |
| 10,074,889 | B2 | 9/2018 | Charvat et al. |
| 10,082,521 | B2 | 9/2018 | Atlas et al. |
| 10,089,586 | B2 | 10/2018 | Vestal |
| 10,090,944 | B1 | 10/2018 | Charvat et al. |
| 10,094,909 | B2 | 10/2018 | Charvat et al. |
| 10,126,415 | B2 | 11/2018 | Becker et al. |
| 10,150,653 | B2 | 12/2018 | Kyllingstad |
| 10,189,176 | B2 | 1/2019 | Williams |
| 10,220,511 | B2 | 3/2019 | Linnell et al. |
| 10,240,949 | B2 | 3/2019 | Peters et al. |
| 10,437,252 | B1 | 10/2019 | Liu et al. |
| 10,627,211 | B2 | 4/2020 | Luthi |
| 10,635,758 | B2 | 4/2020 | Pivac et al. |
| 10,744,645 | B2 | 8/2020 | Wang et al. |
| 10,865,578 | B2 | 12/2020 | Pivac et al. |
| 10,876,308 | B2 | 12/2020 | Pivac et al. |
| 11,106,836 | B2 | 8/2021 | Pivac et al. |
| 11,187,793 | B1 | 11/2021 | Liu |
| 11,299,894 | B2 | 4/2022 | Pivac |
| 11,364,630 | B2 | 6/2022 | Henriksson |
| 11,401,115 | B2 | 8/2022 | Pivac |
| 11,441,899 | B2 | 9/2022 | Pivac et al. |
| 11,656,357 | B2 | 5/2023 | Pivac et al. |
| 11,842,124 | B2 | 12/2023 | Pivac et al. |
| 11,951,616 | B2 | 4/2024 | Pivac et al. |
| 11,958,193 | B2 * | 4/2024 | Pivac .................. B25J 19/0025 |

(56) References Cited

U.S. PATENT DOCUMENTS

| | | |
|---|---|---|
| 12,073,150 B2 | 8/2024 | Pivac et al. |
| 2001/0055525 A1 | 12/2001 | Inokuchi |
| 2002/0126852 A1 | 9/2002 | Kashani |
| 2002/0175594 A1 | 11/2002 | Kornbluh et al. |
| 2002/0176603 A1 | 11/2002 | Bauer et al. |
| 2003/0048459 A1 | 3/2003 | Gooch |
| 2003/0090682 A1 | 5/2003 | Gooch et al. |
| 2003/0120377 A1 | 6/2003 | Hooke et al. |
| 2003/0206285 A1 | 11/2003 | Lau |
| 2003/0208302 A1 | 11/2003 | Lemelson |
| 2004/0073343 A1 | 4/2004 | Nayfeh |
| 2004/0078137 A1 | 4/2004 | Breakfield et al. |
| 2004/0093119 A1 | 5/2004 | Gunnarsson et al. |
| 2004/0200947 A1 | 10/2004 | Lau |
| 2005/0007450 A1 | 1/2005 | Hill et al. |
| 2005/0057745 A1 | 3/2005 | Bontje |
| 2005/0060092 A1 | 3/2005 | Hablani |
| 2005/0086901 A1 | 4/2005 | Chisholm |
| 2005/0131619 A1 | 6/2005 | Rappaport et al. |
| 2005/0196484 A1 | 9/2005 | Khoshnevis |
| 2005/0252118 A1 | 11/2005 | Matsufuji |
| 2006/0167587 A1 | 7/2006 | Read |
| 2006/0215179 A1 | 9/2006 | Mcmurtry et al. |
| 2007/0024870 A1 | 2/2007 | Girard et al. |
| 2007/0106421 A1 | 5/2007 | Kamrani |
| 2007/0229802 A1 | 10/2007 | Lau |
| 2007/0284215 A1 | 12/2007 | Rudge |
| 2008/0030855 A1 | 2/2008 | Lau |
| 2008/0189046 A1 | 8/2008 | Eliasson et al. |
| 2008/0235970 A1 | 10/2008 | Crampton |
| 2009/0038258 A1 | 2/2009 | Pivac et al. |
| 2009/0074979 A1 | 3/2009 | Krogedal et al. |
| 2009/0240372 A1 | 9/2009 | Bordyn et al. |
| 2010/0025349 A1 | 2/2010 | Khoshnevis |
| 2010/0092032 A1* | 4/2010 | Boca ............... B25J 9/1697 |
| | | 348/222.1 |
| 2010/0095835 A1 | 4/2010 | Yuan et al. |
| 2010/0103431 A1 | 4/2010 | Demopoulos |
| 2010/0138185 A1 | 6/2010 | Kang |
| 2010/0143089 A1* | 6/2010 | Hvass ............... G05D 1/027 |
| | | 414/754 |
| 2010/0152899 A1 | 6/2010 | Chang et al. |
| 2010/0206651 A1 | 8/2010 | Nagasaka |
| 2010/0274390 A1 | 10/2010 | Walser et al. |
| 2010/0281822 A1 | 11/2010 | Murray |
| 2010/0312364 A1 | 12/2010 | Eryilmaz et al. |
| 2011/0043515 A1* | 2/2011 | Stathis ............... G05D 1/027 |
| | | 434/118 |
| 2011/0066393 A1 | 3/2011 | Groll et al. |
| 2011/0153524 A1 | 6/2011 | Schnackel |
| 2011/0208347 A1 | 8/2011 | Otake et al. |
| 2011/0279231 A1* | 11/2011 | Schwenkel ........ G05B 19/4186 |
| | | 340/9.1 |
| 2011/0282490 A1* | 11/2011 | Weigele ............... B25J 9/1674 |
| | | 700/250 |
| 2012/0038074 A1 | 2/2012 | Khoshnevis |
| 2012/0053726 A1 | 3/2012 | Peters et al. |
| 2012/0099096 A1 | 4/2012 | Bridges et al. |
| 2012/0136524 A1 | 5/2012 | Everett et al. |
| 2012/0185089 A1 | 7/2012 | Schreiber |
| 2012/0265391 A1 | 10/2012 | Letsky |
| 2012/0277898 A1 | 11/2012 | Kawai et al. |
| 2013/0028478 A1 | 1/2013 | St-pierre et al. |
| 2013/0068061 A1 | 3/2013 | Yoon |
| 2013/0103192 A1 | 4/2013 | Huettenhofer |
| 2013/0104407 A1 | 5/2013 | Lee |
| 2013/0222816 A1 | 8/2013 | Briggs et al. |
| 2013/0250285 A1 | 9/2013 | Bridges et al. |
| 2013/0286196 A1 | 10/2013 | Atwell |
| 2013/0297046 A1 | 11/2013 | Hendron et al. |
| 2013/0310982 A1 | 11/2013 | Scheurer |
| 2014/0002608 A1 | 1/2014 | Atwell et al. |
| 2014/0067121 A1 | 3/2014 | Brooks et al. |
| 2014/0176677 A1 | 6/2014 | Valkenburg et al. |
| 2014/0192187 A1 | 7/2014 | Atwell et al. |
| 2014/0309960 A1 | 10/2014 | Vennegeerts et al. |
| 2014/0343727 A1 | 11/2014 | Calkins et al. |
| 2014/0348388 A1 | 11/2014 | Metzler et al. |
| 2014/0365258 A1 | 12/2014 | Vestal |
| 2014/0366481 A1 | 12/2014 | Benson |
| 2014/0376768 A1 | 12/2014 | Troy |
| 2015/0082740 A1* | 3/2015 | Peters ................. B25J 15/0019 |
| | | 901/41 |
| 2015/0100066 A1 | 4/2015 | Kostrzewski et al. |
| 2015/0134303 A1 | 5/2015 | Chang et al. |
| 2015/0153720 A1 | 6/2015 | Pettersson et al. |
| 2015/0158181 A1 | 6/2015 | Kawamura |
| 2015/0165620 A1 | 6/2015 | Osaka |
| 2015/0166413 A1 | 6/2015 | Bastelberger et al. |
| 2015/0241203 A1 | 8/2015 | Jordil et al. |
| 2015/0258694 A1 | 9/2015 | Hand et al. |
| 2015/0276402 A1 | 10/2015 | Grsser et al. |
| 2015/0280829 A1 | 10/2015 | Breuer |
| 2015/0293596 A1 | 10/2015 | Krausen et al. |
| 2015/0309175 A1 | 10/2015 | Hinderling et al. |
| 2015/0314890 A1 | 11/2015 | Desjardien et al. |
| 2015/0345959 A1 | 12/2015 | Meuleau |
| 2015/0352721 A1 | 12/2015 | Wicks et al. |
| 2015/0355310 A1 | 12/2015 | Gong et al. |
| 2015/0367509 A1 | 12/2015 | Georgeson |
| 2015/0371082 A1 | 12/2015 | Csaszar et al. |
| 2015/0377606 A1 | 12/2015 | Thielemans |
| 2016/0005185 A1 | 1/2016 | Geissler |
| 2016/0093099 A1 | 3/2016 | Bridges |
| 2016/0153786 A1 | 6/2016 | Liu et al. |
| 2016/0187130 A1 | 6/2016 | Metzler et al. |
| 2016/0187470 A1 | 6/2016 | Becker et al. |
| 2016/0194183 A1 | 7/2016 | Kyllingstad |
| 2016/0221187 A1 | 8/2016 | Bradski |
| 2016/0223364 A1 | 8/2016 | Peters et al. |
| 2016/0239013 A1* | 8/2016 | Troy .................... B25J 9/1664 |
| 2016/0242744 A1 | 8/2016 | Mihailescu et al. |
| 2016/0263767 A1 | 9/2016 | Williams |
| 2016/0274237 A1 | 9/2016 | Stutz |
| 2016/0282107 A1 | 9/2016 | Roland et al. |
| 2016/0282110 A1 | 9/2016 | Vagman et al. |
| 2016/0282179 A1 | 9/2016 | Nazemi et al. |
| 2016/0288331 A1 | 10/2016 | Sivich et al. |
| 2016/0292918 A1 | 10/2016 | Cummings et al. |
| 2016/0313114 A1 | 10/2016 | Tohme et al. |
| 2016/0318187 A1 | 11/2016 | Tan et al. |
| 2016/0327383 A1 | 11/2016 | Becker et al. |
| 2016/0340873 A1 | 11/2016 | Eidenberger et al. |
| 2016/0341041 A1 | 11/2016 | Puura et al. |
| 2016/0349746 A1 | 12/2016 | Grau |
| 2016/0363436 A1 | 12/2016 | Clark et al. |
| 2016/0363659 A1 | 12/2016 | Mindell et al. |
| 2016/0363663 A1 | 12/2016 | Mindell et al. |
| 2016/0363664 A1 | 12/2016 | Mindell et al. |
| 2016/0364869 A1 | 12/2016 | Siercks et al. |
| 2016/0364874 A1 | 12/2016 | Tohme et al. |
| 2017/0028550 A1 | 2/2017 | Terada |
| 2017/0066157 A1 | 3/2017 | Peters et al. |
| 2017/0067739 A1 | 3/2017 | Siercks et al. |
| 2017/0071680 A1 | 3/2017 | Swarup |
| 2017/0082436 A1 | 3/2017 | Siercks et al. |
| 2017/0091922 A1 | 3/2017 | Siercks et al. |
| 2017/0091923 A1 | 3/2017 | Siercks et al. |
| 2017/0108528 A1 | 4/2017 | Atlas et al. |
| 2017/0122733 A1 | 5/2017 | Brown |
| 2017/0122736 A1 | 5/2017 | Dold et al. |
| 2017/0166399 A1 | 6/2017 | Stubbs |
| 2017/0173795 A1 | 6/2017 | Tan et al. |
| 2017/0173796 A1 | 6/2017 | Kim et al. |
| 2017/0176572 A1 | 6/2017 | Charvat et al. |
| 2017/0179570 A1 | 6/2017 | Charvat |
| 2017/0179603 A1 | 6/2017 | Charvat et al. |
| 2017/0191822 A1 | 7/2017 | Becker et al. |
| 2017/0225330 A1 | 8/2017 | Wagner |
| 2017/0227355 A1 | 8/2017 | Pettersson et al. |
| 2017/0236299 A1 | 8/2017 | Valkenburg et al. |
| 2017/0254102 A1 | 9/2017 | Peters et al. |
| 2017/0269203 A1 | 9/2017 | Trishaun |

(56)                  References Cited

U.S. PATENT DOCUMENTS

| | | | |
|---|---|---|---|
| 2017/0291805 | A1 | 10/2017 | Hao et al. |
| 2017/0307757 | A1 | 10/2017 | Hinderling et al. |
| 2017/0314909 | A1 | 11/2017 | Dang |
| 2017/0314918 | A1 | 11/2017 | Shah |
| 2017/0329321 | A1 | 11/2017 | Dai et al. |
| 2017/0333137 | A1 | 11/2017 | Roessler |
| 2017/0343336 | A1 | 11/2017 | Lettau |
| 2017/0371342 | A1 | 12/2017 | Hashimoto |
| 2018/0001479 | A1 | 1/2018 | Li et al. |
| 2018/0003493 | A1 | 1/2018 | Bernhard et al. |
| 2018/0017384 | A1 | 1/2018 | Siercks et al. |
| 2018/0023935 | A1 | 1/2018 | Atwell et al. |
| 2018/0038684 | A1 | 2/2018 | Fröhlich et al. |
| 2018/0043838 | A1 | 2/2018 | Ellerman et al. |
| 2018/0046096 | A1 | 2/2018 | Shibazaki |
| 2018/0052233 | A1 | 2/2018 | Frank et al. |
| 2018/0074201 | A1 | 3/2018 | Sakai et al. |
| 2018/0093380 | A1 | 4/2018 | Yoshida |
| 2018/0108178 | A1 | 4/2018 | Murugappan et al. |
| 2018/0121571 | A1 | 5/2018 | Tiwari et al. |
| 2018/0149469 | A1 | 5/2018 | Becker et al. |
| 2018/0156601 | A1 | 6/2018 | Pontai |
| 2018/0168749 | A1 | 6/2018 | Dozeman |
| 2018/0170719 | A1 | 6/2018 | Tasch et al. |
| 2018/0180416 | A1 | 6/2018 | Edelman et al. |
| 2018/0180740 | A1 | 6/2018 | Shaffer |
| 2018/0202796 | A1 | 7/2018 | Ziegenbein |
| 2018/0209156 | A1 | 7/2018 | Pettersson |
| 2018/0222047 | A1 | 8/2018 | Nishi |
| 2018/0239010 | A1 | 8/2018 | Mindell et al. |
| 2018/0283017 | A1 | 10/2018 | Telleria et al. |
| 2018/0300433 | A1 | 10/2018 | Maxam et al. |
| 2019/0026401 | A1 | 1/2019 | Benjamin et al. |
| 2019/0032348 | A1 | 1/2019 | Parkes |
| 2019/0099902 | A1 | 4/2019 | Yamamoto et al. |
| 2019/0184555 | A1 | 6/2019 | Linnell et al. |
| 2019/0251210 | A1 | 8/2019 | Pivac et al. |
| 2020/0009723 | A1 | 1/2020 | Eisenwinter |
| 2020/0009730 | A1 | 1/2020 | Henriksson |
| 2020/0173777 | A1 | 6/2020 | Pivac et al. |
| 2020/0206924 | A1 | 7/2020 | Pivac et al. |
| 2020/0215688 | A1 | 7/2020 | Pivac et al. |
| 2020/0215692 | A1 | 7/2020 | Pivac et al. |
| 2020/0215693 | A1 | 7/2020 | Pivac et al. |
| 2020/0324981 | A1 | 10/2020 | Pivac et al. |
| 2021/0016438 | A1 | 1/2021 | Pivac et al. |
| 2021/0291362 | A1 | 9/2021 | Pivac et al. |
| 2021/0370509 | A1 | 12/2021 | Pivac et al. |

FOREIGN PATENT DOCUMENTS

| | | | |
|---|---|---|---|
| CN | 2730976 | Y | 10/2005 |
| CN | 2902981 | Y | 5/2007 |
| CN | 2923903 | Y | 7/2007 |
| CN | 101100903 | A | 1/2008 |
| CN | 201184054 | Y | 1/2009 |
| CN | 101360873 | B | 2/2009 |
| CN | 101476883 | A | 7/2009 |
| CN | 100557169 | C | 11/2009 |
| CN | 101694130 | A | 4/2010 |
| CN | 201972413 | U | 9/2011 |
| CN | 102359282 | A | 2/2012 |
| CN | 202248944 | U | 5/2012 |
| CN | 202292752 | U | 7/2012 |
| CN | 102995911 | A | 3/2013 |
| CN | 103042527 | A | 4/2013 |
| CN | 202925913 | U | 5/2013 |
| CN | 103363902 | A | 10/2013 |
| CN | 103698769 | A | 4/2014 |
| CN | 203701626 | U | 7/2014 |
| CN | 104141391 | B2 | 11/2014 |
| CN | 104153591 | A | 11/2014 |
| CN | 104493810 | A | 4/2015 |
| CN | 204295678 | U | 4/2015 |
| CN | 104612411 | A | 5/2015 |
| CN | 204311767 | U | 5/2015 |
| CN | 103774859 | B | 11/2015 |
| CN | 103753586 | B | 12/2015 |
| CN | 105113373 | A | 12/2015 |
| CN | 105178616 | A | 12/2015 |
| CN | 105257008 | B | 1/2016 |
| CN | 105452806 | A | 3/2016 |
| CN | 105544998 | A | 5/2016 |
| CN | 205290958 | U | 6/2016 |
| CN | 104806028 | B | 11/2016 |
| CN | 205668271 | U | 11/2016 |
| CN | 205840368 | U | 12/2016 |
| CN | 205990775 | U | 3/2017 |
| CN | 106607907 | A | 5/2017 |
| CN | 206185879 | U | 5/2017 |
| CN | 206189878 | U | 5/2017 |
| CN | 105089274 | B | 6/2017 |
| CN | 105064699 | B | 7/2017 |
| CN | 107217859 | A | 9/2017 |
| CN | 107237483 | A | 10/2017 |
| CN | 107357294 | A | 11/2017 |
| CN | 107605167 | A | 1/2018 |
| CN | 206844687 | U | 1/2018 |
| CN | 107654077 | A | 2/2018 |
| CN | 107675891 | A | 2/2018 |
| CN | 107740591 | A | 2/2018 |
| CN | 106088632 | B | 3/2018 |
| CN | 107762165 | A | 3/2018 |
| CN | 207063553 | U | 3/2018 |
| CN | 106088631 | B | 5/2018 |
| CN | 107975245 | A | 5/2018 |
| CN | 108061551 | A | 5/2018 |
| CN | 108222527 | A | 6/2018 |
| CN | 108301628 | A | 7/2018 |
| CN | 108331362 | A | 7/2018 |
| CN | 106150109 | B | 8/2018 |
| CN | 108457479 | A | 8/2018 |
| CN | 108708560 | A | 10/2018 |
| CN | 208023979 | U | 10/2018 |
| CN | 106881711 | A | 4/2019 |
| CN | 107083845 | A | 6/2019 |
| CN | 108016585 | B | 7/2019 |
| DE | 3430915 | C2 | 3/1986 |
| DE | 4038260 | C2 | 6/1991 |
| DE | 4207384 | A1 | 9/1993 |
| DE | 19509809 | A1 | 10/1995 |
| DE | 4417928 | A1 | 11/1995 |
| DE | 29601535 | U1 | 5/1997 |
| DE | 19600006 | A1 | 7/1997 |
| DE | 19603234 | C2 | 9/1997 |
| DE | 19743717 | C2 | 4/1999 |
| DE | 19849720 | A1 | 5/2000 |
| DE | 10230021 | C1 | 7/2003 |
| DE | 102006030130 | B3 | 9/2007 |
| DE | 102009014766 | A1 | 9/2010 |
| DE | 102009018070 | A1 | 10/2010 |
| DE | 102009042014 | A1 | 3/2011 |
| DE | 202012100646 | U1 | 6/2013 |
| DE | 102013019869 | A1 | 5/2015 |
| EP | 190076 | A1 | 8/1986 |
| EP | 370682 | A2 | 5/1990 |
| EP | 456020 | A1 | 1/1995 |
| EP | 493020 | B1 | 4/1995 |
| EP | 495525 | B1 | 4/1995 |
| EP | 836664 | | 1/1999 |
| EP | 674069 | | 12/1999 |
| EP | 1375083 | | 1/2004 |
| EP | 1918478 | | 5/2008 |
| EP | 2112291 | | 10/2009 |
| EP | 2219528 | | 8/2010 |
| EP | 2249997 | | 11/2010 |
| EP | 2353801 | | 8/2011 |
| EP | 2631040 | | 8/2013 |
| EP | 2199719 | | 10/2014 |
| EP | 3084719 | | 10/2016 |
| EP | 3582934 | B1 | 11/2021 |
| ES | 2296556 | A1 | 4/2008 |
| FR | 2230825 | A1 | 12/1974 |
| FR | 2524522 | A1 | 10/1983 |

(56) References Cited

FOREIGN PATENT DOCUMENTS

| | | | |
|---|---|---|---|
| GB | 119331 | A | 10/1918 |
| GB | 673472 | A | 6/1952 |
| GB | 682010 | A | 11/1952 |
| GB | 839253 | A | 6/1960 |
| GB | 1067604 | A | 5/1967 |
| GB | 1465068 | A | 2/1977 |
| GB | 2198105 | A | 6/1988 |
| GB | 125079 | D | 12/2001 |
| GB | 2422400 | A | 7/2006 |
| JP | 64006719 | A | 1/1989 |
| JP | H07101509 | A | 11/1999 |
| JP | 2005283600 | A | 10/2005 |
| JP | 4294990 | B2 | 4/2009 |
| JP | 2009521630 | A | 6/2009 |
| JP | 5508895 | B2 | 3/2014 |
| LU | 87054 | A1 | 6/1989 |
| LU | 87381 | A1 | 6/1990 |
| LU | 88144 | A1 | 4/1994 |
| RU | 85392 | U1 | 8/2009 |
| WO | 9702397 | A1 | 1/1997 |
| WO | 2001076830 | A1 | 10/2001 |
| WO | 2004020760 | A1 | 3/2004 |
| WO | 2004083540 | A3 | 9/2004 |
| WO | 2005014240 | A1 | 2/2005 |
| WO | 2005017550 | A2 | 2/2005 |
| WO | 2005070657 | A1 | 8/2005 |
| WO | 2004011734 | A1 | 11/2005 |
| WO | 2006111827 | A1 | 10/2006 |
| WO | 2007076581 | A1 | 7/2007 |
| WO | 2008110559 | A2 | 9/2008 |
| WO | 2008124713 | A2 | 10/2008 |
| WO | 2009026641 | A1 | 3/2009 |
| WO | 2009026642 | A1 | 3/2009 |
| WO | 2010020457 | A1 | 2/2010 |
| WO | 2010054519 | A1 | 5/2010 |
| WO | 2010069160 | A1 | 6/2010 |
| WO | 2011077006 | A2 | 6/2011 |
| WO | 2013088154 | A1 | 6/2013 |
| WO | 2013134559 | A1 | 9/2013 |
| WO | 2015142784 | A1 | 9/2015 |
| WO | 2017162630 | A1 | 9/2017 |
| WO | 2018009978 | A1 | 1/2018 |
| WO | 2018009980 | A1 | 1/2018 |
| WO | 2018009981 | A1 | 1/2018 |
| WO | 2018009985 | A1 | 1/2018 |
| WO | 2018009986 | A1 | 1/2018 |
| WO | 2018052469 | A3 | 4/2018 |
| WO | 2018099323 | A1 | 6/2018 |
| WO | 2018149502 | A1 | 8/2018 |
| WO | 2019006511 | A1 | 1/2019 |
| WO | 2019014701 | A1 | 1/2019 |
| WO | 2019014702 | A1 | 1/2019 |
| WO | 2019014705 | A1 | 1/2019 |
| WO | 2019014706 | A1 | 1/2019 |
| WO | 2019014707 | A1 | 1/2019 |
| WO | 2019033165 | A1 | 2/2019 |
| WO | 2019033166 | A1 | 2/2019 |
| WO | 2019033170 | A1 | 2/2019 |
| WO | 2019068128 | A1 | 4/2019 |
| WO | 2019071313 | A1 | 4/2019 |

OTHER PUBLICATIONS

Abed, et al., "A Field Bus Network With CAN Protocol and a Fuzzy Neural Petri Net Controller." Jan. 2013, Basrah Journal of Science, vol. 31(2), pp. 86-102.
Boston Dynamics: "Introducing Spot (previously SpotMini)", Jun. 28, 2016, YouTube video, 1 page (screenshot of video); video retrieved at <https://www.youtube.com/watch?v=tf7IEVTDjng>.
Decision of Rejection issued May 19, 2023 on Chinese Patent Application No. 201780056460.8.
Decision on Re-examination issued Sep. 13, 2023 on Chinese Patent Application No. 201780056460.8.

Delgado, R. et al.: "Development and Control of an Omnidirectional Mobile Robot on an EtherCAT Network", International Journal of Applied Engineering Research, vol. 11, No. 21, 2016, pp. 10586-10592, XP055574484.
Dorfler, K. et al.: "Mobile Robotic Brickwork, Automation of a Discrete Robotic Fabrication Process Using an Autonomous Mobile Robot Robotic Fabrication in Architecture", Art and Design 2016, Feb. 4, 2016 (Feb. 4, 2016), pp. 204-217, XP055567451.
Egerstedt, M. et al.: "Control of Mobile Platforms using a Virtual Vehicle Approach", IEEE Transactions on Automatic Control, vol. 46, No. 11, Nov. 2001 (Nov. 1, 2001), XP055567515.
European search report issued Jul. 12, 2022 on European Patent Application No. 19885448.1.
European search report issued Mar. 28, 2022 in European Patent Application No. 19837417.5, 10 pages.
European search report issued Mar. 7, 2022 in European Patent Application No. 19838430.7, 9 pages.
Examination Report dated Sep. 11, 2023 on UAE Patent Application No. P60000862019.
Examination Report dated Nov. 16, 2023 on European Patent Application No. 17826697.9.
Examination Report dated Aug. 2, 2023 on Chinese Patent Application No. 201880057411.0.
Examination Report dated Feb. 29, 2024 on Australian Patent Application No. 2018317936.
Examination Report dated Sep. 29, 2023 on European Patent Application No. 18845794.9.
Examination Report dated Oct. 30, 2023 on UAE Patent Application No. P60002212020.
Examination Report dated Oct. 30, 2023 on UAE Patent Application No. P60019022019.
Examination Report dated Oct. 31, 2023 on Australian Patent Application No. 2018317937.
Examination Report dated Nov. 8, 2023 on UAE Patent Application No. P60005242020.
Examination Report dated Apr. 4, 2024 on European Patent Application No. 18846395.4.
Examination Report dated Apr. 30, 2024 on Australian Patent Application No. 2018317936.
Examination Report dated Jan. 31, 2024 on Chinese Patent Application No. 201980059588.9.
Examination Report dated Feb. 27, 2024 on Australian Patent Application No. 2018304730.
Examination Report dated Feb. 16, 2024 on Australian Patent Application No. 2018303837.
Examination Report dated Apr. 12, 2024 on European Patent Application No. 18835861.8.
Examination report issued Feb. 11, 2023 on Chinese Patent Application No. 2018800554140.
Examination report issued Aug. 12, 2023 on Chinese Patent Application No. 201880067283.8.
Examination report issued Jul. 13, 2022 on Chinese Patent Application No. 201780056460.8.
Examination report issued Jun. 13, 2023 on Australian Patent Application No. 2018317941.
Examination report issued Jun. 14, 2023 on Chinese Patent Application No. 201880066598.0.
Examination report issued Nov. 14, 2022 on Australian Patent Application No. 2018317937.
Examination report issued Aug. 15, 2023 on Australian Patent Application No. 2018317937.
Examination report issued Feb. 16, 2024 on Australian Patent Application No. 2018303837.
Examination report issued Jul. 17, 2023 on Australian Patent Application No. 2018303838.
Examination report issued Jul. 17, 2023 on Australian Patent Application No. 2018304730.
Examination report issued Oct. 17, 2022 on European Patent Application No. 18834893.2.
Examination report issued Sep. 19, 2022 on Chinese Patent Application No. 201880057400.2.
Examination report issued Feb. 2, 2023 on Chinese Patent Application No. 201780056460.8.

(56) References Cited

OTHER PUBLICATIONS

Examination report issued Mar. 2, 2023 on Australian Patent Application No. 2018303330.
Examination report issued May 2, 2022 on Australian Patent Application No. 2018295572.
Examination report issued Oct. 20, 2022 on Australian Patent Application No. 2018303330.
Examination report issued Jun. 21, 2023 on European Patent Application No. 18828425.1.
Examination report issued Oct. 21, 2022 on Chinese Patent Application No. 201880057441.1.
Examination report issued Sep. 22, 2022 on Chinese Patent Application No. 201880057383.2.
Examination report issued Sep. 22, 2022 on Chinese Patent Application No. 2018800574110.
Examination report issued Apr. 24, 2023 on Chinese Patent Application No. 201880057400.2.
Examination report issued Oct. 24, 2022 on Chinese Patent Application No. 2018800573813.
Examination report issued Jan. 25, 2023 on European Patent Application No. 18834673.8.
Examination report issued Apr. 27, 2023 on Chinese Patent Application No. 201880057383.2.
Examination report issued Feb. 27, 2023 on Saudi Arabian Patent Application No. 520410931.
Examination report issued Sep. 27, 2022 on Saudi Arabian Patent Application No. 520411375.
Examination report issued Dec. 28, 2023 on Chinese Patent Application No. 201980060671.8.
Examination report issued Jul. 28, 2023 on Chinese Patent Application No. 201980089047.0.
Examination report issued Oct. 28, 2022 on Chinese Patent Application No. 201880067520.0.
Examination report issued Mar. 29, 2023 on European Patent Application No. 18834565.6.
Examination report issued Sep. 29, 2022 on Chinese Patent Application No. 201880067283.8.
Examination report issued Aug. 3, 2022 on European Patent Application No. 18835861.8.
Examination report issued Nov. 3, 2022 on European Patent Application No. 18835737.0.
Examination report issued May 30, 2022 on Chinese Patent Application No. 201880067520.0.
Examination report issued Sep. 4, 2023 on Australian Patent Application No. 2018317936.
Examination report issued Jul. 5, 2023 on Australian Patent Application No. 2018303329.
Examination report issued Jun. 6, 2023 on Chinese Patent Application No. 2018800573813.
Examination report issued Jul. 7, 2023 on Australian Patent Application No. 2018303837.
Examination report issued Dec. 26, 2021 in Saudi Arabia Patent Application No. 519400899, 8 pages.
Examination report issued Feb. 24, 2022 in Australian Patent Application No. 2017295317, 3 pages.
Examination report issued Feb. 9, 2022 in Chinese Patent Application No. 201880067520.0, with English translation, 14 pages.
Examination Report mailed Apr. 18, 2021 in GCC Patent Application No. 2018-35644, 5 pages.
Examination Report mailed Apr. 30, 2021 in GCC Patent Application No. 2018-35643, 3 pages.
Examination Report mailed Jun. 29, 2021 for India Patent Application No. 201927004006, 6 pages.
Examination Report mailed Sep. 30, 2021 for Australian Patent Application No. 2017295316, 3 pages.
Extended European Search Report mailed Jun. 4, 2021 for European Patent Application No. 18865644.1, 7 pages.
Extended European Search Report mailed Mar. 16, 2021 for European Patent Application No. 18834565.6, 19 pages.

Extended European Search Report mailed Mar. 17, 2021 for European Patent Application No. 18835861.8, 12 pages.
Extended European Search Report mailed Mar. 18, 2021 for European Patent Application No. 18834673.8, 14 pages.
Extended European Search Report mailed Mar. 18, 2021 for European Patent Application No. 18834893.2, 12 pages.
Extended European Search Report mailed Mar. 18, 2021 for European Patent Application No. 18835737.0, 10 pages.
Extended European Search Report mailed Mar. 30, 2021 for European Patent Application No. 18845794.9, 13 pages.
Extended European Search Report mailed Mar. 5, 2021 for European Patent Application No. 18828425.1, 7 pages.
Fastbrick Robotics, Fastbrick Robotics: Hadrian 105 First Look Revealed, Nov. 16, 2015 (Nov. 16, 2015), XP054978174, Retrieved from the Internet <URL:https://www.youtube.com/watch?v=7Zw7qHxMtrY> [retrieved on 20151116].
Fastbrick Robotics. "Fastbrick Robotics Building a revolution." Jun. 2015. 14 pages.
Fastbrick Robotics: Hadrian 105 Demonstrative Model Animation, Jun. 29, 2015 (Jun. 29, 2015), XP054979424, Retrieved from the Internet <URL:https://www.youtube.com/watch?v=Rebqcsb61gY> [retrieved on 20180307].
Fastbrick Robotics: Hadrian 105 Time Lapse, Fastbrick Robotics Time Lapse, May 22, 2016 (May 22, 2016), XP054978173, Retrieved from the Internet <URL:https://www.youtube.com/watch?v=4Ycr08ONcfY> [retrieved on May 22, 2016].
Fastbrick Robotics: Hadrian X Digital Construction System, published on Sep. 21, 2016 <URL: https://www.youtube.com/watch?v=5bW1 vuCgEaA >.
Feng, C. et al.: "Vision Guided Autonomous Robotic Assembly and as-built Scanning on Unstructured Construction Sites", Automation in Construction, vol. 59, Nov. 2015 (Nov. 1, 2015), pp. 128-138, XP055567454.
Gander H. et al: "Application of a floating point digital signal processor to a dynamic robot measurement system", Instrumentation and Measurement Technology Conference, 1994. IMTC/94. Conference Proceedings. 10th Anniversary. Advanced Technologies in I & M., 1994 IEEE Hamamatsu, Japan May 10-12, 1994, New York, NY, USA, IEEE, May 10, 1994 (May 10, 1994), pp. 372-375, XP010121924, DOI: 10.1109/IMTC.1994.352046, ISBN: 978-0-7803-1880-9, *whole document*.
Gao, X. et al.: "Complete Solution Classification for the Perspective-Three-Point Problem", IEEE Transactions on Pattern Analysis and Machine Intelligence, vol. 25, No. 8, Aug. 2003 (Aug. 1, 2003), pp. 930-943, XP011099374.
Garrido, S. et al., "FM2: A real-time fast marching sensor based motion planner", Advanced Intelliget Mechatronics, 2007 IEEE/ASME International Conference on, IEEE, PI, Sep. 1, 2007 (Sep. 1, 2007), pp. 1-6.
Giftthaler, M. et al., "Efficient Kinematic Planning for Mobile Manipulators with Non-holonomic Constraints Using Optimal Control", 2017 IEEE International Conference on Robotics and Automation (ICRA), Singapore, May 29-Jun. 3, 2017.
HandWiki. Damping ratio. Cited by U.S. Patent and Trademark Office in Nov. 21, 2022 Final Office Action for U.S. Appl. No. 16/631,404. 7 pages.
Heintze, H., "Design and Control of a Hydraulically Actuated Industrial Brick Laying Robot," 264 pages.
Heintze, J. et al., "Controlled hydraulics for a direct drive brick laying robot," Automation in Construction 5 (1996), pp. 23-29.
Helm, V. et al.: "Mobile Robotic Fabrication on Construction Sites: dimRob", IEEE /RSJ International Conference on Intelligent Robots and Systems, Oct. 7, 2012 (Oct. 7, 2012), Vilamoura, Portugal, pp. 4335-4341, XP032287463.
http://www.new-technologies.org/ECT/Other/brickrob.htm. "Emerging Construction Technologies." Dec. 1, 2006.
Huang, S. et al., "Applying High-Speed Vision Sensing to an Industrial Robot for High-Performance Position Regulation under Uncertainties," Sensors, 2016, 16, 1195, 15 pages.
International Preliminary Report on Patentability for International Application No. PCT/AU2017/050731; Date of Mailing: Jan. 15, 2019; 5 pages.

(56)             References Cited

OTHER PUBLICATIONS

International Preliminary Report on Patentability for International Application No. PCT/AU2017/050738; Date of Mailing: Jan. 15, 2019; 13 pages.
International Preliminary Report on Patentability for International Application No. PCT/AU2017/050739; Date of Mailing: Jan. 15, 2019; 6 pages.
International Preliminary Report on Patentability for International Application No. PCT/AU2018/050733; Date of Mailing: Jan. 21, 2020; 6 pages.
International Preliminary Report on Patentability for International Application No. PCT/AU2018/050734; Date of Mailing: Jan. 21, 2020; 9 pages.
International Preliminary Report on Patentability for International Application No. PCT/AU2018/050737; Date of Mailing: Jan. 21, 2020; 6 pages.
International Preliminary Report on Patentability for International Application No. PCT/AU2018/050739; Date of Mailing: Jan. 21, 2020; 6 pages.
International Preliminary Report on Patentability for International Application No. PCT/AU2018/050740; Date of Mailing: Jan. 21, 2020; 6 pages.
International Search Report and Written Opinion for International Application No. PCT/AU2017/050730; Date of Mailing: Aug. 23, 2017; 17 pages.
International Search Report and Written Opinion for International Application No. PCT/AU2017/050731; Date of Mailing: Aug. 31, 2017; 8 pages.
International Search Report and Written Opinion for International Application No. PCT/AU2017/050738; Date of Mailing: Oct. 17, 2017; 19 pages.
International Search Report and Written Opinion for International Application No. PCT/AU2017/050739; Date of Mailing: Sep. 28, 2017; 9 pages.
International Search Report and Written Opinion for International Patent Application No. PCT/AU19/50742; Date of Mailing Sep. 23, 2019; 5 pages.
International Search Report and Written Opinion for International Patent Application No. PCT/AU19/50743; Date of Mailing mailed Oct. 1, 2019; 10 pages.
International Search Report and Written Opinion for International Patent Application No. PCT/AU20/50367; Date of Mailing Jun. 29, 2020; 15 pages.
International Search Report and Written Opinion for International Patent Application No. PCT/AU20/50368; Date of Mailing Jun. 25, 2020; 11 pages.
Jiang, B.C. et al., "A Review of Recent Developments in Robot Metrology." J. of Manufacturing Systems, vol. 7 No. 4, (1988) pp. 339-357.
Kazemi, M. et al.: "Path Planning for Image-based Control of Wheeled Mobile Manipulators", 2012 IEEE /RSJ International Conference on Intelligent Robots and Systems, Oct. 7, 2012 (Oct. 7, 2012), Vilamoura, Portugal, XP055567470.
Kleinigger, M. et al: "Application of 6-DOF sensing for robotic disturbance compensation", Automation Science and Engineering (CASE), 2010 IEEE Conference on, IEEE, Piscataway, NJ, USA, Aug. 21, 2010 (Aug. 21, 2010, pp. 344-349, XP031762876, ISBN: 978-1-4244-5477-1, *abstract*, *sections 1 to 3*.
Kleinkes, M. et al.: "Laser Tracker and 6DoF measurement strategies in industrial robot applications", CMSC 2011: Coordinate Metrology System Conference, Jul. 25, 2011 (Jul. 25, 2011), XP055456272.
Koren et al.: "End-effector guidance of robot arms", CIRP Annals-Manufacturing Technology, vol. 36, No. 1, 1987, pp. 289-292, XP055456270.
Kwon, S. et al., "On the Coarse/Fine Dual-Stage Manipulators with Robust Perturbation Compensator," IEEE, May 21-26, 2001, pp. 121-126.
Kyle in CMSC: Charlotte-Concord, Jul. 21-25, 2008.

Latteur, et al., "Drone-Based Additive Manufacturing of Architectural Structures," IASS Symposium 2015, Amsterdam, The Netherlands; Aug. 17-20, 2015; 12 pages.
Lippiello, V. et al.: "Position-Based Visual Servoing in Industrial Multirobot Cells Using a Hybrid Camera Configuration", IEEE Transactions on Robotics, vol. 23, No. 1, Feb. 2007 (Feb. 1, 2007), XP011163518.
Liu, Z. et al.: "EtherCAT Based Robot Modular Joint Controller", Proceeding of The 2015 IEEE International Conference on Information and Automation, Aug. 2015 (Aug. 1, 2015), Lijiang, China, pp. 1708-1713, XP033222650.
Losada, D.P. et al., "Distributed and Modular CAN-Based Architecture for Hardware Control and Sensor Data Integration." May 3, 2017, pp. 1-17.
Mercedes-Benz: "Mercedes-Benz "Chicken" Magic Body Control TV commercial", YouTube, Sep. 23, 2013, 1 page. Retrevied from the internet: <https://www.youtube.com/watch?v+nLwML2PagbY>.
Muralikrishnan, B. et al., "Laser Trackers for Large-Scale Dimensional Metrology: A Review." Precision Engineering 44 (2016), pp. 13-28.
Notice of Acceptance of Patent Application received for priority Australian Patent Application No. 2017294796, mailed May 15, 2019 (158 pages).
Office Action dated Sep. 11, 2023 on Canadian Patent Application No. 3030764.
Office Action dated Nov. 25, 2023 on Chinese Patent Application No. 201780056460.8.
Office Action mailed Apr. 21, 2021 in Japanese Patent Application No. 2019-523148, 4 pages.
Office Action mailed Aug. 20, 2021 for Japanese Patent Application No. 2019-523147, 3 pages.
Office Action mailed Jul. 5, 2021 for Japanese Patent Application No. 2019-523145, 4 pages.
Office Action mailed May 24, 2021 for Chinese Patent Application No. 201880067520.0, 8 pages.
Office Action mailed Sep. 3, 2021 for Chinese Patent Application No. 201780056460.8, 9 pages.
Partial Supplementary European Search Report mailed Apr. 14, 2020 in European Patent Application No. 17826696.1, 10 pages.
Pless, R .: "Using Many Cameras as One", IEEE Computer Society Conference on Computer Vision and Pattern Recognition, Jun. 18, 2003 (Jun. 18, 2003), Madison , WI, USA, pp. 1-7, XP055564465.
Posada et al.: "High accurate robotic drilling with external sensor and compliance model-based compensation", Robotics and Automation (ICRA), 2016 IEEE International Conference, May 16, 2016 (May 16, 2016), pp. 3901-3907, XP032908649.
Pritschow, G. et al., "A Mobile Robot for On-Site Construction of Masonry," Inst. of Control Tech. for Machine Tools and Manuf. Units, pp. 1701-1707.
Pritschow, G. et al., "Application Specific Realisation of a Mobile Robot for On-Site Construction of Masonry," Automation and Robotics in Construction XI, 1994, pp. 95-102.
Pritschow, G. et al., "Configurable Control System of a Mobile Robot for ON-Site Construction of Masonry," Inst. of Control Technology for Machine Tools and Manuf. Units, pp. 85-92.
Pritschow, G. et al., "Technological aspects in the development of a mobile bricklaying robot," Automation in Construction 5 (1996), pp. 3-13.
Riegl Laser Measurement Systems. "Long Range & High Accuracy 3D Terrestrial Laser Scanner System-LMS-Z420i." pp. 1-4.
Salcudean, S. et al., "On the Control of Redundant Coarse-Fine Manipulators," IEEE, pp. 1834-1840.
Sandy, T. et al.: "Autonomous Repositioning and Localization of an In Situ Fabricator", 2016 IEEE International Conference on Robotics and Automation (ICRA), May 16, 2016 (May 16, 2016), pp. 2852-2858, XP055567467.
Siciliano, B. et al., "Robotics—chapters 2-4" Robotics, Dec. 31, 2009 (Dec. 31, 2009), Springer London, London, pp. 39-189.
Skibniewski, M.J., "Current Status of Construction Automation and Robotics in the United States of America," The 9th International Symposium on Automation and Robotics in Construction, Jun. 3-5, 1992, 8 pages.

(56)            References Cited

OTHER PUBLICATIONS

Trimble ATS. "Advanced Tracking Sensor (ATS) with target recognition capability for stakeless machine control survey applications." pp. 1-4.

Vincze, M. et al., "A Laser Tracking System to Measure Position and Orientation of Robot End Effectors Under Motion," The International Journal of Robotics Research, vol. 13, No. 4, Aug. 1994, pp. 305-314.

Warszawski, A. et al., "Implementation of Robotics in Building: Current Status and Future Prospects," Journal of Construction Engineering and Management, Jan./Feb. 1998, 124(1), pp. 31-41.

Wijenayake, U. et al., "Stereo Vision-Based 3D Pose Estimation of Product Labels for Bin Picking." Journal of Inst. of Control Robotics and Systems (2016): 22(1): pp. 8-16.

Willmann, J. et al.: "Robotic Timber Construction—Expanding Additive Fabrication to New Dimensions", Automation in Construction, vol. 61, 2016, pp. 16-23, XP029310896.

Xu, H. et al.: "Uncalibrated Visual Servoing of Mobile Manipulators with an Eye-to-hand Camera", Proceedings of The 2016 IEEE International Conference on Robotics and Biomimetics, Dec. 3, 2016 (Dec. 3, 2016), Qingdao, China, pp. 2145-2150, XP033071767.

Yu, S.N. et al., "Feasibility verification of brick-laying robot using manipulation trajectory and the laying pattern optimization," Dept. of Mech. Eng., Automation in Construction (2009), pp. 644-655.

Zaki, T., "Parametric modeling of Blackwall assemblies for automated generation of shop drawings and detailed estimates using BIM", Master's Thesis, May 23, 2016, pp. 1-151.

Examination Report dated Oct. 1, 2024 on European Patent Application No. 18846395.4.

Examination Report dated Jul. 24, 2024 on Australian Patent Application No. 2019379873.

Examination Report dated Jun. 5, 2024 on on European Patent Application No. 18835737.0.

* cited by examiner

COMMUNICATION SYSTEM FOR AN INTERACTION SYSTEM

BACKGROUND OF THE INVENTION

The present invention relates to systems and methods for performing interactions within a physical environment, and in particular systems and methods for using a communication system with a robot arm mounted on a robot base that undergoes movement relative to the environment, to allow interaction to be performed within the environment.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

It is known to provide systems in which a robot arm mounted on a moving robot base is used to perform interactions within a physical environment. For example, WO 2007/076581 describes an automated brick laying system for constructing a building from a plurality of bricks comprising a robot provided with a brick laying and adhesive applying head, a measuring system, and a controller that provides control data to the robot to lay the bricks at predetermined locations. The measuring system measures in real time the position of the head and produces position data for the controller. The controller produces control data on the basis of a comparison between the position data and a predetermined or pre-programmed position of the head to lay a brick at a predetermined position for the building under construction. The controller can control the robot to construct the building in a course by course manner where the bricks are laid sequentially at their respective predetermined positions and where a complete course of bricks for the entire building is laid prior to laying of the brick for the next course.

Laser trackers such as those described in U.S. Pat. Nos. 4,714,339 and 4,790,651 can be used to measure the position and orientation of a target which is fitted to an object. Kyle in CMSC: Charlotte-Concord, Jul. 21-25, 2008, describes a laser tracker polar measurement system for measuring the position and orientation of a target with six degrees of freedom.

Manufacturers API (Radian and OT2 with STS (Smart Track Sensor)), Leica (AT960 and Tmac) and Faro provide laser tracker systems, some of which can measure position and orientation of the target. These systems measure position at 300 Hz, or 1 kHz or 2 kHz (depending on the equipment). Orientation measurements (for STS and Tmac) rely on respective vision systems using 2D cameras which measure at a current maximum of 100 Hz. Accelerometer data such as from a tilt sensor or INS (Inertial navigation System) can be used to determine or predict or interpolate orientation measurements at up to 1000 Hz but the orientation accuracy may be reduced to 0.01 degree with the known systems.

Such laser trackers can be used to make accurate position measurements of an end effector on a robotic arm. Data obtained from the laser tracker and active target equating to position and optionally orientation of the active target located on or proximal to the end effector is used to control at least the position and preferably also the orientation of the end effector and hence stabilise the end effector.

Existing laser tracker and active target equipment such as the API Radian and Smart Track Sensor (STS) or API Omnitrack and Smart Track Sensor or Leica AT960XR and Tmac require a hard wired connection between the laser tracker and the active target. On an industrial robot, this requires a dedicated cable routed along the robot arm and possibly to the end effector, and also out to the laser tracker. On a large construction machine such as the brick laying machine described by the applicant, a dedicated cable must be run from the laser tracker, to the vehicle, then through an articulated and multi stage telescopic boom to the active target (smart track sensor) mounted on the laying head. This cable requires multiple plug and socket connectors for assembly and maintenance purposes.

Laser Tracker and Active Targets systems are supplied as a complete system from end to end with dedicated cables and controls and a single interface to external equipment. These systems obtain input from a multitude of sensors such as air temperature, humidity as well as the encoders, interferometer and ADM (Automated Distance Meter) and internal temperature sensors. The current manufacturers desire to manage their control system internally and preserve their control and calibration algorithms as intellectual property embedded within internal software.

The Leica AT960XR laser tracker is available with an Ethercat option to connect it to an industrial fieldbus network. This allows the laser tracker to provide data to the control network; however, the AT960XR requires a separate dedicated cable to connect it to a Tmac active target.

The API Omnitrac and API Radian trackers are available with a wireless communication connection to their dedicated control PC. However this wireless connection introduces a time delay or latency which makes the tracker useless as a feedback sensor to control real time dynamic motion. If the API Omnitrac or Radian is hard wired to a dedicated tracker control PC, this dedicated tracker control PC must then be connected to the machine control PC and these additional connections introduce a small communication overhead and a small latency, which whilst not ideal is acceptable for the real time control of compensated motion such as for the applicant's brick laying machine.

On some machines, it is desirable or necessary to use multiple laser trackers and or multiple active targets. In this case multiple dedicated cables must be used to connect the components. This adds significant undesirable plugs, cables, weight, and cost and reduces reliability (which is inversely proportional to amount of cable and number of plugs).

SUMMARY OF THE PRESENT INVENTION

In one broad form, an aspect of the present invention seeks to provide a system for performing interactions within a physical environment, the system including: a robot having: a robot base that undergoes movement relative to the environment; a robot arm mounted to the robot base, the robot arm including an end effector mounted thereon for performing said interactions; a communications system including a fieldbus network; a tracking system including: a tracking base positioned in the environment and connected to the fieldbus network; and, a tracking target mounted to a component of the robot, wherein the tracking base is configured to detect the tracking target to allow a position and/or orientation of the tracking target relative to the tracking base to be determined; and, a control system that: communicates with the tracking system via the fieldbus network to determine the position and/or orientation of the tracking target relative to the tracking base; and, controls the robot arm in accordance with the position and/or orientation of the tracking target relative to the tracking base.

In one embodiment the fieldbus network is further coupled to: robot arm actuators; a robot base actuator one or more end effector actuators; and, one or more sensors.

In one embodiment the communications system includes: a fieldbus master; and, one or more fieldbus slaves connected to the fieldbus master.

In one embodiment the control system is connected to the fieldbus network as a fieldbus master and wherein the tracking system is connected to the fieldbus network as at least one fieldbus slave.

In one embodiment the tracking system is a laser tracking system.

In one embodiment: the tracking base includes: a tracking head having: a radiation source arranged to send a radiation beam to the tracking target; a base sensor that senses reflected radiation; and, head angle sensors that sense an orientation of the tracking head; and, the tracking target includes a reflector that reflects the radiation beam to the tracking base.

In one embodiment the control system: receives sensor data from the tracking base indicative of measurements from the base sensor and head angle sensors via the fieldbus network; and, determines the position and/or orientation of the tracking target relative to the tracking base using the sensor data.

In one embodiment for every clock cycle of the control system, the control system: receives the sensor data from the tracking base; determines the position and/or orientation of the tracking target; and sends control signals to the robot arm based at least in part on the determined position.

In one embodiment the tracking base includes at least one tracking head actuator that controls a tracking head orientation and wherein the control system controls the at least one tracking head actuator in response to movement of the tracking target so that the tracking head tracks the tracking target.

In one embodiment the tracking target is connected to the fieldbus network.

In one embodiment the tracking target is configured to track the tracking base.

In one embodiment at least one of the tracking base and tracking target are connected via the fieldbus network as fieldbus slaves.

In one embodiment the tracking target includes: a target sensor that senses the radiation beam; and, target angle sensors that sense an orientation of the target.

In one embodiment the control system: receives sensor data from the tracking target indicative of measurements from the target sensor and target angle sensors via the fieldbus network; and, determines the orientation of the tracking target relative to the tracking base using the sensor data.

In one embodiment for every clock cycle of the control system, the control system: receives the sensor data from the tracking target; determines the orientation of the tracking target; and sends control signals to the robot arm based at least in part on the determined orientation.

In one embodiment the tracking target includes at least one tracking target actuator that controls a tracking target orientation and wherein the control system controls the at least one tracking target actuator in response to movement of the tracking target so that the tracking target tracks the head of the tracking base.

In one embodiment the tracking system further includes a tracking system controller that is connected to the fieldbus network as a further fieldbus slave.

In one embodiment the tracking system controller uses data derived from signals from the one or more tracking base sensors and the one or more tracking target sensors to: control the tracking base and tracking target to perform mutual tracking; and, determine a position and/or orientation of the tracking target relative to the tracking base and wherein the tracking system controller communicates with at least one of the tracking base and tracking target via the fieldbus network.

In one embodiment the tracking system controller is provided in one of: the tracking base; the tracking target; and, a control box remote from the tracking system.

In one embodiment the tracking system controller: receives target sensor data; receives base sensor data indicative of: an orientation of the tracking head; and, a distance between the target and the tracking base; calculates a position and orientation of the tracking target relative to the tracking base using the base sensor data and the target sensor data; and, provides position and orientation data indicative of the target position and orientation to the control system via the fieldbus network.

In one embodiment operation of the tracking system and control system are time synchronised via the fieldbus network.

In one embodiment the tracking system measures the target position and/or orientation with a frequency that is at least one of: at least 10 Hz; at least 20 Hz; at least 30 Hz; at least 100 Hz; at least 300 Hz; at least 1 kHz; at least 2 kHz; and, at least 10 kHz.

In one embodiment the tracking system measures the target position with an accuracy that is at least one of: better than 10 mm better than 2 mm; better than 1 mm; better than 0.2 mm; better than 0.02 mm; better than 0.01 mm; and, better than 5 μm.

In one embodiment the control system operates with a frequency that is at least one of: at least 10 Hz; at least 20 Hz; at least 30 Hz; at least 100 Hz; at least 300 Hz; at least 1 kHz; at least 2 kHz; and, at least 10 kHz.

In one embodiment the control system and tracking system operate at the same frequency.

In one embodiment communications between the control system and tracking system via the fieldbus network have a latency that is at least one of: less than 100 ms; less than 10 ms; less than 5 ms; less than 2 ms; and, less than 1 ms.

In one embodiment a latency between measuring the target position and/or orientation and controlling at least the robot arm in response to the measurements is at least one of: less than 100 ms; less than 20 ms; less than 15 ms; less than 10 ms; less than 5 ms; and, less than 1 ms.

In one embodiment the tracking system measures an orientation of at least one of a tracking head and tracking target with an accuracy that is at least one of: better than 1 degree; better than 0.1 degree; better than 0.01 degree; better than 0.002 degree; better than 0.001 degree; and, better than 0.0001 degree.

In one embodiment the tracking system measures the target position and/or orientation throughout a working envelope having a radius of: at least 2 m; at least 5 m; at least 10 m; at least 20 m; at least 40 m; and at least 80 m.

In one embodiment the robot arm is capable of positioning the end effector with an accuracy that is at least one of: better than 2 mm; better than 1 mm; better than 0.2 mm; better than 0.02 mm; better than 0.01 mm; and, better than 5 μm.

In one embodiment the robot arm is capable of moving the end effector at a velocity that is at least one of: greater than 0.01 ms$^{-1}$; greater than 0.1 ms$^{-1}$; greater than 0.5 ms$^{-1}$; greater than 1 ms$^{-1}$; greater than 2 ms$^{-1}$; greater than 5 ms$^{-1}$; and, greater than 10 ms$^{-1}$.

In one embodiment the robot arm is capable of accelerating the end effector at an acceleration that is at least one of: greater than 1 ms$^{-2}$; greater than 10 ms$^{-2}$; and; greater than 20 ms$^{-2}$.

In one embodiment the robot base is a movable robot base, and the system includes a robot base actuator that moves the robot base relative to the environment.

In one embodiment the robot base actuator is capable of positioning the robot base with an accuracy that is at least one of: up to 1000 mm; better than 500 mm; better than 200 mm; better than 100 mm, better than 10 mm; and, better than 1 mm.

In one embodiment the robot base actuator is capable of moving the robot base at a velocity that is at least one of: greater than 0.001 ms$^{-1}$; greater than 0.01 ms$^{-1}$; greater than 0.1 ms$^{-1}$ and, greater than 1 ms$^{-1}$.

In one embodiment the robot base actuator is capable of moving the robot base at an acceleration that is at least one of: greater than 0.1 ms$^{-2}$; greater than 1 ms$^{-2}$ and, greater than 10 ms$^{-2}$.

In one embodiment the system includes an active damping system that actively damps movement of the robot base relative to the environment.

In one embodiment a latency between measuring the position and/or orientation of the target and activating the active damping system is at least one of: less than 100 ms; less than 20 ms; less than 15 ms; less than 10 ms; less than 5 ms; and, less than 1 ms.

In one embodiment the system implements stabilisation control to provide the end effector at a destination in the environment while the robot base undergoes movement relative to the environment, and wherein the stabilisation control can compensate for movement of the robot base relative to the environment that is at least one of: at least 1 mm; at least 10 mm; at least 20 mm; at least 50 mm; at least 100 mm; at least 500 mm; at least 1000 mm and, at least 5000 mm.

In one embodiment the control system: calculates an end effector path extending to an end effector destination; generates robot control signals based on the end effector path; and, applies the robot control signals to the robot arm to cause the end effector to be moved in accordance with the end effector path.

In one embodiment the control system: determines a current robot base position using signals from the tracking system; and, generates robot control signals based on the end effector path and the current robot base position.

In one embodiment the control system calculates the end effector path in at least one of: an environment coordinate system; and, a robot base coordinate system.

In one embodiment the control system repeatedly: calculates a robot base deviation based on the robot base position and an expected robot base position; calculates a correction based on the robot base deviation, the correction being indicative of a path modification; and, generates control signals in accordance with the correction.

In one embodiment the control system: calculates robot arm kinematics using a current robot base position and the end effector path; and, generates robot control signals based on the end effector path and the calculated robot arm kinematics.

In one embodiment the current robot base position is indicative of an origin point of the robot arm kinematics and the robot base position is determined in an environment coordinate system thereby allowing the robot arm to be controlled in the environment coordinate system.

In one embodiment the control system repeatedly: calculates the end effector path based on the current robot base position; and, generates robot control signals based on the end effector path.

In one embodiment the control system calculates the end effector path at least in part using a reference robot base position indicative of at least one of: a current robot base position; a predicted robot base position based on movement of the robot base from a current robot base position; a predicted robot base position based on movement of the robot base along a robot base path; and, an intended robot base position when end effector reaches the end effector destination.

In one embodiment the control system generates the robot control signals taking into account at least one of: an end effector velocity profile; robot dynamics; and, robot kinematics.

In one embodiment the control system includes a computer numerical control system.

In one embodiment the control system at least one of: repeats steps for processing cycles of the control system; repeats steps for consecutive processing cycles of the control system; and, repeats steps based on a refresh rate of the tracking system.

In one embodiment the robot base includes a head mounted to a boom.

In one embodiment the boom is attached to a vehicle.

In one embodiment the system is used for at least one of: positioning objects or material in the environment; retrieving objects or material from the environment; and, modifying objects or material in the environment.

In one embodiment the environment is at least one of: a building site; a construction site; and, a vehicle.

In one embodiment the fieldbus network is at least one of a wired and wireless network.

In one embodiment the tracking system communicates with the control system over a 5G wireless fieldbus network.

In one broad form, an aspect of the present invention seeks to provide a method for performing interactions within a physical environment using a system including a robot having: a robot base that undergoes movement relative to the environment; a robot arm mounted to the robot base, the robot arm including an end effector mounted thereon for performing said interactions; a communications system including a fieldbus network; a tracking system including: a tracking base positioned in the environment and connected to the fieldbus network; and, a target mounted to a component of the robot, wherein at least the tracking base is configured to track the target as the robot moves to allow a position and/or orientation of the target relative to the tracking base to be determined and wherein the method includes in a control system: communicating with the tracking system via the fieldbus network to determine the position and/or orientation of the target relative to the tracking base; and, controlling the robot arm in accordance with the position and/or orientation of target relative to the tracking base.

In one broad form, an aspect of the present invention seeks to provide a computer program product including computer executable code, which when executed by a suitably programmed control system causes the control system to control a system for performing interactions within a physical environment, the system including a robot having: a robot base that undergoes movement relative to the environment; a robot arm mounted to the robot base, the robot arm including an end effector mounted thereon for performing said interactions; a communications system including a fieldbus network; a tracking system including: a tracking base positioned in the environment and connected to the fieldbus network; and, a target mounted to a component of the robot, wherein at least the tracking base is configured to track the target as the robot moves to allow a position and/or orientation of the target relative to the tracking base to be determined and wherein the control system: communicates with the tracking system via the fieldbus network to determine the position and/or orientation of the target relative to the tracking base; and, controls the robot arm in accordance with the position and/or orientation of the target relative to the tracking base.

In one broad form, an aspect of the present invention seeks to provide a robot system having a base with an extendable translatable robotic arm with an end effector, a laser tracker located spaced away from said base to selectably optically connect with an active target located proximal to said end effector, to allow the laser tracker to measure the position and optionally the orientation of the active target, a fieldbus network having fieldbus network cabling extending from and connecting drives, actuators and sensors in said end effector, and connecting drives, actuators and sensors in said active target, said fieldbus network cabling extending along said robotic arm and connecting actuators and sensors therealong, said fieldbus network cabling extending to said base and connecting drives, actuators and sensors therein, and said fieldbus network cabling extending beyond said base to connect to drives, actuators and sensor in said laser tracker, and a fieldbus control system communicating via said fieldbus network cabling to said drives, actuators and sensors.

In one embodiment said active target is located close to the base of said end effector, or on said end effector.

In one embodiment there is more than one said active target, so that said laser tracker is able to optically connect with a said active target in any pose of said end effector.

In one embodiment said robot system includes more than one said laser tracker.

In one embodiment the components comprising the laser trackers and active targets are incorporated as fieldbus slaves.

In one embodiment the fieldbus network cabling also supplies power to the components so that communication and power are in a single cable.

In one embodiment actuator control algorithms are implemented as library code executed by the fieldbus control system, so that the laser tracker and active target are tightly integrated into the fieldbus control system so that there is minimal latency of no more than one control cycle between sensor measurements and actuator machine axis compensation control.

It will be appreciated that the broad forms of the invention and their respective features can be used in conjunction and/or independently, and reference to separate broad forms is not intended to be limiting.

BRIEF DESCRIPTION OF THE DRAWINGS

Various examples and embodiments of the present invention will now be described with reference to the accompanying drawings, in which:—

DETAILED DESCRIPTION OF THE PREFERRED EMBODIMENTS

Figure 1A:
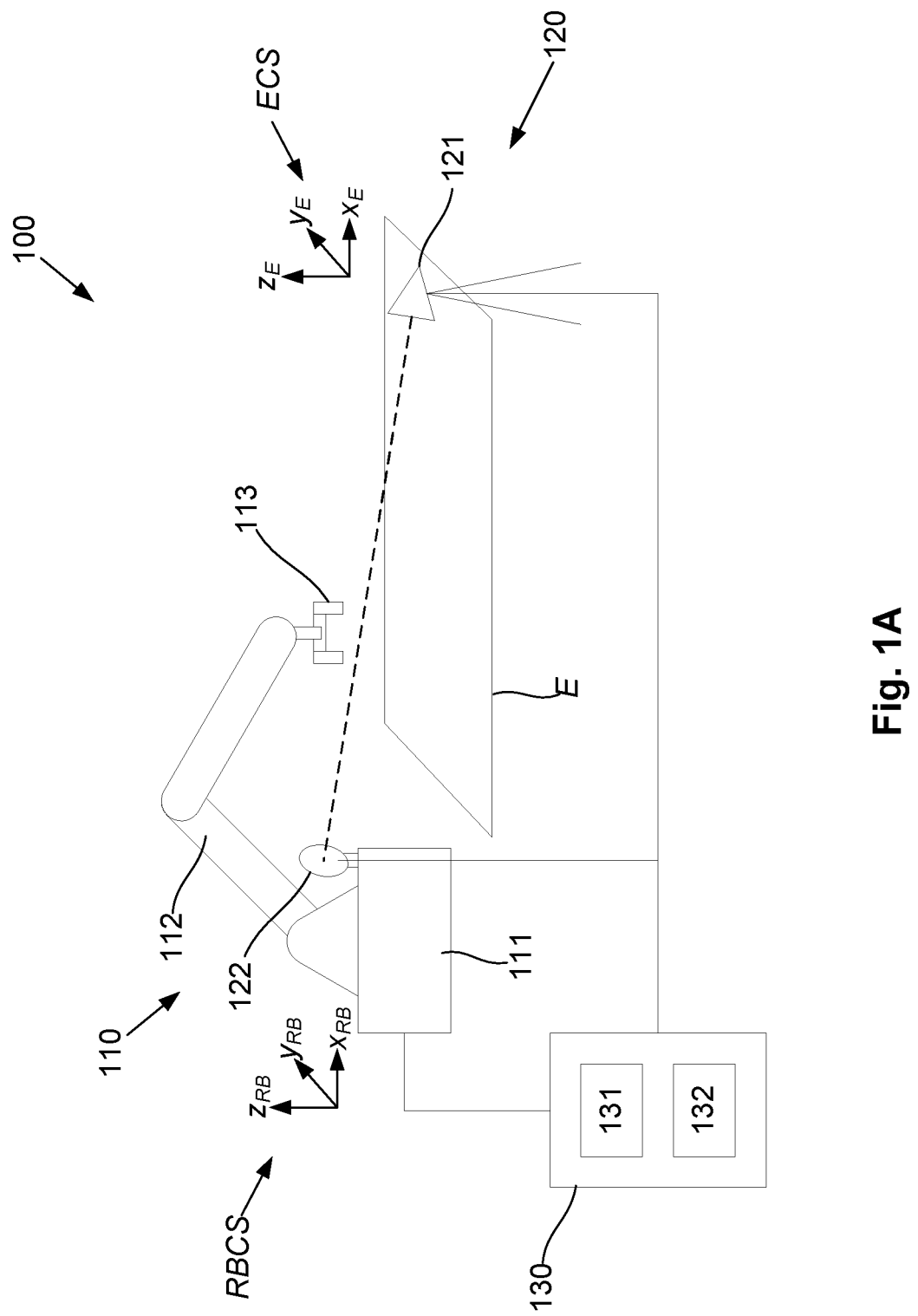
FIG. 1A is a schematic diagram illustrating a first example of a system for performing interactions within a physical environment.

The following description explains a number of different systems and methods for performing interactions within an environment. For the purpose of illustration, the following definitions apply to terminology used throughout.

The term "interaction" is intended to refer to any physical interaction that occurs within, and including with or on, an environment. Example interactions could include placing material or objects within the environment, removing material or objects from the environment, moving material or objects within the environment, modifying, manipulating, or otherwise engaging with material or objects within the environment, modifying, manipulating, or otherwise engaging with the environment, or the like. Further examples of interactions will become apparent from the following description, and it will be appreciated that the techniques could be extended to a wide range of different interactions, and specified examples are not intended to be limiting. Furthermore, in some examples, interactions may comprise one or more distinct steps. For example, when brick laying, an interaction could include the steps of retrieving a brick from a brick supply mechanism and then placing the brick in the environment.

The term "environment" is used to refer to any location, region, area or volume within which, or on which, interactions are performed. The type and nature of the environment will vary depending on the preferred implementation and the environment could be a discrete physical environment, and/or could be a logical physical environment, delineated from surroundings solely by virtue of this being a volume within which interactions occur. Non-limiting examples of environments include building or construction sites, parts of vehicles, such as decks of ships or loading trays of lorries, factories, loading sites, ground work areas, or the like, and further examples will be described in more detail below.

A robot arm is a programmable mechanical manipulator. In this specification a robot arm includes multi axis jointed arms, parallel kinematic robots (such as Stewart Platform, Delta robots), spherical geometry robots, Cartesian robots (orthogonal axis robots with linear motion) etc.

A boom is an elongate support structure such as a slewing boom, with or without stick or dipper, with or without telescopic elements, telescoping booms, telescoping articulated booms. Examples include crane booms, earthmover booms, truck crane booms, all with or without cable supported or cable braced elements. A boom may also include an overhead gantry structure, or cantilevered gantry, or a controlled tensile truss (the boom may not be a boom but a multi cable supported parallel kinematics crane (see PAR systems, Tensile Truss-Chernobyl Crane)), or other moveable arm that may translate position in space.

An end effector is a device at the end of a robotic arm designed to interact with the environment. An end effector may include a gripper, nozzle, sand blaster, spray gun, wrench, magnet, welding torch, cutting torch, saw, milling cutter, router cutter, hydraulic shears, laser, riveting tool, or the like, and reference to these examples is not intended to be limiting.

TCP is an abbreviation of tool centre point. This is a location on the end effector (or tool), whose position and orientation define the coordinates of the controlled object. It is typically located at the distal end of the kinematic chain. Kinematic chain refers to the chain of linkages and their joints between the base of a robot arm and the end effector.

CNC is an abbreviation for computer numerical control, used for automation of machines by computer/processor/microcontroller executed pre-programmed sequences of machine control commands.

The application of coordinate transformations within a CNC control system is usually performed to allow programming in a convenient coordinate system. It is also performed to allow correction of workpiece position errors when clamped in a vice or fixture on a CNC machining centre.

These coordinate transformations are usually applied in a static sense to account for static coordinate shifts or to correct static errors.

Robots and CNC machines are programmed in a convenient Cartesian coordinate system, and kinematic transformations are used to convert the Cartesian coordinates to joint positions to move the pose of the robot or CNC machine.

Measuring the position of a robot arm end effector close to the TCP in real time increases the accuracy of a robot.

This is performed on static end effectors on robots used for probing and drilling. This is achieved by a multi-step process of moving to the programmed position, taking a position measurement, calculating a correction vector, adding the compensation vector to the programmed position and then moving the TCP to the new position. This process is not done in hard real time and relies on a static robot arm pose.

Examples of systems for performing interactions within physical environments will now be described with reference to FIGS. 1A to 1C and FIG. 2.

In the example of FIG. 1A the system 100 includes a robot and in particular, a robot assembly 110 including a robot base 111, a robot arm 112 and an end effector 113. The robot assembly 110 is positioned relative to an environment E, which in this example is illustrated as a 2D plane, but in practice could be a 3D volume of any configuration. In use, the end effector 113 is used to perform interactions within the environment E, for example to perform bricklaying, object manipulation, or the like.

The system 100 also includes a tracking system 120, which is able to track the robot assembly movement, and in one particular example, movement of the robot base relative to the environment. In one example, the tracking system includes a tracker base 121, which is typically statically positioned relative to the environment E and a tracker target 122, mounted on the robot base 111, allowing a position of the robot base 111 relative to the environment E to be determined. In other examples, the tracker target may be positioned on another part of the robot assembly 110, including for example on a robot component, such as the robot arm 112 or end effector 113 so that the position of at least part of the robot is measured.

In one example, the tracking system 120 includes a tracking base 121 including a tracker head having a radiation source arranged to send a radiation beam to the target 122 and a base sensor that senses reflected radiation. A base tracking system is provided which detects a position and/or orientation of the target 122 and controls an orientation of the tracker head to follow the target 122. In one example, the target 122 typically includes a target sensor that senses the radiation beam and a target tracking system that tracks a position of the tracking base and controls an orientation of the target to follow the tracker head, although as will be described in more detail below, this might not be required in the event that a passive target is used. Angle sensors are provided in the head and optionally the target that determine an orientation of the head and target respectively. A processing system determines a position of the target relative tracking base in accordance with signals from the sensors, specifically using signals from the angle sensors to determine relative angles of the tracker and target, whilst time of flight of the radiation beam can be used to determine a physical separation (e.g. distance). In a further example, the radiation beam can be polarised in order to allow an orientation (e.g. roll angle) of the target relative to the tracking head to be determined. Although a single tracking system 120 including a head and target is shown, this is not essential and in other examples multiple tracking systems and/or targets can be provided as will be described in more detail below.

In the above described example, use of an active target capable of following the tracking base is described. This is however not essential and in other arrangements the target is passive and may comprise a retroreflector such as a spherical mounted retroreflector (SMR) that is mounted to the robot.

In one particular example, the tracking system is a laser tracking system and example arrangements are manufactured by API (Radian and OT2 with STS (Smart Track Sensor)), Leica (AT960 and Tmac) and Faro. These systems measure position at 300 Hz, or 1 kHz or 2 kHz (depending on the equipment) and rely on a combination of sensing arrangements, including laser tracking, vision systems using 2D cameras, accelerometer data such as from a tilt sensor or INS (Inertial navigation System) and can be used to make accurate position measurements, with data obtained from the laser tracker and active target equating to position and optionally orientation of the active target relative to the environment E. As such systems are known and are commercially available, these will not be described in any further detail.

It will also be appreciated that other position/movement sensors, such as an inertial measurement unit (IMU) can also be incorporated into the system, as will be described in more detail below.

A control system 130 is provided in communication with the tracking system 120 and the robot assembly 110 allowing the robot assembly to be controlled based on signals received from the tracking system. The control system typically includes one or more control processors 131 and one or more memories 132. For ease of illustration, the remaining description will make reference to a processing device and a memory, but it will be appreciated that multiple processing devices and/or memories could be used, with reference to the singular encompassing the plural arrangements. In use the memory stores control instructions, typically in the form of applications software, or firmware, which is executed by the processor 131 allowing signals from the tracking system 120 and robot assembly 110 to be interpreted and used to control the robot assembly 110 to allow interactions to be performed.

Figure 2:
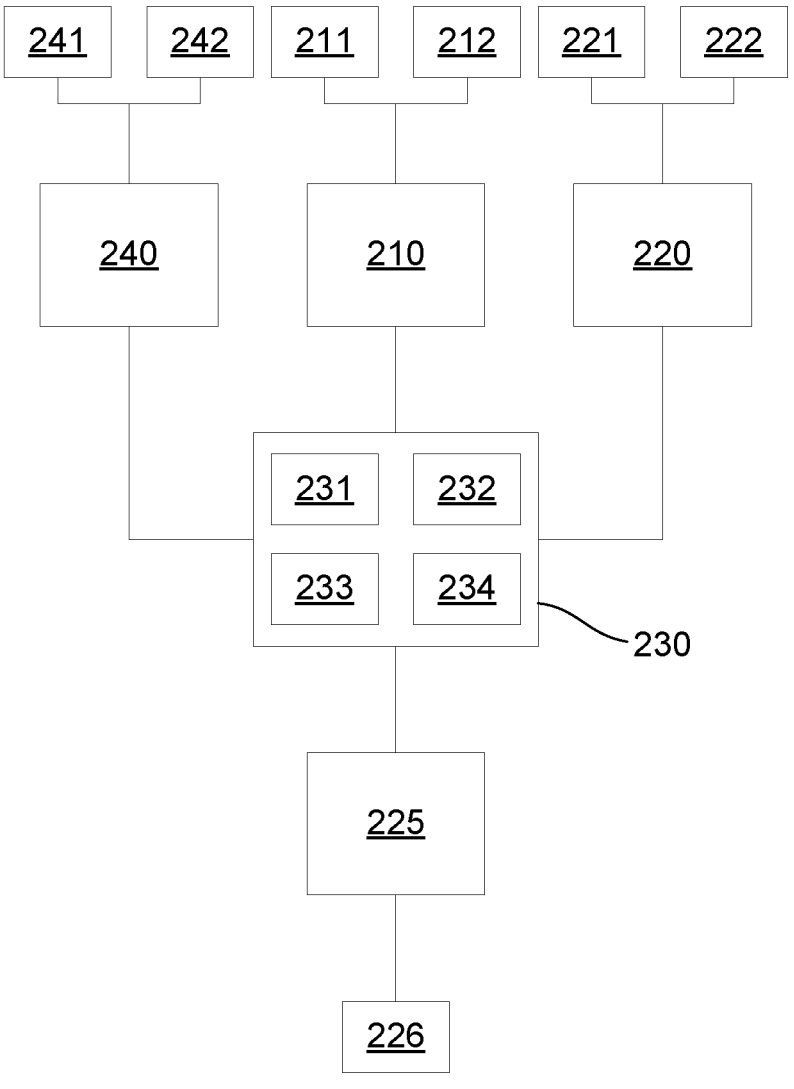
FIG. 2 is a schematic diagram of an example of a control system for the systems of FIGS. 1A to 1C.

An example of the control system 130 is shown in more detail in FIG. 2.

In this example the control system 230 is coupled to a robot arm controller 210, a tracking system controller 220 and a boom controller 240. The robot arm controller 210 is coupled to a robot arm actuator 211 and end effector actuator 212, which are able to control positioning of the robot arm 112 and end effector 113, respectively. The tracking system controller 220 is coupled to the tracking head 221 and target 222, allowing the tracking system to be controlled and relative positions of the tracking head 221 and target 222 to be ascertained and returned to the control system 230. The boom controller 240 is typically coupled to boom actuators 241, 242 which can be used to position the boom and hence robot base. A second tracking system may also be provided, which includes sensors 226, such as inertial sensors, coupled to a controller 225. It is to be understood that in practice the robot arm, end effector and boom will have multiple actuators such as servo motors, hydraulic cylinders and the like to effect movement of their respective axes (i.e. joints) and reference to single actuators is not intended to be limiting.

Each of the robot arm controller 210, tracking system controller 220, second tracking system controller 225 and boom controller 240 typically include electronic processing devices, operating in conjunction with stored instructions, and which operate to interpret commands provided by the control system 230 and generate control signals for the respective actuators and/or the tracking system and/or receive signals from sensors and provide relevant data to the control system 230. The electronic processing devices could include any electronic processing device such as a microprocessor, microchip processor, logic gate configuration, firmware optionally associated with implementing logic such as an FPGA (Field Programmable Gate Array), or any other electronic device, system or arrangement. It will be appreciated that the robot arm controller 210, tracking system controller 220 and boom controller 240 typically form part of the boom assembly, robot assembly and tracking system, respectively. As the operation of such systems would be understood in the art, these will not be described in further detail.

The control system 230 typically includes an electronic processing device 231, a memory 232, input/output device 233 and interface 234, which can be utilised to connect the control system 230 to the robot arm controller 210, tracking system controller 220 and boom controller 240. Although a single external interface is shown, this is for the purpose of example only, and in practice multiple interfaces using various methods (e.g. Ethernet, serial, USB, wireless or the like) may be provided.

In use, the processing device 231 executes instructions in the form of applications software stored in the memory 232 to allow the required processes to be performed. The applications software may include one or more software modules, and may be executed in a suitable execution environment, such as an operating system environment, or the like.

Accordingly, it will be appreciated that the control system 230 may be formed from any suitable processing system, such as a suitably programmed PC, computer server, or the like. In one particular example, the control system 230 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

It will also be appreciated that the above described arrangements are for the purpose of illustration only and practice a wide range of different systems and associated control configurations could be utilised.

For the purpose of the following examples, reference will be made to an environment coordinate system ECS, which is static relative to the environment E, and a robot base coordinate system RBCS, which is static relative to the robot base 111. Additionally, some examples will make reference to a robot base actuator coordinate system BACS, which is a coordinate system used to control movement of the robot base, for example to control movement of the boom assembly.

In practice, in the above described examples, the robot base 111 undergoes movement relative to the environment E. The nature of the movement will vary depending upon the preferred implementation. For example, the robot base 111 could be static, with the environment E moving. A good example of this is when a robot arm is provided on a dock and is attempting to interact with objects present on the deck of a boat, which is undergoing movement relative to the dock. However, it will be appreciated that similar relative movement will arise in a range of different circumstances.

Figure 1B:
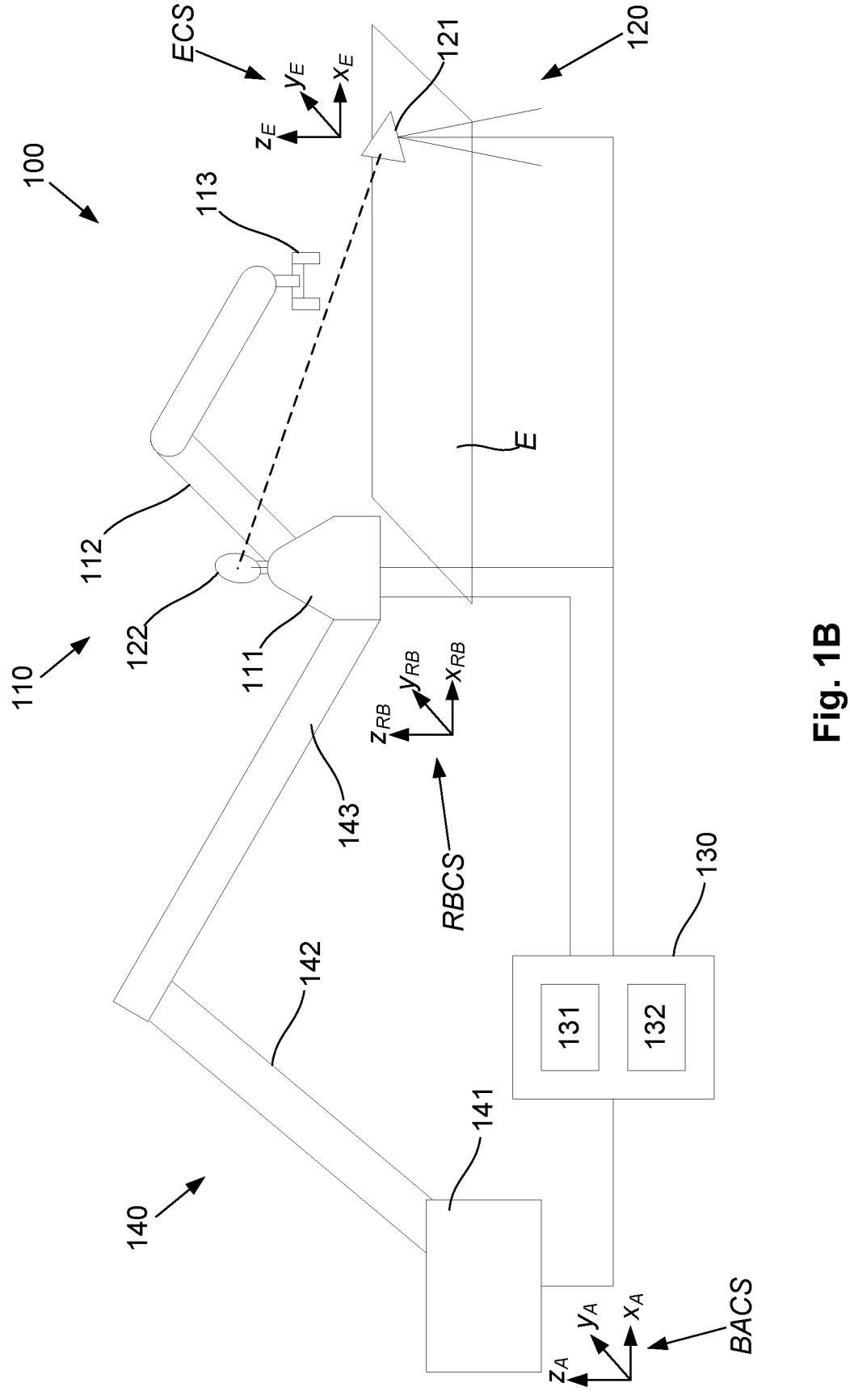
FIG. 1B is a schematic diagram of a second example of a system for performing interactions within a physical environment.
Figure 1C:
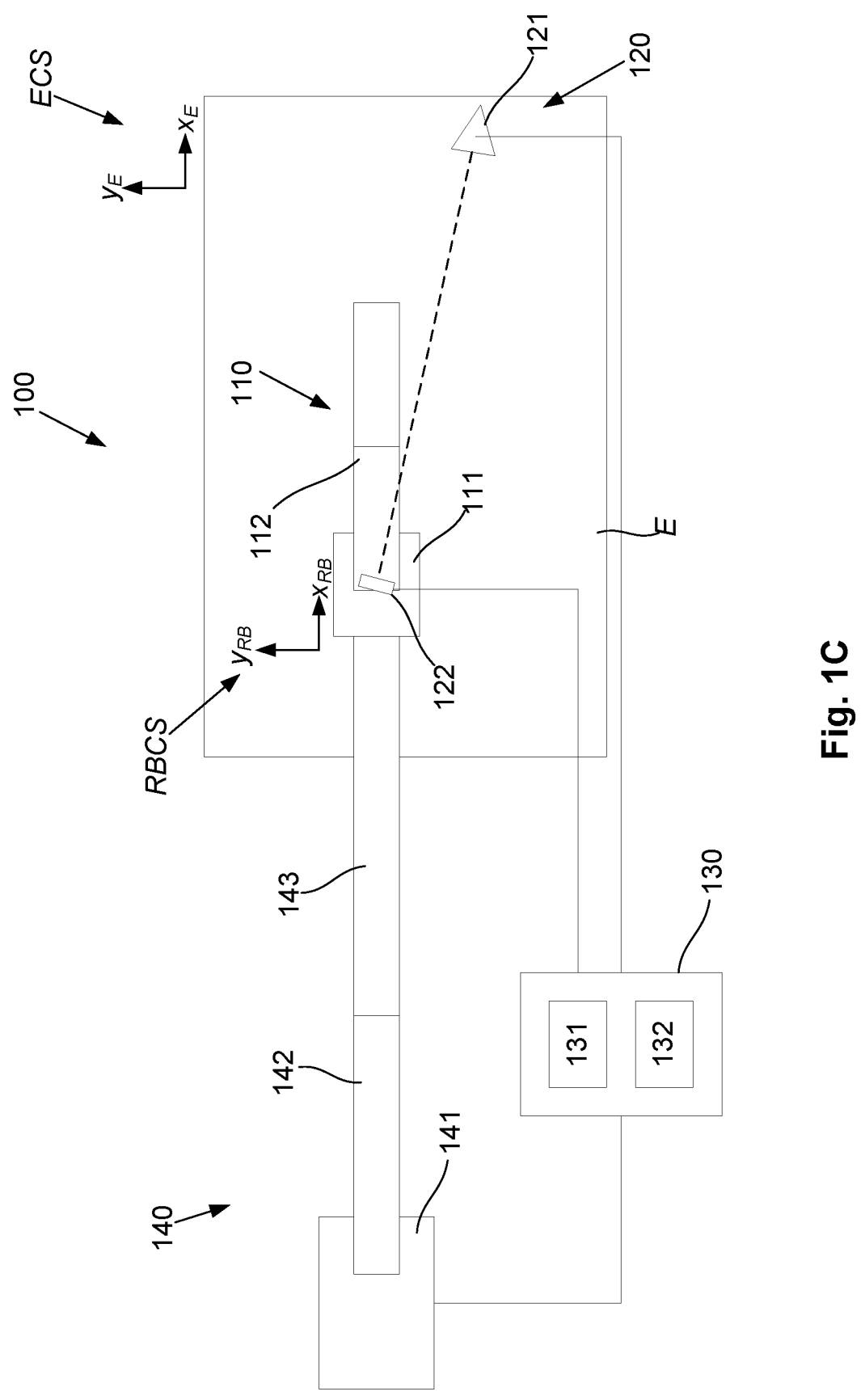
FIG. 1C is a schematic plan view of the system of FIG. 1B.

Alternatively, in the example shown in FIG. 1B, the robot base 111 is supported by a robot base actuator 140, which can be used to move the robot base. In this example, the robot base actuator is in the form of a boom assembly including a boom base 141, boom 142 and stick 143. The boom is typically controllable allowing a position and/or orientation of the robot base to be adjusted. The types of movement available will vary depending on the preferred implementation. For example, the boom base 141 could be mounted on a vehicle allowing this to be positioned and optionally rotated to a desired position and orientation. The boom and stick 142, 143 can be telescopic arrangements, including a number of telescoping boom or stick members, allowing a length of the boom or stick to be adjusted. Additionally, angles between the boom base 141 and boom 142, and boom 142 and stick 143, can be controlled, for example using hydraulic actuators, allowing the robot base 111 to be provided in a desired position relative to the environment E. Such operation is typically performed in the robot base actuator coordinate system BACS, although this is not essential as will become apparent from the remaining description.

An example of a system of this form for laying bricks is described in WO2018/009981 the content of which is incorporated herein by cross reference. It will be appreciated however that such arrangements are not limited to bricklaying, but could also be utilised for other forms of interactions.

Depending on the implementation, the boom assembly can have a significant length, so for example in the case of a construction application, the boom may need to extend across a construction site and could have a length of tens of meters. In such circumstances, the boom is typically subject to a variety of loads, including forces resulting from movement of the boom and/or robot arm, wind loading, machinery vibrations, or the like, which can in turn induce oscillations or other movement in the end of the boom, in turn causing the robot base to move relative to the environment. Such movement will be referred to generally as unintentional movement. Additionally, as described above, the robot base can be moved in a controlled manner by actively moving the boom and such movement will be referred to generally as intentional movement.

In any event, it will be appreciated that in both of the above described examples, the robot base and hence the robot base coordinate system RBCS moves relative to the environment and hence environment coordinate system ECS, which substantially complicates the control process, and in particular the ability of the end effector to be accurately positioned so as to perform an interaction within the environment. In this regard, in normal robot applications, the end effector is controlled in the robot base coordinate system RBCS, whilst the end effector needs to be positioned in the environment coordinate system ECS, and as the movement results in the two coordinate systems moving relative to each other, this makes accurately positioning the end effector difficult.

Figure 3:
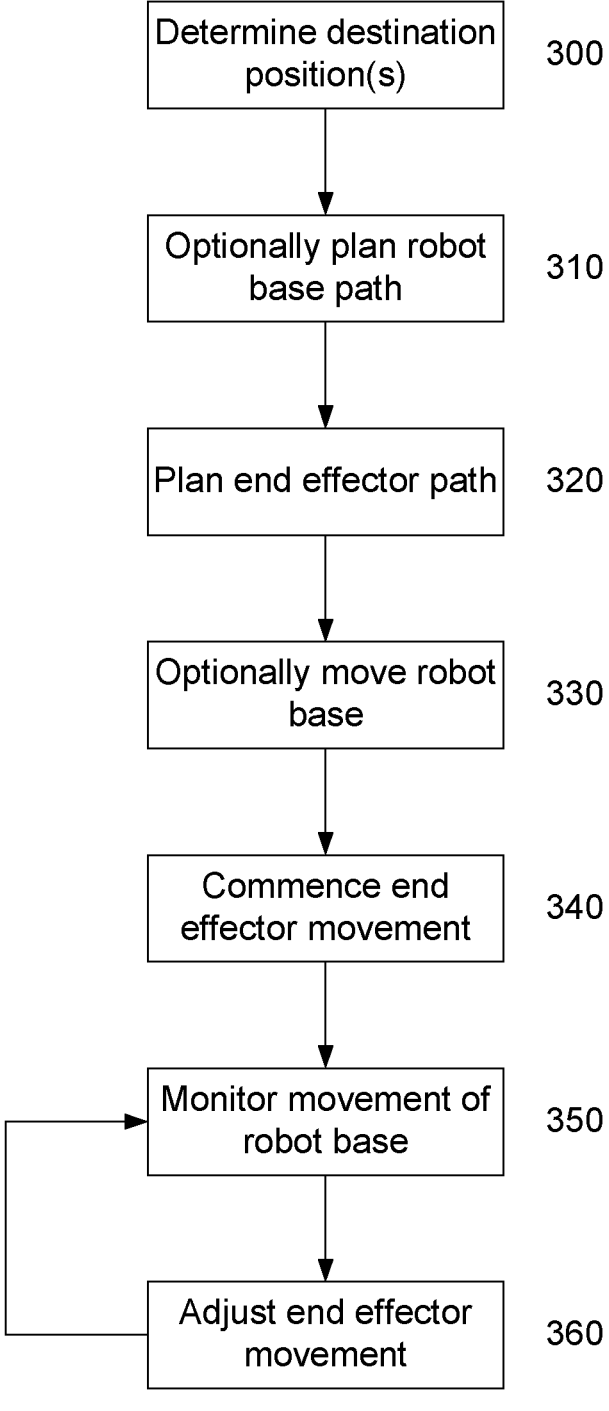
FIG. 3 is a flowchart of an example of a process for performing a physical interaction.

An example of the process for performing an interaction within the environment E will now be described with reference to FIG. 3.

For the purpose of the following explanation reference will be made to a term "destination". The term is intended to refer to a position and optionally orientation (in combination referred to as a pose) at which the end effector 113 is to be provided, either as part of performing an interaction or otherwise. For example, the destination could correspond to the location within the environment at which the interaction is to occur. However, this is not essential, alternatively the destination could correspond to any position through which the end effector should pass, in effect defining multiple destinations leading to a final destination. For example, an interaction may involve sequences of end effector movements, optionally forming part of different steps, and the term destination could refer to any position forming part of the different steps. Thus, the term destination should therefore be interpreted to refer to any particular point at which the end effector is to be positioned and in some examples, a destination could be a static point at which an end effector is to be maintained for a period of time for example while other processes are performed, whereas in other cases the destination could be transitory and correspond to a point on a path through which the end effector is to traverse.

In this example, one or more destination positions are determined at step 300. The manner in which this is achieved will vary depending on the preferred implementation. In one example, destinations can be retrieved from a database or other data store, received from another processing system, determined based on signals from sensors or user input commands, or the like. For example, end effector destinations could be derived from a plan, such as a construction plan for a building, in which case the plan could be retrieved and the destinations derived from the plan. In this regard, the construction plan may identify positions at which objects such as bricks are to be placed in order for a building to be constructed. In this example, the destination positions can simply be retrieved from the plan.

However, this is not essential and alternatively, destination positions may need to be ascertained in other manners. For example, it may be necessary to retrieve an object from an environment, in which case the destination of the end effector corresponds to the object position. In this example, the object position may not be known in advance, in which case the position of the object may need to be detected, for example using a camera based vision system, or other localisation system, allowing the detected position to be used in order to define the destination position. In this regard, the object could be static or moving, meaning whilst the destination is normally static relative to the environment coordinate system ECS, in some examples, the destination could be moving.

It will also be appreciated that destinations could be determined in other appropriate manners, and the above described examples are not intended to be restrictive.

At step 310, a robot base path to allow for movement of the robot base 111 is optionally planned. The robot base path may not be required, for example in the event that the robot base 111 is static or already positioned. However, it will be appreciated that the robot base path may be used to move the robot base 111 to different positions within or relative to the environment E, in order to allow the end effector 113 to be more conveniently provided at the respective destination. The manner in which the base path is calculated will vary depending upon the preferred implementation and examples will be described in more detail below.

At step 320, an end effector path is planned to move the end effector 113 to the destination. The end effector path is typically planned based on a planned position of the robot base 111 relative to the environment E, for example to take into account movement of the robot base 111 along the robot base path. The end effector path may extend from an expected previous position of an end effector 113, for example at the completion of a previous interaction or other step, or could be calculated in real time based on a current end effector position. It will be appreciated that in the event that the destination is based on a current position, the end effector path could be a null path with zero length, with this being used for the purpose of positioning the end effector 113 statically relative to the environment E.

At step 330, the robot base 111 is optionally moved based on the robot base path, for example by controlling the boom assembly 140, or another form of robot base actuator. This process is typically performed in the robot base actuator coordinate system BACS, although this is not essential and robot base path planning and/or control of robot base movement could be performed in other coordinate systems. During and/or following this process, the commencement of end effector movement is performed at step 340, causing the end effector to start moving along the end effector path, assuming this is required. This process is typically performed in the robot base coordinate system RBCS, although this is not essential and end effector path planning and/or control could be performed in other coordinate systems.

As movement of the end effector 113 is performed, or otherwise if the end effector 113 is being held at a static position relative to the environment E, movement of the robot base is monitored at step 350, using the tracking system 120 to continuously detect a position of the robot base 111 relative to the environment E. This is used to adjust end effector movement, for example by adjusting pose of robot arm, at step 360 to ensure the destination position is reached.

In this regard, the robot base may undergo unintentional movement relative to the environment E, either due to a shift in the environment, or due to an unexpected dynamic movement of the robot base, resulting from vibrations in or wind loading of the boom, thermal expansion, mechanical strain, dynamics (sway and bounce) caused by motion or the like. Such motions mean that the robot base may not be provided in an expected position relative to the environment, for example as a result of the robot base 111 deviating from the calculated robot base path. In this example, by monitoring movement of the robot base 111, such movements can be corrected for, ensuring that the end effector moves correctly along the end effector path to the destination position.

Thus, in one example, a robot base actuator is used to provide a coarse positioning system, whilst the robot arm provides a fine positioning system to allow an end effector to be accurately positioned relative to the environment. Operation is controlled by a control system that uses a tracking system to measure a position and optionally orientation of the robot base in real time, with a measured position (and orientation) of the robot base being used to calculate an offset that is added as a position transformation to the relative position of the fine positioning mechanism so that the end effector is positioned correctly relative to the environment. Thus a large and relatively light and flexible structure can be used to approximately position a fast and accurate fine positioning mechanism, which can be accurately controlled in real time allowing an end effector to be moved relative to an environment in an accurate and fast motion.

This form of operation is referred to by the applicant as dynamic stabilisation technology (DST) and is described in prior publications including WO2009/026641, WO2009/026642, WO2018/009981 and WO2018/009986, the contents of which are incorporated herein by cross reference.

It will also be appreciated that DST can also be used to account for intentional movement of the robot base, for example to account for the fact that the robot base 111 may be traversing a robot path whilst an interaction is performed.

An example of a number of different aspects of the above described system will now be described in further detail. These different aspects of the system can be used independently or can be used in conjunction depending on the preferred implementation. It will be appreciated from this that reference to separate aspects should not be considered limiting and that aspects can be used in any number of different combinations, depending on the preferred implementation and the scenario in which the system is used.

In one aspect, the above described system uses a fieldbus network to facilitate communication between the control system and tracking system, in particular to reduce cabling requirements and/or reduce latency and hence improve responsiveness.

In this example, the tracking base 121 and optionally tracking target 122 are at least partially connected to control system 130 via the fieldbus network to allow a position of the tracker target relative to the tracking base to be determined, with the control system 130 then controlling the robot arm in accordance with the position of the tracking target relative to the tracking base.

The use of the fieldbus network can provide advantages over existing systems. In this regard, as described previously, existing tracking systems require a connection between a tracker base and target in order to allow the position of the target relative to the tracker to be identified. Whilst such a connection can be provided wirelessly, this can suffer from drop-outs and latency issues. As dynamic stabilisation typically requires rapid responses to changes in the relative position of the robot base and environment, this makes such wireless connections generally unsuitable. Alternatively, dedicated wired connections can be used, but this in turn requires that additional wiring is provided extending across the work environment from the base to the, and in some cases, along a boom to a robot base or end effector. This creates logistical challenges, representing an additional potential point of failure, and also introduces latency, again making this less than ideal for dynamic stabilisation applications.

In contrast, the use of a fieldbus network enables existing network infrastructure, which is typically used for controlling actuators, such as robot arm, end effector and/or robot base actuators, and/or receiving signals from other sensors, avoids the need for additional wiring. Furthermore, such fieldbus networks can be configured to operate with minimal latency, making these ideal for dynamic stabilisation applications. A further benefit that can be achieved is that the use of a fieldbus network can allow operation of the control system and tracking system to be time synchronised, which can further help reduce latency issues, as will be described in more detail below.

A number of further features will now be described.

The nature of the fieldbus network will vary depending on the preferred implementation. In one example, the fieldbus network is implemented in accordance with the IEC61158 specification and example standards include AS-Interface, CAN, EtherCAT, FOUNDATION fieldbus, Interbus, LonWorks, Modbus, Profibus, BITBUS, CompoNet, SafetyBUS p, or RAPIEnet, although these are not intended to be limiting. In one preferred example, the fieldbus network is an EtherCAT network, which has the capability to allow messages to be passed between nodes, before the messages are processed in each node, allowing EtherCAT networks to operate at high speeds and efficiencies, as well as allowing for flexible topologies and time synchronization. For example, the EtherCAT networks specifically, and fieldbus networks more generally can be configured in accordance with any appropriate network topology, which could include daisy-chain, star, ring, branch, and/or tree network topologies, depending on the preferred implementation.

As mentioned above, in one particular example, the fieldbus network is also used to connect the control system to robot arm actuators, end effector actuators, robot base actuators and/or one or more sensors. A variety of different connection configurations could be employed and examples of these will now be described with reference to FIGS. 4A to 4C.

In these examples, similar reference numerals to those used in FIG. 2 are used to show similar features, albeit increased by 200, and these features will not therefore be described in further detail.

Furthermore, in these examples, it is assumed that the target system could be a passive or active target. In this regard, a passive target is a tracking target having a reflector, and in one particular example a spherical retro-reflector, that reflects the radiation beam to the tracking head sensor of the respective tracking head. By contrast, an active target includes a target sensor that senses a radiation beam from a respective tracking head and uses a target actuator to control an orientation of the target and a target angle sensor to monitor orientation of the target. For this reason, in FIGS. 4A to 4C an active tracking target 422 is shown in dotted lines to highlight that this might not be required in the event that the tracking target is passive.

Figure 4A:
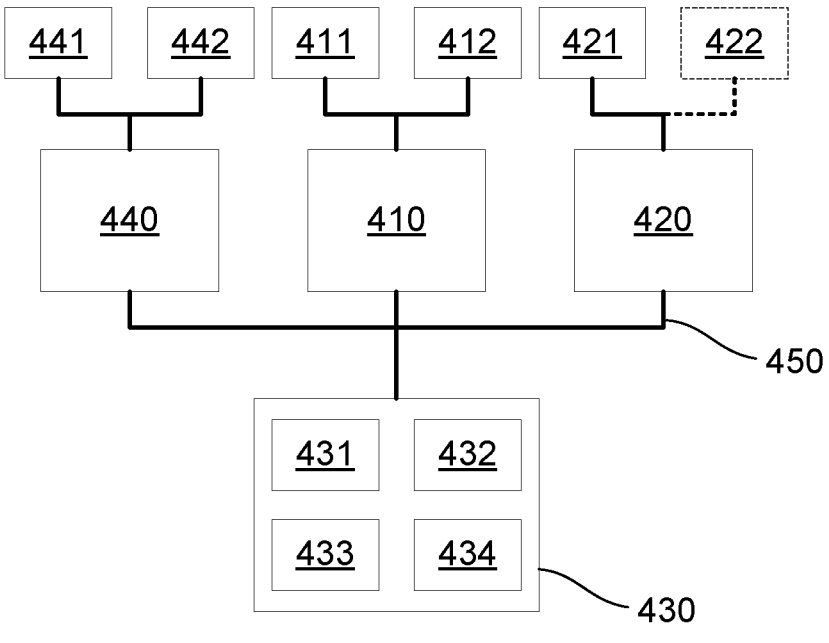
FIG. 4A is a schematic diagram of a first example of a control and communication system.

Accordingly, in the example of FIG. 4A, the tracking system is a laser tracking system including a tracking system controller 420 that uses data derived from signals from one or more tracking base sensors in the tracking base 421 and one or more tracking target sensors in the tracking target 422 to determine the relative position of the tracking base and target. The tracking system controller 420 communicates with either or both of the tracking base 421 or tracking target 422 via fieldbus network 450 depending on the configuration, so that for example the tracking base 421 or tracking target 422 could be interconnected via the tracking system controller 420.

The control system 430 is also connected to the robot arm controller 410, tracking system controller 420 and boom controller 440 via the fieldbus network 450, with these controllers then being coupled directly to the respective actuator 411, 412, 441, 442 and the tracking head 421 and target 422, also via the fieldbus network 450.

Figure 4B:
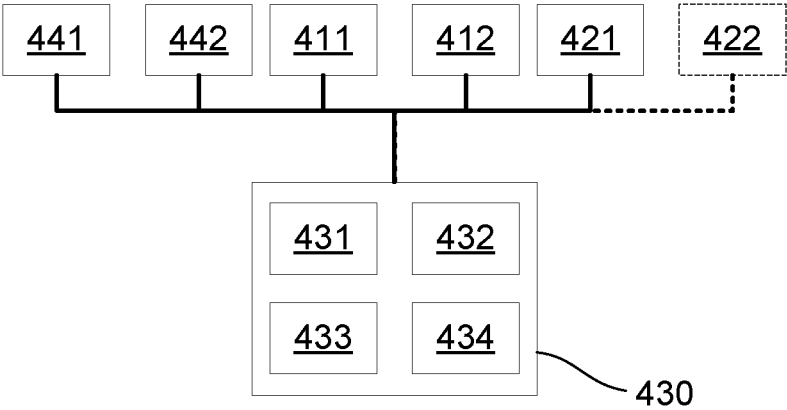
FIG. 4B is a schematic diagram of a second example of a control and communication system.

Alternatively, in the example of FIG. 4B, the control system 430 is connected directly to the actuators 411, 412, 441, 442 and the tracking head 421 and optionally target 422 via fieldbus network 450, with controller functionality being directly integrated into the control system 430.

Figure 4C:
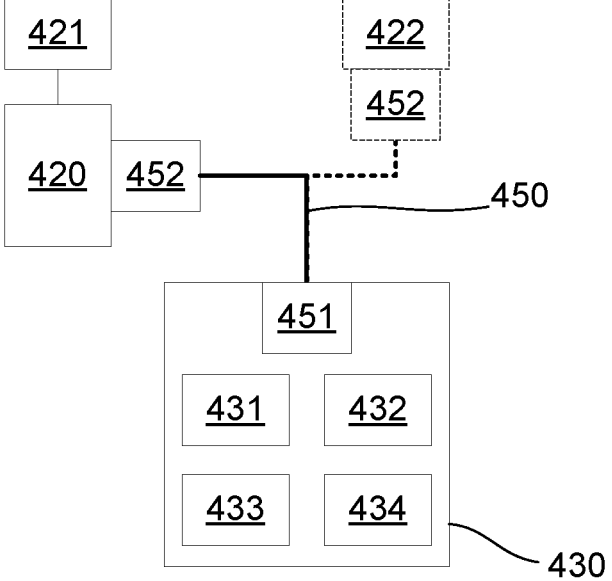
FIG. 4C is a schematic diagram of a third example of a control and communication system.

An example of a particular preferred configuration is shown in FIG. 4C.

In this example, the tracking system controller 420 is coupled to and/or forms part of the tracking base 421, whilst the tracking system controller 420, control system 430 and optionally tracking target 422 are connected via the fieldbus network 450. It will be appreciated that in this instance, the tracking system controller 420 is effectively integrated into the tracking base, but that this is not essential and in other examples, the tracking system controller 420 could be integrated into the tracking target 422.

Fieldbus networks typically include a fieldbus master and one or more fieldbus slaves connected to the fieldbus master via network cabling. Accordingly, in this example, the tracking system controller 420 and tracking target 422 typically include, or are connected to, fieldbus slave modules 452, whilst the control system 430 typically includes, or is connected to, a fieldbus master module 451. As a result, the control system 430 acts as a fieldbus master, whilst the tracking system controller 420 and tracking target 422 act as fieldbus slaves. In other examples, the tracking base 421 is connected to the fieldbus network as a fieldbus slave and the tracking system controller 420 may or may not be in the system as previously described.

Although not shown, it will be appreciated that the actuators 411, 412, 441, 442 and the robot arm and boom controllers 410, 440 are also typically connected as fieldbus slaves in a similar manner.

Figure 5:
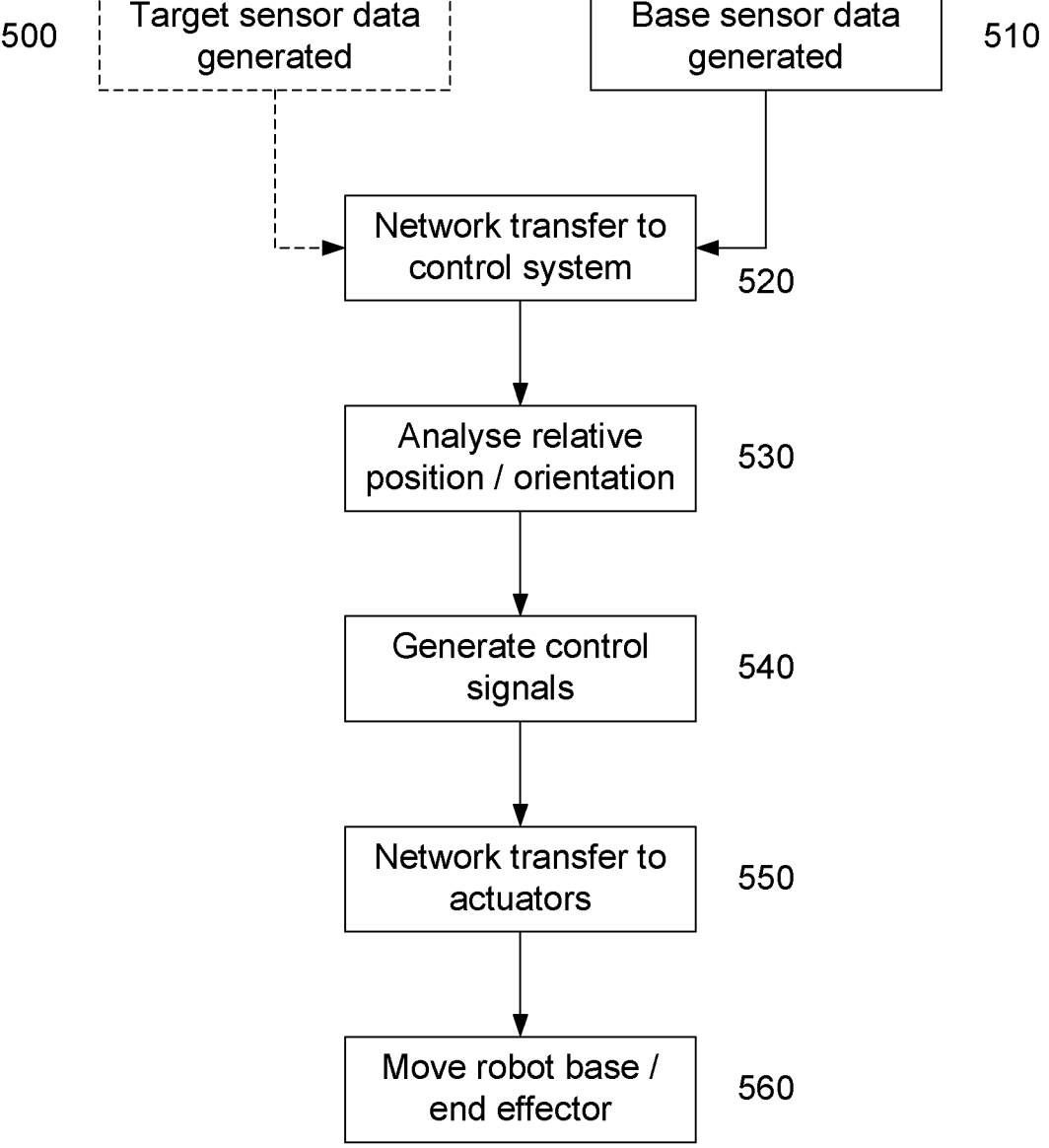
FIG. 5 is a flowchart of an example of a control and communication process for performing a physical interaction.

An example of operation of the above described arrangement will now be described in more detail with reference to FIG. 5.

In this example, at step 500, the target 422 optionally generates target sensor data indicative of an orientation of the target, assuming the target 422 is an active target. Simultaneously the tracking base 421 generates base sensor data indicative of an orientation of the base (e.g. elevation and azimuth angles to target) and distance between the tracking base 421 and target 422 at step 510.

Following this, data is communicated to the control system 430 via the fieldbus network. This can be achieved in a number of manners depending on the preferred implementation and the particular configuration of the system.

For example, if the tracking base 421 and target 422 are connected to a tracking system controller, then sensor data from the target 422 is typically transferred to the tracking system controller 420 via the fieldbus network, whilst sensor data from the tracking base is provided to the tracking system controller either via the fieldbus network in the case of FIG. 4A, or directly in the case of the FIG. 4C.

The tracking system controller 420 receives the base sensor data and target sensor data, using this to determine a position and/or orientation of the target relative to the base, which can then be provided to the control system 430. It will be appreciated that is achieved using known techniques, and generally represents standard operation of the tracking system, albeit with sensor data being received from the target via the fieldbus network, instead of via a direct connection.

However, this is not essential, and alternatively, raw data might be transferred to the control system, for example if the system is configured as set out in FIG. 4B, or if the tracking system controller 420 forwards the raw data to the control system 430, without analysis. In this instance, the control system 430 will analyse the raw data to determine the position and/or orientation of the target relative to the base. The ability for the control system to directly receive data input from the tracker base and/or target via the fieldbus network is advantageous as it further reduces system latency and allows measurement data input, processing and control output to occur every clock cycle of the control system. This is particularly beneficial for real time dynamic motion control applications.

At step 530 the control system 430 analyses the relative position and/or orientation and generates appropriate control signals at step 540. This will typically involve determining a position and/or orientation of the robot base and/or end effector relative to the environment, and then using this in conjunction with robot base and/or end effector paths to implement a dynamic stabilisation protocol and an example of this will be described in more detail below.

At step 550, the control signals are transferred to relevant actuators via the fieldbus network 450, allowing the robot base and/or end effector to be moved as required at step 560. It will be appreciated that this process will be repeated as needed, typically over successive processing cycles of the control system, allowing the end effector and/or robot base to be controlled as necessary in order to allow interactions to be performed.

In any event, it will be appreciated that the above described arrangements use a common fieldbus network to interconnect parts of the tracking system, acquire signals from the tracking system and provide control instructions to the actuators, such as robot base and/or robot arm actuators. This reduces the amount of physical wiring required, and/or can assist in reducing latency.

Accordingly, in one example, the control system receives sensor data from the tracking base indicative of measurements from the base sensor and head angle sensors via the fieldbus network and determines the position and/or orientation of the tracking target relative to the tracking base using the sensor data. In this case, for every clock cycle of the control system, the control system receives the sensor data from the tracking base, determines the position and/or orientation of the tracking target and sends control signals to the robot arm based at least in part on the determined position and/or orientation. The tracking base also typically includes at least one tracking head actuator that controls a tracking head orientation. In this case, the control system controls the at least one tracking head actuator in response to movement of the tracking target so that the tracking head tracks the tracking target.

In a further example, the tracking target can be connected to the fieldbus network, and optionally configured to track the tracking base. In this example, the tracking target includes a target sensor that senses the radiation beam and target angle sensors that sense an orientation of the target, in which case the control system receives sensor data from the tracking target indicative of measurements from the target sensor and target angle sensors via the fieldbus network and determines the orientation of the tracking target relative to the tracking base using the sensor data. In particular, for every clock cycle of the control system, the control system receives the sensor data from the tracking target, determines the orientation of the tracking target and sends control signals to the robot arm based at least in part on the determined orientation. The tracking target can also include at least one tracking target actuator that controls a tracking target orientation and wherein the control system controls the at least one tracking target actuator in response to movement of the tracking target so that the tracking target tracks the head of the tracking base.

The tracking base and/or tracking target can be connected via the fieldbus network as fieldbus slaves, either directly, or via a tracking system controller that is connected to the fieldbus network as a further fieldbus slave. The tracking system controller can use data derived from signals from the one or more tracking base sensors and the one or more tracking target sensors to control the tracking base and tracking target to perform mutual tracking and to determine a position and/or orientation of the tracking target relative to the tracking base and wherein the tracking system controller communicates with at least one of the tracking base and tracking target via the fieldbus network.

If provided, a tracking system controller can be provided the tracking base or tracking target, and coupled to the tracking target or tracking base via the fieldbus network. Alternatively, the tracking system controller could be provided in a control box remote from the tracking system and coupled to the tracking target and tracking base via the fieldbus network. Irrespective of the arrangement, the tracking system controller typically receives target sensor data and base sensor data indicative of an orientation of the tracking head and a distance between the target and the tracking base. The tracking system controller then calculates a position and orientation of the tracking target relative to the tracking base using the base sensor data and the target sensor data and provides position and orientation data indicative of the target position and orientation to the control system via the fieldbus network.

In addition to the processes described above, operation of the tracking system and control system are typically synchronised via the fieldbus network.

In one example, this is achieved using distributed clocks and associated clock regulators in the fieldbus slave modules. In this regard, the fieldbus master can send a system time signal to the fieldbus slaves, with the fieldbus slaves responding with an indication of the time of their own distributed clocks. The values are compared to determine any deviations, with the local distributed clocks being incremented or decremented as needed until the master and slave clocks are synchronised. This process can be repeated at periodic intervals in order to maintain synchronisation of the master and slave modules. The tracking system and control system are then slaved to the fieldbus system clock, ensuring operation of the control system and tracking system are time synchronised, which can result in a significant reduction in system latency. In another example, a particular fieldbus slave may be used as the reference clock (i.e. system time) to which the slave clocks of all other slave devices in the network and the fieldbus master synchronize.

Figures 6A, 6B:
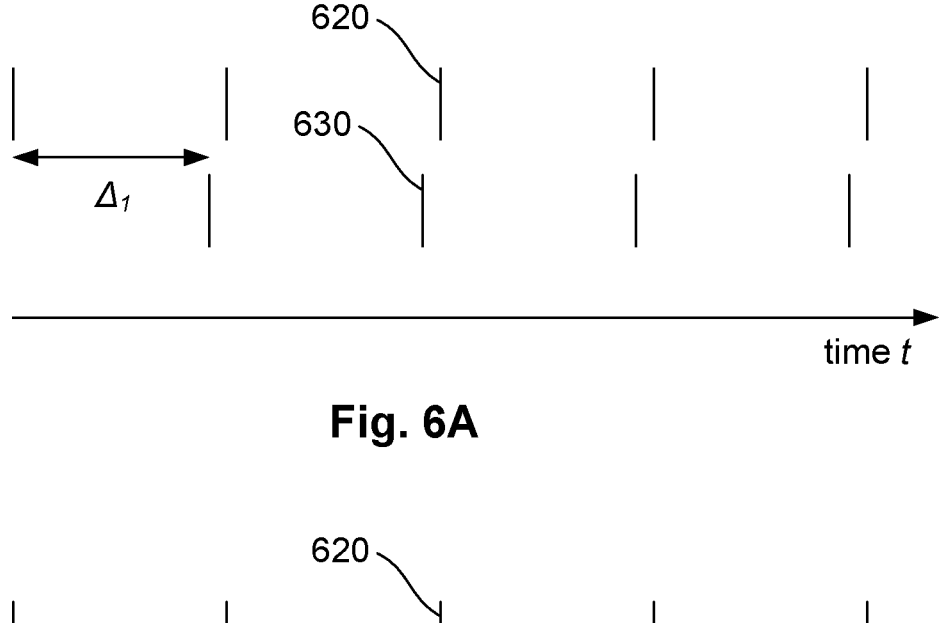
FIG. 6A is a schematic diagram illustrating a first example of relative timing of the tracking and control system.
FIG. 6B is a schematic diagram illustrating a second example of relative timing of the tracking and control system.

In this regard, as shown in FIG. 6A, if a tracking system clock 620 and control system clock 630 are out of sync, so that the tracking system clock precedes the control system clock, this can result in a delay 41 between a position being measured and the control system processing the measurement. Depending on the offset, this delay can be almost as great as a single clock cycle. Conversely, if synchronisation is correctly configured, this can result in a delay 42 which is vastly reduced, and far smaller than the clock cycle time, thereby reducing system latency.

According to one aspect, and in order to optimise responsiveness of the system, the system can operate in accordance with particular operational parameters. In particular, the operational parameters are selected to allow the end effector to be moved rapidly in response to dynamic movement of the robot base (e.g. oscillatory response to a disturbance such as wind loading or sway and bounce of the robot base structure due to acceleration and the like), so that the end effector can correct for unintentional relative movement between the robot base and the environment, thereby allowing the end effector to be accurately positioned within the environment. Thus, in one particular example, the end effector can provide a fast response to correct for slower movement of the robot base. Accordingly, dynamic compensation can be provided as opposed to a quasi-static correction due to static deflection and the like typically provided by modern industrial robots.

In one example, the tracking system measures the robot position with a frequency that is at least 10 Hz, at least 20 Hz, at least 30 Hz, at least 100 Hz, at least 300 Hz, at least 1 kHz, at least 2 kHz or at least 10 kHz and/or an accuracy that is better than 10 mm, better than 2 mm, better than 1 mm, better than 0.2 mm, better than 0.02 mm, better than 0.01 mm or better than 5 μm. This provides sufficient accuracy in determination of the robot position to allow the end effector to be positioned with sub-millimetre accuracy within the environment, whilst allowing the position detection to occur on a time scale that permits real time motion control.

Similarly, the control system typically operates with a frequency that is at least 10 Hz, at least 20 Hz, at least 30 Hz, at least 100 Hz, at least 300 Hz, at least 1 kHz, at least 2 kHz or at least 10 kHz, allowing the control system to respond sufficiently rapidly to changes in the robot base position. Typically, the control system and tracking system operate at the same frequency and more typically the control and tracking system are operated synchronously to reduce the latency in responding to changes in the robot base position.

In one example, communications between the control system and tracking system occur via a communications network, and in particular the fieldbus network, with a latency that is at least one of less than 100 ms, less than 10 ms, less than 5 ms, less than 2 ms or less than 1 ms. The use of the fieldbus network reduces the need for additional wiring and can reduce overall signal latency, whilst minimising the network latency can assist in ensuring the control system is able to act rapidly to changes in robot base position.

In one example, this preferably leads to a system in which a latency between measuring the robot position and/or orientation and controlling the robot arm, and hence end effector, in response to the measurements, is at least one of less than 10 ms, less than 20 ms, less than 15 ms, less than 10 ms, less than 5 ms or less than 1 ms. This allows a sufficiently rapid response to be achieved to counteract most movements of the robot base and environment.

The tracking system typically measures an orientation of the tracking target and/or tracking head with an accuracy that is at least one of better than 1 degree, better than 0.1 degree, better than 0.01 degree, better than 0.002 degree, better than 0.001 degree or better than 0.0001 degree.

Typically, the tracking system measures the robot position and/or orientation relative to the environment within an accuracy of greater than 0.2 mm over a working envelope having a radius of at least 2 m, at least 5 m, at least 10 m, at least 20 m, at least 40 m or at least 80 m. This enables the robot to operate in outdoor environments in which a large work volume is typically desirable so as to be able to perform interactions with the environment. The robot arm is typically capable of positioning the end effector with an accuracy that is at least one of better than 2 mm, better than 1 mm, better than 0.2 mm, better than 0.02 mm, better than 0.01 mm, or better than 5 $\mu$m, and/or being able to move the end effector at a velocity that is at least one of greater than 0.01 ms$^{-1}$, greater than 0.1 ms$^{-1}$, greater than 0.5 ms$^{-1}$, greater than 1 ms$^{-1}$, greater than 2 ms$^{-1}$, greater than 5 ms$^{-1}$, or greater than 10 ms$^{-1}$ and with an acceleration that is at least one of greater than 1 ms$^{-2}$, greater than 10 ms$^{-2}$ or greater than 20 ms$^{-2}$. This allows the end effector to be position sufficiently rapidly and accurately to counteract relative movement of the robot base and environment.

When the system includes a movable robot base, the robot base actuator is capable of positioning the robot base with an accuracy that is at least one of up to 1000 mm, better than 500 mm, better than 200 mm, better than 100 mm, better than 10 mm, or better than 1 mm, whilst being able to move the robot base at a velocity that is at least one of greater than 0.001 ms$^{-1}$, greater than 0.01 ms$^{-1}$, greater than 0.1 ms$^{-1}$ or greater than 1 ms$^{-1}$, and with an acceleration that is at least one of greater than 0.1 ms$^{-2}$, greater than 1 ms$^{-2}$ or greater than 10 ms$^{-2}$.

In another example, the system includes an active damping system that actively damps movement of the robot base relative to the environment, with a latency between measuring the position and/or orientation of the robot base and activating the active damping system is being at least one of less than 100 ms, less than 20 ms, less than 15 ms, less than 10 ms, less than 5 ms or less than 1 ms. This allows damping to be implemented on a time scale that can reduce the impact of major movements of the robot base, and thereby assist in ensuring movement of the end effector can correct for relative movement between the robot base and environment.

In this regard, as previously described, movement of the end effector is typically controlled to take into account, and in particular correct for movement of the robot base, thereby enabling the end effector to be accurately controlled within the environment coordinate system ECS, irrespective of relative movement between the environment and the robot base. Thus, such DST dynamically adjusts the end effector in order to account for movement of the robot base, which can be used, for example, to keep the end effector static within or moving along or in accordance with a defined path within the environment, irrespective of movement of the robot base.

In one example, the stabilisation control such as DST can compensate for movement of the robot base and environment that is at least one of at least 1 mm, at least 10 mm, at least 20 mm, at least 50 mm, at least 100 mm, at least 500 mm, at least 1000 mm, or at least 5000 mm. In one preferred example, the tracking system measures the position and/or orientation with a frequency that is at least 100 Hz or 1 kHz, with the position being measured with accuracy of better than 0.2 mm or 0.01 mm, and the orientation with an accuracy of better than 0.01 degrees or 0.001 degrees. The control system operates with a frequency that is at least 100 Hz or 1 kHz, and wherein a latency between measuring the robot position and/or orientation and controlling the robot arm is less than 30 ms or 1 ms.

In a further preferred example, the tracking system measures the position and/or orientation with a frequency that is at least 100 Hz or 1 kHz, with the position being measured with accuracy of better than 0.2 mm or 0.01 mm, and the orientation with an accuracy of better than 0.01 degrees or 0.001 degrees. The control system operates with a frequency that is at least 100 Hz or 1 kHz, and wherein a latency between measuring the robot position and/or orientation and controlling the robot arm is less than 30 ms or 1 ms. The above preferred examples represent ideal system parameters for implementing real time dynamic compensation and motion control with particular application for outdoor robots such as the applicant's brick laying machine.

Dynamic stabilisation technology can be implemented utilising different approaches and three example mechanisms will now be described, with these hereinafter being referred to as dynamic compensation, dynamic coordinate system and dynamic path planning.

Dynamic compensation operates by generating a path correction and applying the path correction when generating control signals that control the robot arm, so that the arm follows a modified path that brings the end effector back on to the original planned path.

Dynamic coordinate systems operate by calculating robot arm kinematics in a moving coordinate system which tracks movement of the robot base, so that the end effector always has a correct position in the environment coordinate system ECS. This generally involves shifting the origin of the robot arm kinematics, to ensure the end effector is correctly positioned.

Dynamic path planning involves recalculating end effector paths as the robot base and environment move relative to each other, so that the new path ensures the end effector always progresses to the end effector destination.

Figure 7:
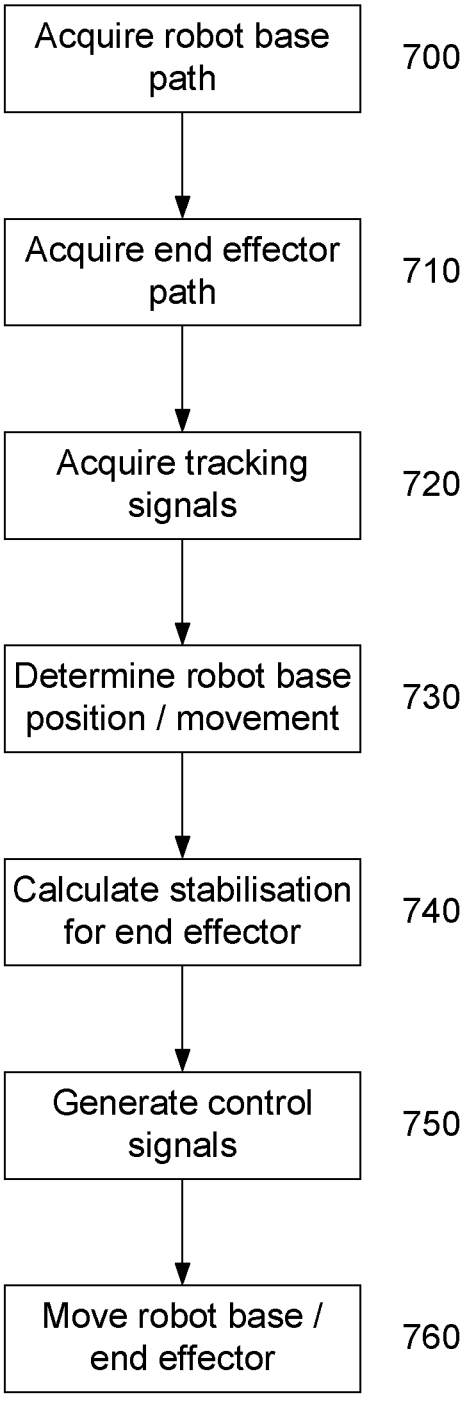
FIG. 7 is a flowchart of an example of a process for controlling end effector movement.

An example of the control process will now be described in more detail with reference to FIG. 7.

In this example, at step 700, the control system 130 acquires a robot base path. The robot base path can be a pre-calculated path that is retrieved, or alternatively can be calculated, for example based on a number of end effector destinations. Similarly, an end effector path is determined at step 710, again by retrieving a pre-determined path, or calculating an end effector path based on an end effector destination.

At step 720, the control system 130 acquires tracking signals from the tracking system, and uses these to determine a robot base position and/or movement at step 730. In this regard, signals from the first tracking system 120 can be used to determine the position of the robot base relative to the environment coordinate system ECS.

At step 740, the control system calculates a stabilisation response for the end effector in order to allow the DST process to be implemented. At step 750 control signals are generated, with these being applied to the robot base actuator and robot arm, to move the robot base and end effector in accordance with the respective paths at step 760, with this typically being performed concurrently with the application of damping.

Accordingly, it will be appreciated that this provides a mechanism for performing dynamic stabilisation.

In one example, the control system includes a computer numerical control (CNC) system. In this regard, the CNC system can be formed as a standalone module, implemented as software, firmware, hardware or a combination thereof. In this instance, additional functionality can be calculated by other modules. For example, the system may implement a DST module, which interfaces with the CNC module, to allow the system to be controlled. For example, the DST module can calculate a correction or robot arm kinematic origin shift, providing this to the CNC module to allow the robot arm to be controlled.

Throughout the above examples, and particularly when implementing DST, the steps are repeated to constantly update or correct for movement of the robot base. This is typically repeated for processing cycles of the control system, and in particular consecutive processing cycles of the control system. Thus, a new correction, robot arm kinematic origin shift or new path can be calculated for each clock cycle of the control system. In a further example, this is also performed based on a refresh rate of the tracking system, so that a new correction, etc, is calculated each time the tracking system updates the robot base position. It will be appreciated from this, in one preferred example, the processing cycle of the control system and refresh rate of the tracking system have the same frequency, and even more preferably are time synchronised.

The control signals are typically generated taking into account an end effector velocity profile, robot dynamics and/or robot kinematics. This is performed to ensure that the robot arm is able to perform the necessary motion. For example, a calculated end effector path could exceed the capabilities of the robot arm, for example requiring a change in movement that is not feasible, or requiring movement at a rate that cannot be practically achieved. In this instance, the path can be recalculated to ensure it can be executed.

In one example, this can be achieved by performing a movement that corresponds to the original planned movement, but which is limited in magnitude to a feasible movement. In this instance, if further movement is required, this can be implemented in successive processing cycles.

An example of an overall control approach in which DST is performed using dynamic compensation in conjunction will now be described with reference to FIGS. 8A to 8C. For the purpose of this example, it is assumed that the system is similar to that described above with respect to FIGS. 1B and 1C, with the robot arm being mounted on a boom.

In this example, a robot base path is retrieved at step 800. It will be appreciated that this can involve calculating a robot base path.

In one example, this is performed so that the path shape and velocity profile, are carefully controlled to minimise changes in robot base velocity, which in turn can be used to avoid discontinuities, such as stepwise or sharp velocity changes. Sudden velocity changes, for example increasing or decreasing the speed of the robot base movement, or changing the direction of movement, can induce vibrations within the robot base actuator, such as the boom arm of a boom assembly. This in turn can lead to greater unintentional movement of the robot base, including more movements and/or movements of larger magnitude, making it more difficult for the damping and/or DST to correct for movement of the robot base and ensure the end effector is provided at a correct position.

In order to minimise the magnitude of velocity changes, including speed and/or direction changes, a number of different approaches can be used. In one example, the robot base path is curved and/or configured to allow the robot base to be moved gradually whilst interactions are performed, so that the robot base does not need to be halted.

Additionally and/or alternatively, path planning can take into account an interaction time, indicative of a time to perform an interaction, which is then used to calculate the robot base path velocity profile and optionally define an interaction window, which can then be used in controlling the robot base dynamically. In this regard, interaction windows typically correspond to a region of the environment surrounding the end effector destination in which the virtual robot base can be provided, whilst still allow interaction to be performed, and so this allows the velocity of the robot base as it traverses the robot base path to be controlled, for example depending on a completion status of the interaction.

The interaction windows are typically determined based on the interaction time and a velocity, so that the time required to perform an interaction, such as to pick up an object or place an object, corresponds to the time taken to traverse the interaction window at the defined robot base path velocity profile. In one particular example, interaction windows are defined based on a set distance surrounding a destination, derived for example based on robot arm kinematics and/or dynamics such as the reach and or velocity of the end effector.

Having defined the interaction windows, these can then be used in order to control movement of the robot base and end effector and in particular to ensure an interaction is completed without requiring a discrete velocity change. For example, the control system can monitor end effector interaction to determine a completion status, and selectively modify the robot base control signals to cause the robot base to move at different velocities, depending on results of the monitoring.

In one particular example, when the robot base path includes an interaction window associated with each end effector destination, as the robot base enters an interaction window the control system can control the robot arm to commence interaction and/or movement of the end effector along an end effector path to the end effector destination. The control system can then monitor interaction by determining if the interaction will be completed by the time the robot base approaches an exit to the interaction window, optionally progressively reducing the robot base velocity to ensure that the interaction is completed by the time the robot base reaches the exit to the interaction window.

Accordingly, the above described arrangement operates to calculate a path that avoids discontinuities and/or sudden or sharp changes in direction or speed, to thereby minimise unintentional movements of the robot base, such as unwanted oscillations or other movements. Additionally and/or alternatively, the above described approach uses interaction windows to control the robot base speed during the process of performing interaction within the environment. In this regard, the interaction window is defined together with a path velocity profile, based on a time taken to perform the interaction, so that the interaction can be performed without deviating from the velocity profile. In operation, completion of the interaction is monitored with movement of the robot base along the robot base path being progressively slowed if the interaction is running behind schedule. This is performed to ensure that the interaction can be performed before the robot base exits the interaction window.

Additionally, in this example, the interaction is assumed to include a number of steps, with the control system monitoring the interaction by monitoring completion of steps. As part of this process, the control system determines an end effector path for a next step and then generates control signals to move the end effector to thereby complete the step. For example, the steps may include moving the end effector to an end effector destination and then returning the end effector to a starting position, home or reference position. Thus, in the case of brick laying, the interaction could involve collecting a brick from a presentation mechanism mounted on the boom and/or robot base, moving the end effector and brick to a destination in the environment to allow the brick to be laid, before returning the end effector to allow a next brick to be collected.

At step 802 tracking system signals are acquired with these being used to determine a current robot base pose at step 804. In particular, this would be calculated based on a tracking target pose, and transformed into a current robot base pose using a geometrical transformation. In one example, the robot base pose is a virtual robot base pose, which is physically offset from the robot base, and aligned with the end effector, which can be beneficial in allowing the robot base to be more easily positioned in order to allow interactions to be performed.

For example, when calculating a robot base path, the control system can simply acquire an end effector destination and then use this destination, together with the tracking target position, to define the robot base path, causing the robot base to traverse the environment to a position which is suitable for the interaction to be performed. In particular this can be used to align the end effector with the end effector destination, thereby reducing the complexity of the end effector path and the need for significant control of the end effector.

Additionally and/or alternatively, this can assist with path planning. For example, path planning and/or tracking of movement of the robot base using a virtual robot base position aligned with the end effector can help avoid collisions of the end effector with the environment or objects or material provided therein.

At step 806 it is determined if an interaction window is reached and if not the process moves on to step 830. Otherwise assuming an interaction window has been reached a next step is selected at step 808, with an end effector path being calculated and/or retrieved at step 810.

At step 812 it is determined if stabilisation is required and if not, for example if the step involves retrieving an object from a delivery mechanism mounted on the robot base, the process proceeds to step 824.

Otherwise, at step 814, a robot base pose deviation is calculated based on a deviation between a current robot base pose and expected robot base pose, as calculated from the robot base path. A scaling factor is then determined at step 816, based on a proximity of the end effector to the end effector destination. At step 818, the robot base deviation is used to calculate a correction in the form of a vector including offsets for each of six degrees of freedom, and representing the offset of the robot base pose from the expected robot base pose. The correction is then scaled based on the scaling factor.

A robot kinematic transform is calculated using the end effector path and the scaled correction at step 820, with this being assessed to ensure dynamics are feasible at step 822. In this regard, the correction may require that the robot arm undergo a movement which exceeds the robot arm's capabilities, for example requiring a movement that is too rapid. If the movement is not feasible, this can be recalculated or modified, for example by limiting the resulting magnitude of the correction based on the robot arm dynamics. In one example, this is achieved by returning to step 818, to recalculate the correction. However, this is not essential and in one example, the control signals could be generated at step 824 based on the robot arm dynamics to simply implement the correction to the maximum degree possible before the next processing cycle of the control system. Thus, if the correction requires end effector movement of 10 mm, but only a 5 mm movement can be achieved prior to the next processing cycle implemented by the controller, then the 5 mm movement would be implemented.

At this point, the control system 130 can determine if the interaction is proceeding on schedule at step 826, and if not the control system 130 modifies the boom speed at step 828, for example to slow down movement of the boom. Whether or not the boom speed is modified, the resulting boom control signals are generated by the control system 130 at step 830.

Control signals are then applied to the respective actuators at step 832, to thereby move the boom and end effector. Tracking system signals are acquired at step 834, with this being used to determine a current base pose, following movement of the end effector and robot base, at step 836.

At step 838, an assessment is made of whether the step is completed and if not the process returns to step 812 to again determine if stabilisation is required. Otherwise it is determined if all steps are complete at step 840, with the process returning to step 808 to select a next step if not. Otherwise the process returns to 806 to determine whether a next interaction window has been reached.

It will be appreciated that by following the above described sequence, this allows the boom to be progressively moved along the boom path with interactions being performed by performing sequences of steps, with each step involving the determination of an end effector path with the end effector being moved along the end effector path to a destination.

Figure 8A:
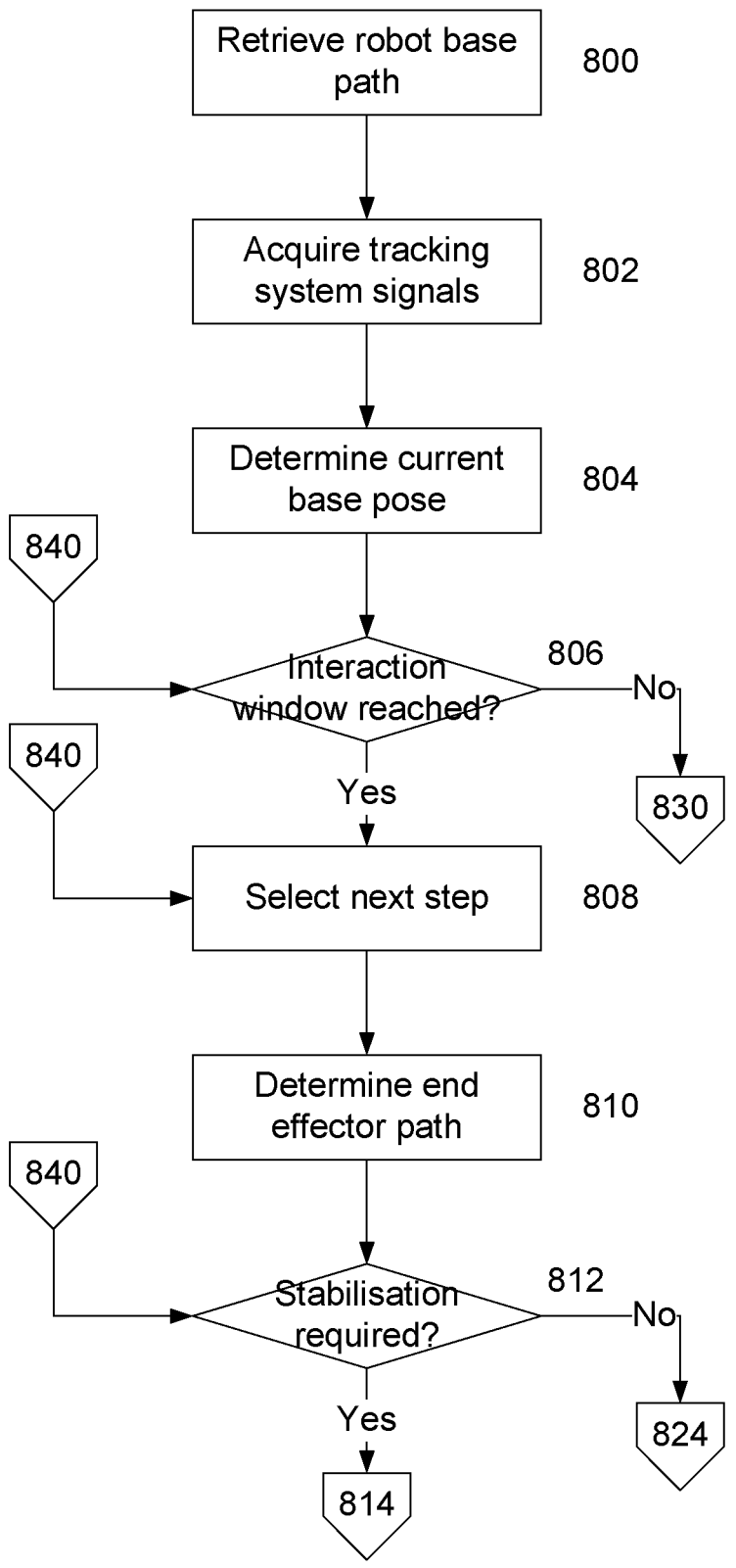
FIGS. 8A to 8C are a flowchart of a specific example of an end effector and robot base control process.
Figure 8B:
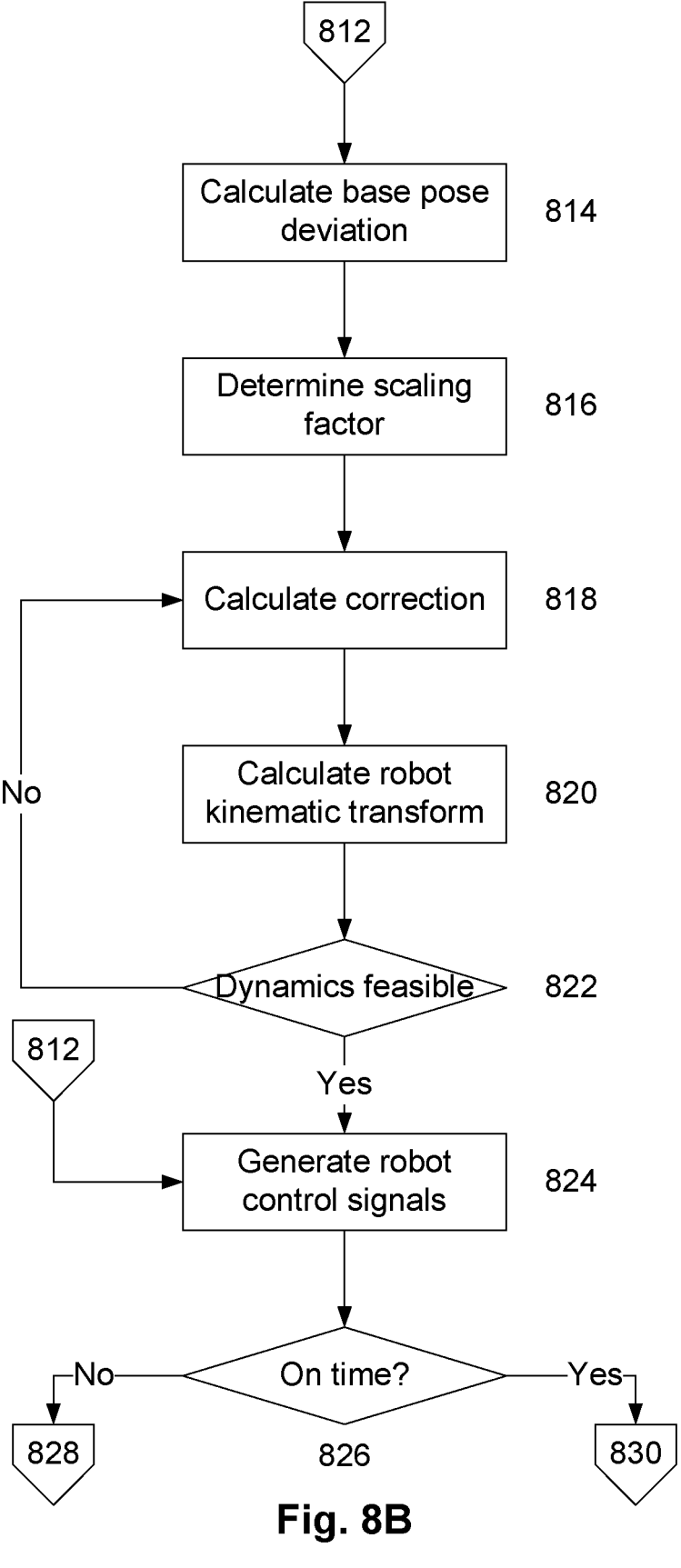
Figure 8C:
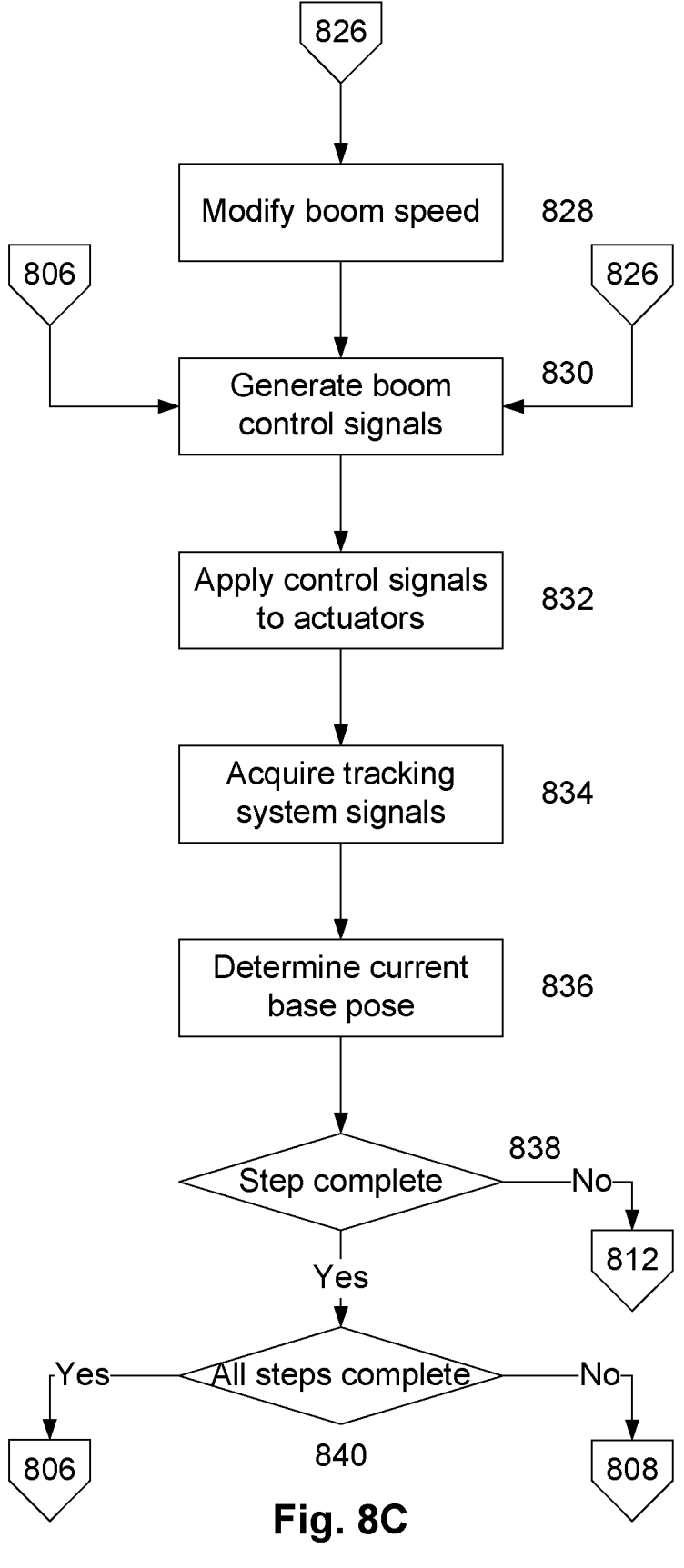

Whilst the example of FIGS. 8A to 8C focus on the use of dynamic compensation, it will be appreciated that similar approaches can be used for both dynamic coordinate system and dynamic path planning approaches to DST in conjunction with active damping.

A further specific example will now be described in more detail.

The embodiment integrates external sensing and control equipment such as a laser scanner 911 with large scale automated equipment adapted to perform operations, such as an automated brick laying machine 912. Such large scale automated equipment requires sensors such as the laser scanner 911 to perform position and orientation measurement of a target, so that the measurements can be fed back to the equipment in order to control the equipment so that the operation (be it transfer of cargo or the laying of a brick) is performed in the required location.

The apparatus to perform the measurement of position and orientation of the target has a first head unit in the form of the laser tracker 911 and a second head unit in the form of an active target sensor 913, incorporating improved roll angle measuring. In use the active target sensor 913 is mounted in close proximity to an end effector 914.

Figure 11:
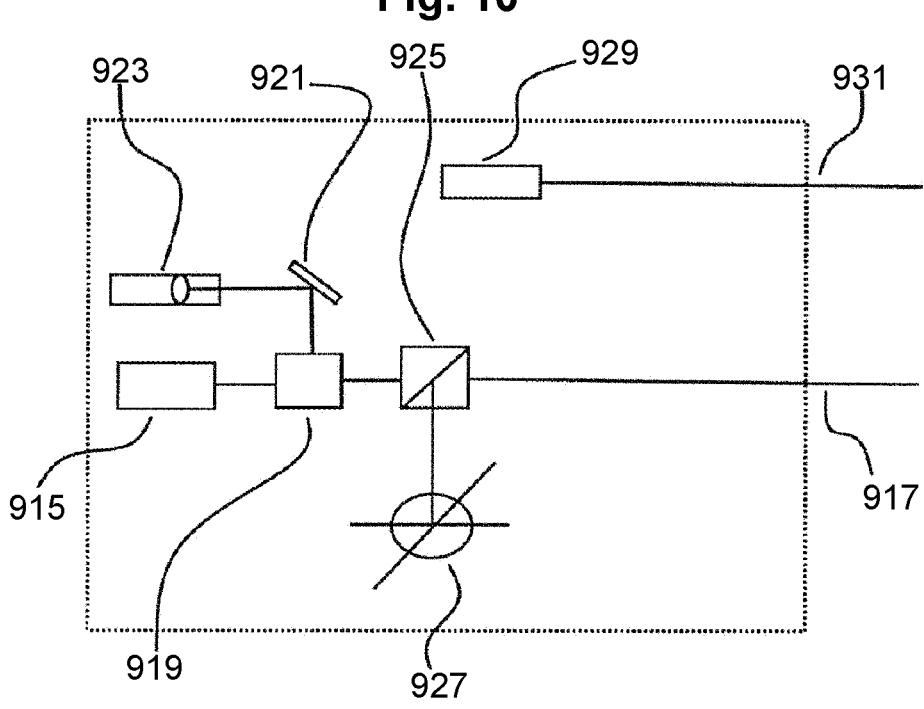
FIG. 11 is a schematic of internal componentry of the first head unit of FIG. 10.

The laser tracker 911 has a primary laser 915 which generates a primary laser beam 917 which is reflected back by the active target sensor 913, forming a bidirectional laser beam. Referring to FIG. 11, the laser tracker 911 includes a single beam interferometer 919 and mirror 921 reflecting part of the primary laser beam 917 to a fringe counter 923, from which range data is acquired. A 50% beam splitter 925 sends part of the primary laser beam 917 to a dual axis lateral effect photodiode or dual axis position displacement sensor 927 to derive data for "steering" the laser tracker primary laser beam 917, in order to accurately aim at the active target sensor 913.

The laser tracker 911 also has a second laser 929 arranged to send a unidirectional second laser beam 931 in parallel with the primary laser beam 917, to a roll position displacement sensor 933 located on the active target sensor 913. The roll position displacement sensor 933 comprises a position displacement sensor 935 located within a housing 937 mounted on a curved surface 939 for rotation so that the position displacement sensor 935 rotates with the primary laser beam 917. The housing 937 mounted on a curved surface 939 rotates about the same axis as the line of travel of the primary laser beam 917, when correctly aligned to be reflected back by the active target sensor 913. The curved surface denotes a surface about which rotation of the housing 937 through 120 degrees occurs, about the making this embodiment suitable for use in applications where roll sensing is limited to plus or minus 60 degrees from the central position of the housing 937. An angle encoder produces a signal to indicate the angle at which the housing 937 is disposed, thus providing roll angle measurement of the active target sensor 913.

The laser tracker 911 is supported on a yoke 941 that rotates on a support 943 about a substantially vertical heading axis 945. The yoke 941 rotatably supports a head 947 that rotates about a horizontal altitude axis 949. The head 947 contains the primary laser 915, the single beam interferometer 919 and mirror 921, the fringe counter 923, the 50% beam splitter 925, and the sensor 927, and supports the second laser 929.

The laser tracker primary beam optics include the primary laser 915, and the single beam interferometer 919 and fringe counter 923, but as an alternative to the single beam interferometer 919 and fringe counter 923, may include a time of flight ADM (automated distance measurer), or a combination of both. The laser tracker primary beam optics also include the 50% beam splitter 925 and the sensor 927, which as discussed above can be selected from a dual axis PDS (position displacement sensor) or a dual axis lateral effect photo diode, but as a further alternative may utilise a CCD or CMOS sensor array with associated circuitry.

Data derived from the sensor is processed and used to control brushless AC servo motors 950 to move the yoke 941 relative to the support 943, and to move the head 947 relative to the yoke 941. Angle encoders associated with the servo motors 950 measure the angle of rotation and this data is used to provide attitude and heading data, additional to the distance data determined from analysis of the fringe counter 923 data. While brushless AC servo motors 950 are most preferred, alternative embodiments may utilise DC servo motors or stepper motors or other suitable drive motors.

Figure 9:
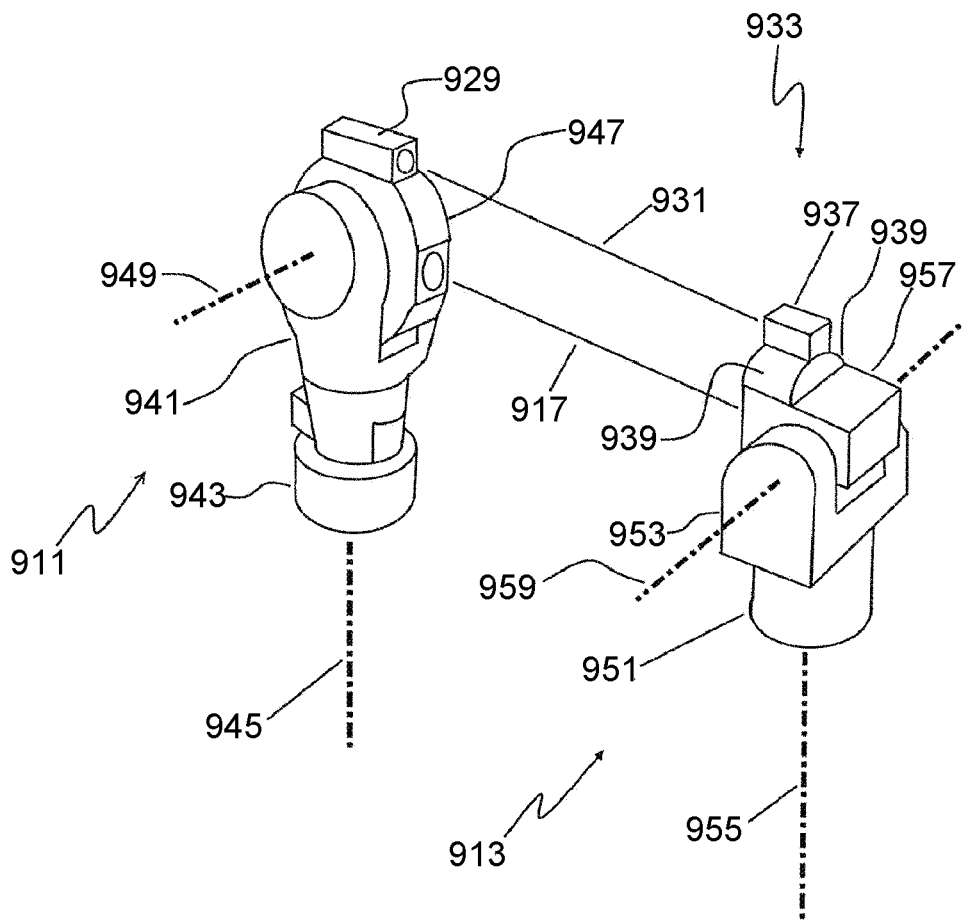
FIG. 9 is a perspective view of a position and orientation tracking system according to the embodiment.
Figure 10:
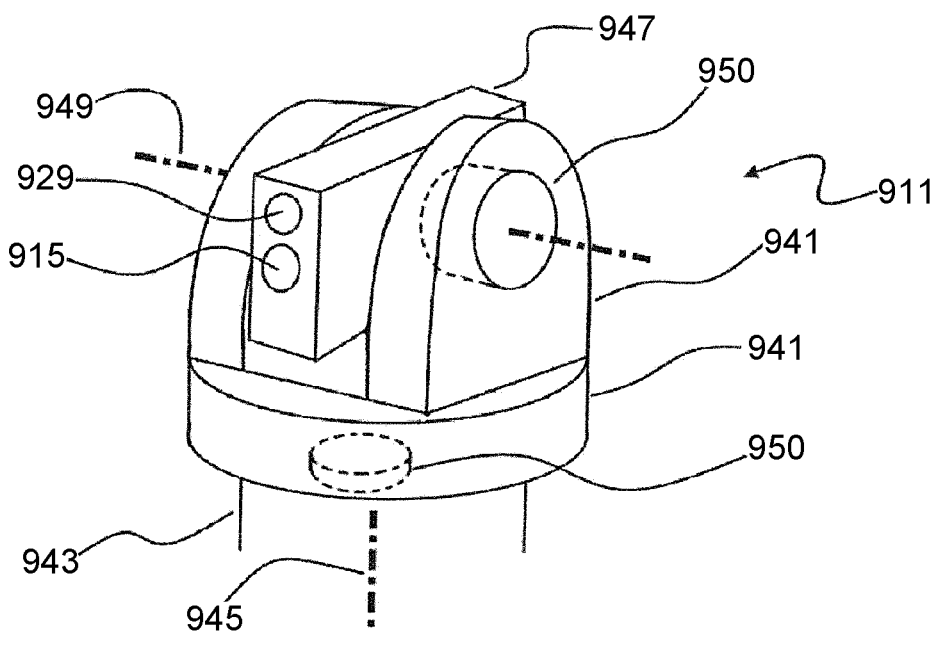
FIG. 10 is a perspective view of a first head unit for a position and orientation tracking system according to a first embodiment.

An alternative embodiment of laser tracker 911 is illustrated in FIG. 10. This differs from the laser tracker shown in FIG. 9 only in the more compact shape and configuration of the yoke 941 and head 947.

In both arrangements of laser tracker 911, the roll laser 929 is provided with calibration means to align its beam 931 to be parallel to the primary laser beam 917, which would be a setting that is adjusted during manufacture, but would not be expected to be adjusted in field.

Referring back to FIG. 9, the active target sensor 913 has a base 951 that is mounted to the target object which is to be tracked (not shown). The base 951 rotatably supports a yoke 953 that rotates about a first axis 955. The yoke 953 has a clevis that supports a head 957 for rotation about a second axis 959, normal to the first axis 955. The head 957 has the curved surface 939 located on the top thereof. The head 957 supports the internal equipment to sense the primary laser beam 917.

Other embodiments for sensing the position and orientation of a target, with improved roll sensing, are described in the applicant's patent applications titled "Laser Tracker with Improved Roll Angle Measurement", filed contemporaneously with this patent application, the contents of which are incorporated by cross reference.

Figure 12:
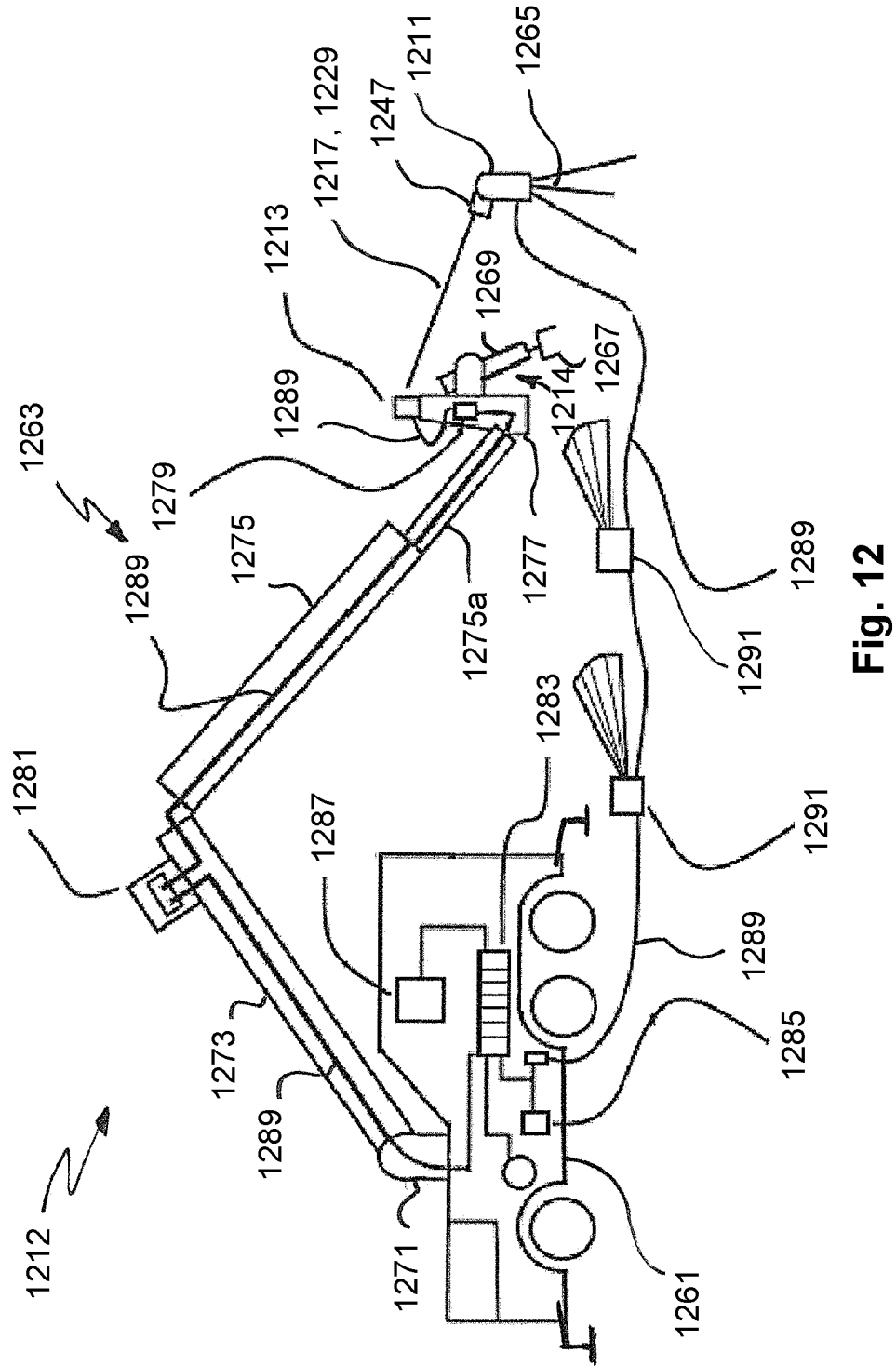
FIG. 12 is a schematic showing a brick laying machine with integrated peripheral equipment for inter alia measuring the position and orientation in real time of a target corresponding to the position and orientation of the end effector of the brick laying machine according to the embodiment.

Thus, referring to FIG. 12, the invention provides a robot system in the form of an automated brick laying machine 1212 having a base in the form of a truck chassis 1261 with an extendable translatable robotic arm 1263 with the end effector 1214. The laser tracker 1211 is located on a tripod 1265 spaced physically away from the automated brick laying machine 1212 outside of the working envelope thereof, in order to be able to maintain line of sight optical connection with the active target sensor 1213. The active target sensor 1213 is located proximal to said end effector, to allow the position and orientation of the active target sensor to be determined. The position and orientation of the end effector 1214 and in particular the position and orientation of the grippers 1267 which are located on a rotatable and extendable arm 1269 can be determined by mathematical transformation through readings from encoders associated with the servo motors that move these parts.

The extendable translatable robotic arm 1263 is mounted for rotation about a vertical axis on a mast 1271 and comprises a telescoping boom 1273 which may be elevated about a horizontal axis by a servo actuator (not shown) and a telescoping stick 1275 connected to the telescoping boom 1273 about a horizontal axis, the poise of the telescoping stick being controlled by a servo actuator (not shown). The extension of the telescoping members of the boom 1273 and the stick 1275 are also controlled by servo actuators (not shown). A head unit 1277 is mounted about a horizontal axis to the interior stick 1275*a*, and its poise is controlled by a servo motor (not shown) in order to maintain the active target 1213 uppermost on the head unit 1277.

The head unit 1277 supports an electrical cabinet 1279 incorporating driver circuitry to drive servo motors to adjust the poise of the head unit 1277, the movement of the end effector 14, the servo motors internal to the active target sensor 1213, and incorporating interface circuitry to connect to sensors including encoders associated with these components to sense rotation and displacement. The boom 1273 supports an electrical cabinet 1281 incorporating driver circuitry to drive servo motors and displacement and rotation measuring encoders associated with the translatable robotic arm 1263.

The base 1261 has a main servo drive cabinet 1283 incorporating driver circuitry to drive servo motors and displacement and rotation measuring encoders associated with the mast 1271 and other equipment located internally in the base 1261. This includes shuttles with grippers for the transport of bricks, cutting and milling equipment and associated handling equipment, and loading equipment. Distributed control and electrical boxes 1285 to allow human interface and over-riding control connect with the main servo drive cabinet 1283. A master computer 1287 controls the operation of all of the componentry, including the laser tracker 1211, and other peripherally connected devices.

Connecting the active target sensor 1213, electrical cabinet 1279, electrical cabinet 1281, main servo drive cabinet 1283, distributed control and electrical boxes 1285, master computer 1287, and laser tracker 1211, is a fieldbus network having fieldbus network cabling 89 extending from and connecting all actuators and sensors in the head and end effector 1214 and connecting actuators and sensors in said active target 1213 via the electrical cabinet 1279. The fieldbus network cabling 1289 extends along the robotic arm and connects actuators and sensors therealong via the electrical cabinet 1281. The fieldbus network cabling 1289 extends to the base 1261 and connecting actuators and sensors therein via the main servo drive cabinet 1283. The fieldbus network cabling 1289 extending externally beyond the base 1261 to connect to actuators and sensor in the laser tracker 1211. The master computer 1287 provides a fieldbus control system communicating via the fieldbus network cabling 1289 to all of the actuators and sensors within the brick laying machine and the external equipment including the laser tracker 1211 and perimeter monitoring scanning equipment 1291. The driver circuitry to drive servo motors and the interface circuitry to interface with sensors utilises fieldbus slave units to interface each actuator and sensor to the fieldbus network cabling 1289. The fieldbus network cabling 1289 uses the Ethercat P protocol so that communication and power are provided in a single cable.

While there is only one active target sensor 1213 illustrated, alternative embodiments can utilise additional active target sensors, and/or additional paired laser trackers and active target sensors, all networked on the fieldbus network cabling. Additional active target sensors allow the laser tracker 1211 to optically connect with alternative active target sensors, in any poise of the end effector 1214, particularly in embodiments where the two active target sensors are fitted to the outsides of the gripper 1267, one on each jaw. Multiple active targets may be daisy chained on the fieldbus network, for example.

Similarly there may be more than one laser tracker 1211, allowing the robot arm 1263 to extend and translate across a larger working envelope which may locate an active target sensor out of range of one laser tracker, but within range of another. Multiple laser trackers may be daisy chained on the fieldbus network.

The components of the tracker system (the laser trackers and active target sensors) are incorporated as fieldbus slaves (preferably Ethercat slaves). The interface circuitry can be included in the laser trackers and active target sensors. The tracker components can be placed anywhere in a fieldbus topology and may or may not be directly connected to each other.

The servo drives in each laser tracker and in each active target used to move the axes are connected to and controlled by, and communicate encoder measurements, directly to the fieldbus network. All sensors communicate directly to the fieldbus network.

The actuator control algorithms are implemented as library code executed by the master computer 1287 which can be a Twincat master PLC running on an industrial PC. Consequently, the laser tracker and active target are tightly integrated into control system for the automated brick laying machine 1212, so that there is minimal latency (no more than one control cycle, typically 1 ms) between sensor measurements and actuator machine axis compensation control.

All calibration and control algorithms are contained in precompiled code which is run on an Ethercat master PC.

In an alternative embodiment, the calibration and control algorithms are implemented on a fieldbus (Ethercat) slave which may be an ASIC, FPGA or PC based processor or electronic unit which is then installed into the Ethercat network, in an enclosed control cabinet. With this arrangement there is no need to run special library code on the fieldbus Ethercat master PC and no need to implement a complicated API and further communication to the machine controller because the 6DOF position data and all tracker system control variables are available directly as fieldbus network variables.

In a further alternative embodiment the calibration and control algorithms are implemented on a fieldbus (Ethercat) slave which may be an ASIC, FPGA or PC based processor or electronic unit which is installed in either the laser tracker unit or installed in the active target sensor. This arrangement has the disadvantage of increasing the weight and size of the unit it is installed on.

The above described arrangements require minimal additional wiring to connect the laser tracker to the control system and minimal additional wiring to connect the active target to the control system, and avoid the need for a dedicated direct cable connection between the laser tracker and the active target, separate from the fieldbus network cabling, apart from power supply cabling if this is not integral with the fieldbus network.

Figure 13:
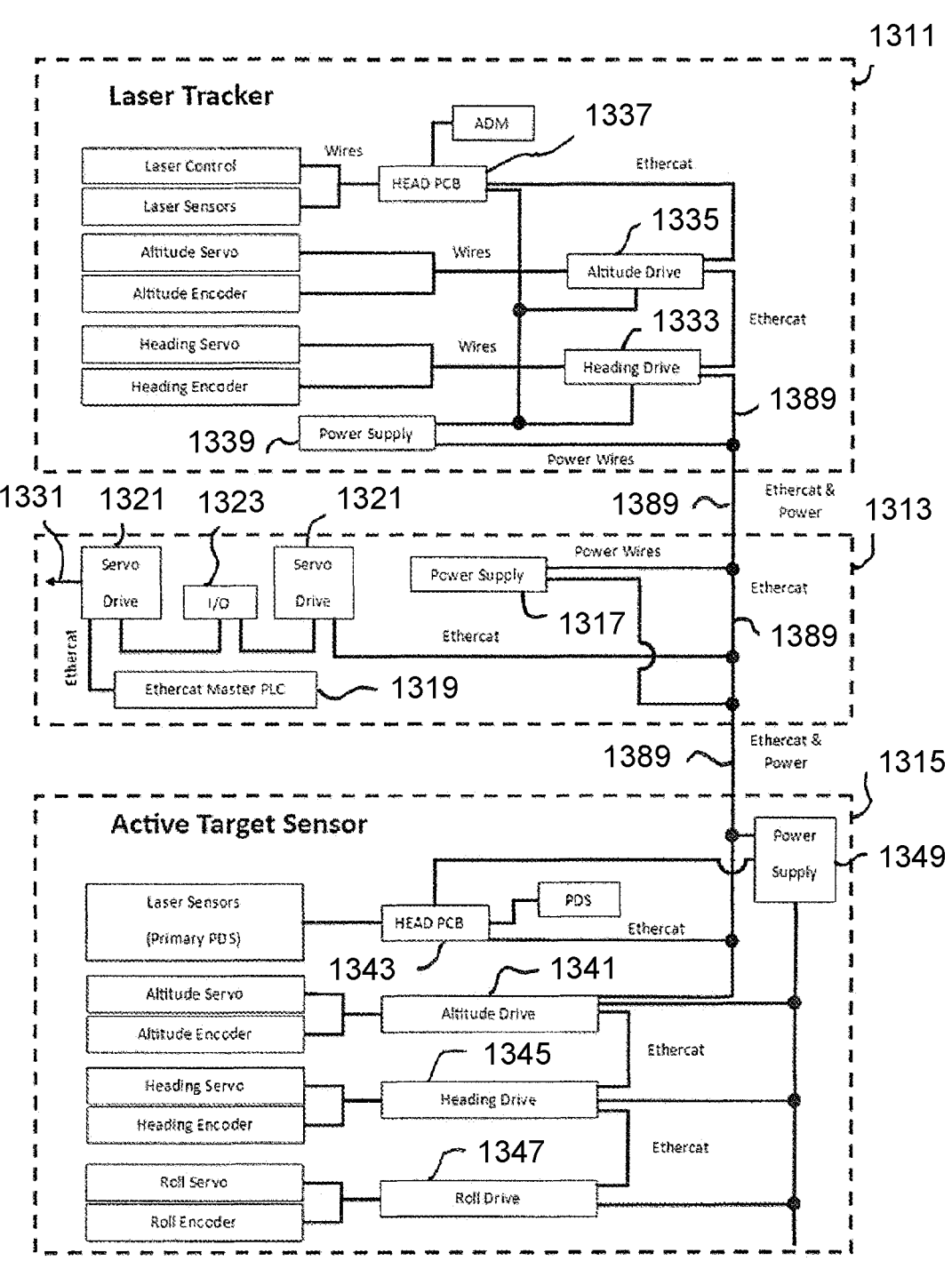
FIG. 13 is a schematic block diagram showing implementation of the position and orientation measurement with the brick laying machine control systems.

In FIG. 13 details of the distributed control architecture using the Ethercat implementation is shown. Other fieldbus systems including any selected from Profibus, Sercos, DeviceNet, Powerlink could be used in an alternative embodiment; however, Ethercat offers high speed, reliability, low latency and compatibility with a wide range of available devices and interface componentry.

There are three main blocks shown in FIG. 13. At the top is the laser tracker 1311, in the middle is the existing machine control system 113, and at the bottom is the active target sensor 1315. The laser tracker 1311 componentry connects via Ethercat fieldbus network cabling 1389 to the existing machine control system 113 and then via Ethercat fieldbus network cabling 1389 to the active target sensor 1315. As can be seen in FIG. 13, the laser tracker 1311 is not directly connected to the active target sensor 1315.

The machine control system 1313 has a power supply 1317 which supplies power, typically 24V, to componentry distributed around the brick laying machine 132. Where an Ethercat P network is used, this allows power to be distributed in the same cable as the Ethercat communications.

The machine control system 1313 block shows the connection of the Ethercat master PLC 119 to various servo drives 1321 and input and output interfaces 1323. A daisy chain connection is shown but other topologies such as star and ring connection may be used. The connection of servo drives to motors or I/O to sensors and actuators (indicated by an arrow 1331 to the left) is not shown.

The laser tracker 1311 block shows an internal architecture where there is no dedicated controller. The Ethercat fieldbus network cabling 1389 connection from the machine control system 1313, connects directly to a heading drive 1333 and then daisy chains to the altitude drive 1335 then to a head PCB 1337 which contains I/O interfaces and custom electronics for the laser control and laser sensors and ADM. Not shown is optional I/O which may be implemented with commercially available fieldbus cards and modules. In this embodiment the control is implemented in the Ethercat master PLC 1319 in the machine control system 1313 block. In an alternative embodiment, the control algorithms could be implemented in a microprocessor (ASIC or FPGA) on the Head PCB 1337 and the control telegrams interfaced to the Ethercat network via fieldbus network cabling 1389. A power supply module 1339 interfaces to the Ethercat P cable and breaks out the 24V DC supply to the drives 1333, 1335 and PCB 1337 which have an Ethercat interface (not Ethercat P).

The active target sensor 1315 block shows an Ethercat connection to the altitude drive 1341 and a star Ethercat connection to a target PCB 1343. The altitude drive 1341 daisy chains an Ethercat connection to the heading drive 1345 and roll drive 1347. A power supply 1349 breaks out 24V DC from the Ethercat P connection to the drives which require a 24V DC supply separate to their Ethercat connection.

In this arrangement, the control for the active target sensor 1315 is implemented in the Ethercat master PLC 1319 in the machine control system 1313. In an alternative embodiment, the control algorithms could be implemented in a microprocessor (ASIC or FPGA) on the target PCB 143 and the control telegrams interfaced to the Ethercat network via fieldbus network cabling 1389.

Figure 14:
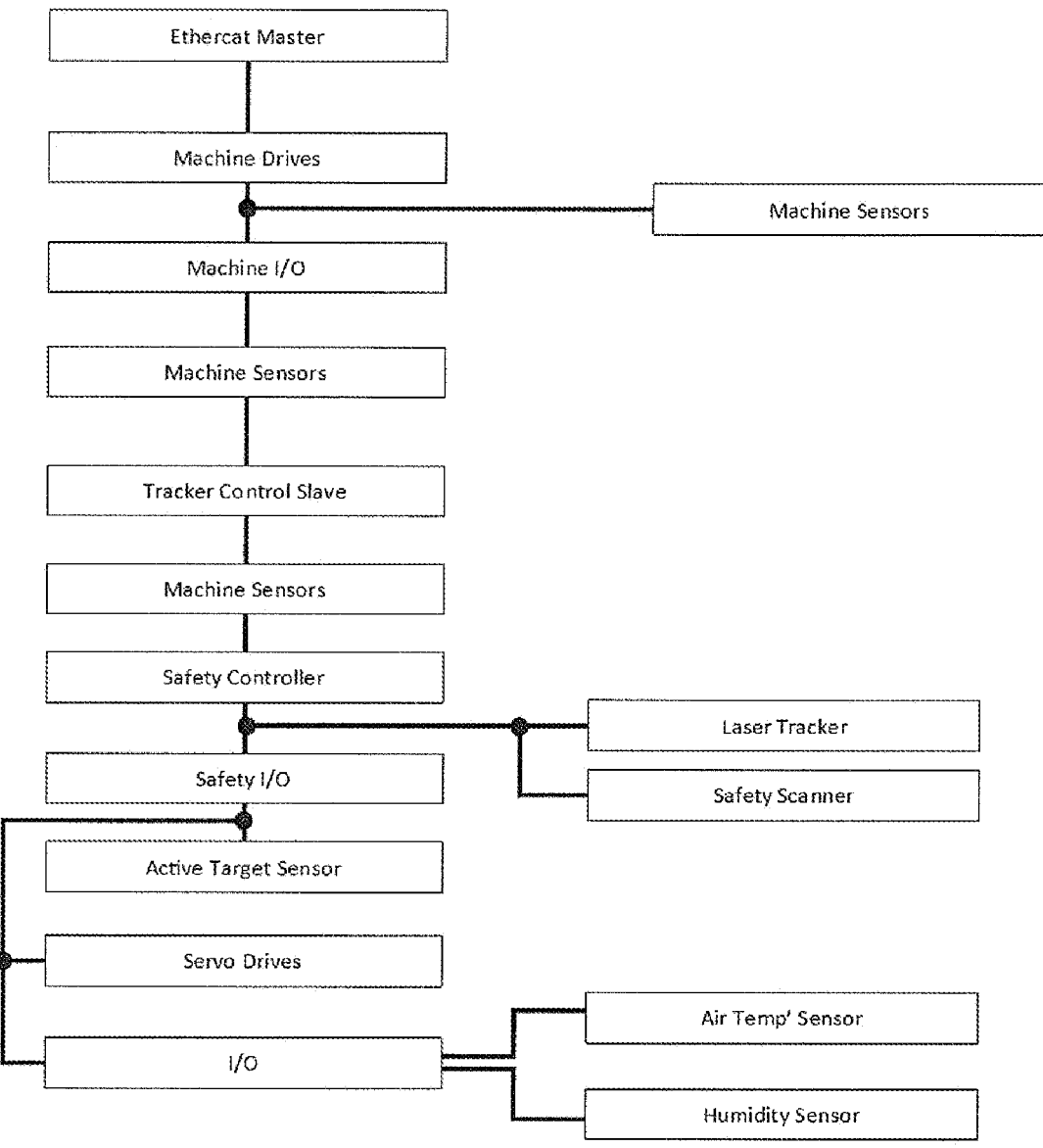
FIG. 14 is a block diagram showing components in the system and their networked connection.

Referring to FIG. 14, a block diagram is shown which shows how an Ethercat network may be connected in a mix of daisy chain and star topologies and in a "random" order. The laser tracker component may be connected at any convenient point. The active target sensor may be connected at any convenient point. Other I/O, not directly connected to either the laser tracker or the active target sensor may supply data to the fieldbus network and may be integrated into the control algorithms for the laser tracker and active target sensor. For example, FIG. 14 shows a separate I/O module which receives data from an air temperature sensor and a humidity sensor so that a more accurate measurement of air density can be made to thereby calculate the speed of light in the ambient air more accurately, thereby providing a more accurate distance measurement.

The above described arrangement can provide one or more advantages for the dynamic measurement and control of industrial and construction robots, particularly those with active motion compensation and stabilisation. In one embodiment, the system also provides accurate real time roll angle measurement of an active target sensor, overcoming the shortfalls of the above described background art.

In one embodiment the system provides a fieldbus link (such as Ethercat) between its components which significantly simplifies integration into a complex and large robot or machine. Use of a fieldbus link advantageously connects multiple separated sensors, actuators and drives on industrial machines and robots. The fieldbus reduces wiring complexity and improves reliability. The diameter of a wiring loom can be constrained by available space in cable ducts, energy chains, through hollow axes or access holes. Weight on fast moving robots and machines is critical and wiring may form a substantial non payload weight on a machine.

Furthermore, whilst the above described arrangement focusses on the use of a fieldbus network over a wired network, such as an Ethernet network, this is not essential, and additionally and/or alternatively some or all of the fieldbus network can be implemented via a wireless network, such as a 5G network. This can have a number of benefits. For example, this can significantly reduce wiring requirements, allowing network cabling to be removed and/or replaced with power cabling only. For example, in the case of the tracking base, this could be battery powered, and connected via a 5G or other wireless network, to the controller, avoiding the need for wiring to extend across the site to the tracking base. Similarly, tracking targets mounted to the robot base could communicate with the controller wirelessly, and be powered via cabling along the boom, or battery powered, thereby substantially reducing wiring requirements in the boom.

A fieldbus also provides the possibility of increasing the amount of sensor data that can be collected and used on a machine. Once a fieldbus is fitted, there is essentially no penalty in terms of harness or cable size to add additional sensors. For this reason it is advantageous to run a fieldbus to the end of a robot arm and/or to the robot end effector.

The fieldbus can be used throughout the applicant's brick laying machine to connect separate groups of sensors and servo drives. The fieldbus extends along the boom to the lay head.

Various field bus topologies such as linear, ring, and star, can be used, in any combination.

The laser tracker API (application programming interface) can be used to interface the laser tracker to a PC or a machine controller. In preferred embodiments, fieldbus variables can be accessed in a PLC (programmable logic controller) and this is simpler than using an API.

Thus, the above described system can provide a robot system having a base with an extendable translatable robotic arm with an end effector, a laser tracker located spaced away from said base to selectably optically connect with an active target located proximal to said end effector, to allow the laser tracker to measure the position and optionally the orientation of the active target, a fieldbus network having fieldbus network cabling extending from and connecting drives, actuators and sensors in said end effector, and connecting drives, actuators and sensors in said active target, said fieldbus network cabling extending along said robotic arm and connecting actuators and sensors therealong, said fieldbus network cabling extending to said base and connecting drives, actuators and sensors therein, and said fieldbus network cabling extending beyond said base to connect to drives, actuators and sensor in said laser tracker, and a fieldbus control system communicating via said fieldbus network cabling to said drives, actuators and sensors. Fieldbus slave units interface each drive, actuator and sensor to the fieldbus network cabling.

In one embodiment said active target is located close to the base of said end effector, or on said end effector.

In one embodiment there is more than one said active target, so that said laser tracker is able to optically connect with a said active target in any poise of said end effector. Multiple active targets may be daisy chained on the fieldbus network.

In one embodiment said robot system includes more than one said laser tracker. This allows the robot arm to extend and translate across a larger working envelope. Multiple laser trackers may be daisy chained on the fieldbus network.

The components of the tracker system (the laser trackers and active targets) are incorporated as fieldbus slaves (preferably Ethercat slaves). The tracker components can be placed anywhere in a fieldbus topology and may or may not be directly connected to each other.

In one embodiment the fieldbus network cabling also supplies power to the components (such as with Ethercat P) so that communication and power are in a single cable.

The laser tracker is connected to and communicates with the field bus network which preferably is an Ethercat network, and the active target is connected to and communicates with the same field bus network. The servo drives in each laser tracker and in each active target used to move the axes are connected to and controlled by, and communicate encoder measurements, directly to the fieldbus network. All sensors communicate directly to the fieldbus network.

In one embodiment the actuator control algorithms are implemented as library code executed by the fieldbus control system (fieldbus network master), which preferably is a Twincat master PLC running on an industrial PC. Consequently, the laser tracker and active target are tightly integrated into the fieldbus control system (Twincat PLC) so that there is minimal latency (no more than one control cycle, typically 1 ms) between sensor measurements and actuator machine axis compensation control.

In one embodiment in a first preferred embodiment, calibration and control algorithms are incorporated in precompiled code which is run on the Ethercat master PC.

In an alternative embodiment, calibration and control algorithms are implemented on a fieldbus (Ethercat) slave which may be an ASIC, FPGA or PC based processor or electronic unit which is then installed into the Ethercat network, preferably in an enclosed control cabinet. In this embodiment there is no need to run special library code on the fieldbus master (Ethercat master) and no need to implement a complicated API and further communication to the machine controller because the 6DOF position data and all Tracker system control variables are available directly as fieldbus network (Ethercat) variables.

In alternative embodiment the calibration and control algorithms are implemented on a fieldbus (Ethercat) slave which may be an ASIC, FPGA or PC based processor or electronic unit which is installed in either the laser tracker unit or installed in the active target sensor. This third embodiment has the disadvantage of increasing the weight and size of the unit it is installed on.

The above described arrangement requires minimal additional wiring to connect the laser tracker to the control system and minimal additional wiring to connect the active target to the control system, and avoids the need for a dedicated direct cable connection between the laser tracker and the active target, separate from the fieldbus network cabling, apart from power supply cabling if this is not integral with the fieldbus network.

Preferably control of the laser tracker and the active target is by the Ethercat master PC which also controls the rest of the machine. In this arrangement, the laser tracker does not have its own control PC, and the active target does not have its own control PC. Thus, there is no separate electronics box or battery to control, operate and power the laser tracker and/or active target.

In one embodiment the system provides a fieldbus link (Ethercat) between a laser tracker and active target or multiple laser trackers and multiple active target components which significantly simplifies integration into complex and/or large robots or machines.

In one embodiment, the laser tracker has a primary laser beam and heading angle and altitude angle tracking and measuring provisions and is additionally provided with a second laser beam to provide a roll angle reference. The active target uses means to track the primary laser beam and measure heading angle and altitude angle. In a preferred embodiment, the active target is further provided with a laser position displacement sensor (PDS) mounted to rotate about a controlled roll axis coincident with the primary laser tracker beam so that the roll axis rotates to zero the PDS, thereby providing a roll angle.

In one embodiment, the active target is further provided with a laser position displacement sensor (PDS) which measures the displacement of the roll beam relative to a datum position, thereby providing a roll angle. This arrangement has the advantage of not requiring the active roll axis but it does require a larger PDS and if the PDS does not extend through 360 degrees it limits the roll angle that can be measured. If a large PDS is used, it reduces the roll angle accuracy.

A PDS (precision displacement sensor) is an analogue device which provides a real time signal proportional to the location of the centre of the incident laser beam. Commercially available PDS have good repeatability and analog resolution with low noise and accuracy of better than 0.1% of the size of the sensor. By using a small sensor, the position accuracy is high. The PDS signal in the preferred embodiment is used as feedback to control the roll axis to keep the roll laser beam centred on the PDS. The PDS measurements can be read by the control system via an ADC (analog to digital converter) which can operate at the cyclic control rate of the controller, thereby effectively eliminating latency.

The laser tracker is connected to and communicates with a field bus network (preferably Ethercat) and the active target is connected to and communicates with the same field bus network. In one embodiment the servo drives used to move the axes are connected to and controlled by, and communicate encoder measurements, directly to the fieldbus (Ethercat) network. In one embodiment all sensors communicate directly to the fieldbus (Ethercat) network. In one embodiment the control algorithms are implemented as library code executed by the fieldbus network master (preferably a Twincat master PLC). By this means the laser tracker and active target are tightly integrated into the machine control system (Twincat PLC) so that there is minimal latency between the measurements and the machine axis compensation control.

To control active dynamic compensation of robot end effector position and orientation on the end of a boom requires fast data with low or preferably no latency (delay). The position and orientation data is made available onto the robot control data network such as an Ethercat network. The measurements may be provided at 1 kHz or greater, preferably about 10 kHz, with orientation accuracy of 0.001 degree or less, preferably about 0.0001 degree, and an absolute position accuracy of approximately 5 microns plus or minus 5 parts per million or approximately 0.2 mm or less, preferably about 0.02 mm throughout a working envelope having a radius of at least 40 m and preferably about 80 m.

In one embodiment the orientation sensor acts continuously. In one embodiment the system provides measurement data with low noise so that the motion compensation system is not subjected to vibratory noise. In one embodiment the measurements have a low latency so that the motion compensation does not have much lag and provides prompt position correction.

The above described arrangements, are useful in many applications requiring fine position and motion control over a large working volume. Some example applications are given below:

Ship Transfer

Ship to ship, or ship to oil rig, or ship to gas rig, or ship to wind turbine, transfer of goods, liquids or personnel, is a potential application for the control system of the invention. It is known to stabilise a vessel for position holding. It is also known to roll stabilise a vessel with gyros or thrusters. It is known to yaw stabilise a vessel with thrusters. It is also known to provide heave, pitch, roll and yaw compensation to working devices such as booms.

However, it is known that for long booms in heavy sea states the existing methods of compensation have limitations. A coarse boom positioning and fine end effector positioning, or even additional stages of fine positioning would enable safer transfer, hook up, disconnection and operations in larger sea states and rougher weather.

This could have great benefit for petrochemical, renewable energy and military operators (and others) that require or desire to transfer things from vessel to vessel or vessel to fixed objects in all weather conditions.

Long Building

Long structures such as road freeway sound walls can be built by the brick laying machine. With traditional arrangements it is necessary to build from one location, then reposition periodically and build from the next stationary location. It would be advantageous to be able to build from a creeping machine. This would reduce lost time to reposition and would enable a smaller more compact machine with a shorter boom. A track mounted machine with a short boom would be ideal. Multiple fixed ground references are provided to facilitate this.

Long Trenching

Long trenches for infrastructure such as underground pipe lines and underground cables can be dug with known continuous trenching machines (such as made by Ditch Witch® or Vermeer®) or for larger cross section trenches with excavators (such as made by Caterpillar®, Volvo®, John Deere®, Komatsu® and others). For many applications the precise grade and location of the trench and pipe is important, such as for sewerage pipe. For many applications knowing the precise position is important, such as in cities to avoid damaging existing infrastructure such as pipes, cables, foundations and underground train and road tunnels. Current systems allow some control of the digging and provide feedback to the operator of dig depth or bucket position. In current system the base of the machine (the tracks) must be stationary.

The dynamic control system described allows precision digging to a tolerance that cannot be currently achieved by other methods. Further-more it allows pre-programmed digging for completely autonomous operation. Further-more it allows precision digging from a continuously moving machine such as a tracked excavator creeping along the path of the proposed trench.

Ground Contouring

It is known to use graders, bulldozers, loaders, gradall or automated screeding machines to smooth earth or concrete surfaces with blades or buckets. The inherent design of the machine will achieve a flatter surface than it moves over because the geometry of the machine provides a smoothing action. It is known that a more accurate and faster result can be achieved with automatic control to maintain the bucket or blade on a predefined level, grade or contour. The blade or bucket is moved up or down or tilted about a roll axis automatically to maintain a laser plane level or grade or to match a contour referenced by GPS or total station measurements. These known control systems have a low bandwidth and the machine achieves an accurate result because the inherent design of the machine will achieve a flatter surface than it drives over, even without machine guidance.

The present invention allows more complex machine arrangements such as a (modified) excavator, to be fitted with a multi axis controlled blade or bucket to achieve very complex earthmoving tasks in a completely programmable way.

Mining

It is known to use autonomous trucks for mining.

Excavators and face shovels are currently operated by machine operators. This technology enables autonomous control of excavators and face shovels by pre-programming the base movement (track base) and the dig program in mine coordinates.

Dredging

Excavators mounted on barges are used for dredging. Dredged channel depth, width, profile and location is extremely important for shipping safety. Dredging is expensive so it is advantageous to minimise the amount of spoil moved. The more accurate the dredging, the less spoil needs to be removed.

The barges are floating so as the excavator moves, the barge pitches and rolls and moves. Measuring the barge position and orientation in 6dof in real time enables the bucket position to be precisely calculated (via known sensors that measure the pose of the excavator), or even controlled to a set of pre-programmed dig locations.

Elevated Work Platforms

It is known to use various kinds of elevated work platforms (EWP) such as boom lifts or scissor lifts or vertical telescoping lifts made by manufacturers such as JLG®, Snorkel® and Genie®. It is known that very tall boom lifts sway with a large amplitude and make work difficult, dangerous or impossible. The sway is the limiting factor for the height that boom lifts can work at. It is known that driving the boom lift or EWP with the platform up excites sway and makes the platform uncomfortable or dangerous. The present invention provides means to make a stabilised platform so that the platform is stabilised relative to the ground, or to a desired trajectory when the platform or EWP is moved.

It is known to support a robot on a platform suspended by cables in tension supported by an overhead gantry or towers (see PAR Systems, LLC TensileTruss™ and Chernobyl Crane™ and demolition robot). The cables can support high loads but the structure has low stiffness. The lateral stiffness is very low. The accuracy of the positioning of the robot and end effector would be greatly improved by adding a tracking component to the suspended platform to provide a 6DOF position of the base of the robot arm. This would enable such a system to do accurate work, rather than the relatively inaccurate demolition work it is presently employed to do.

Very Accurate Applications

Such a system may include a galvo mirror to be used with a high power laser for laser cutting, laser engraving or 3D additive laser melting manufacture.

It will be appreciated that a wide range of other uses are also envisaged. For example, the system can be used to perform construction of multi-story and/or high-rise buildings. In this regard, the robot base can be supported by or remotely to the building during construction, with the system being used to compensate for movement of the robot base relative to the building, which might arise from wind loading of the building and/or the support system used to support the robot base.

The system could also be used with a wide range of additional vehicles to those mentioned above, such as space vehicles. In this example, the robot base could be mounted on the space vehicle, allowing this to be used to perform an interaction with another vehicle, for example to facilitate docking, satellite retrieval, or the like, or other objects, such as interaction with an asteroid or similar.

The arrangements described above can achieve a high degree of dynamic motion quality and position tolerance over a large size of workspace. This results in smoother motion for end effectors located at the end of long booms or towers or supported on long cable trusses. The arrangements of the invention can smooth motion for an end effector supported by a long boom or tower supported by a moving vehicle.

Further details of the applicants technology are described in patent publications and applications U.S. Pat. No. 8,166, 727, PCT/AU2008/001274, PCT/AU2008/001275, PCT/AU2017/050731, PCT/AU2017/050730, PCT/AU2017/050728, PCT/AU2017/050739, PCT/AU2017/050738, PCT/AU2018/050698, AU2017902625, AU2017903310, AU2017903312, AU2017904002, AU2017904110, PCT/AU2018/050698, AU2018902566, AU2018902557, PCT/AU2018/050733, PCT/AU2018/050734, PCT/AU2018/050740, PCT/AU2018/050737 and PCT/AU2018/050739, the contents of which are incorporated herein by cross reference.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the term "approximately" means ±20%.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A construction machine for performing interactions within a physical environment, the construction machine including:
  a) a vehicle;
  b) a boom mounted to the vehicle;
  c) a robot, including:
    i) a robot base mounted to the boom; and,
    ii) a robot arm mounted to the robot base, the robot arm including an end effector mounted thereon for performing interactions within the environment, wherein the robot base undergoes movement relative to the environment while the robot arm is in use,
  d) a communications system including a fieldbus network;

e) a tracking system including:
    i) a tracking base positioned in the environment and connected to the fieldbus network via a tracking system controller; and,
    ii) a tracking target mounted to the robot base, wherein the tracking base is configured to detect the tracking target and data derived from signals from one or more tracking base sensors are processed by the tracking system controller to determine a position and/or orientation of the tracking target relative to the tracking base; and,
  f) a control system that:
    i) communicates with the tracking system controller via the fieldbus network to determine a robot base pose derived from the position and/or orientation of the tracking target relative to the tracking base while the robot base undergoes movements;
    ii) determines an expected robot base pose;
    iii) calculates a deviation between a current robot base pose and the expected robot base pose; and
    iv) actuates the robot arm to undergo movement via the fieldbus network at least partially in accordance with the deviation to thereby stabilize the position of the end effector whilst said interactions are performed.

2. The construction machine according to claim 1, wherein the control system controls the boom via the fieldbus network in accordance with the position and/or orientation of the tracking target relative to the tracking base.

3. The construction machine according to claim 1, wherein the communications system includes:
  a) a fieldbus master; and,
  b) one or more fieldbus slaves connected to the fieldbus master,
  wherein the control system is connected to the fieldbus network as the fieldbus master and wherein the tracking system is connected to the fieldbus network as at least one of the one or more fieldbus slaves, and wherein operation of the tracking system and the control system are time synchronised via the fieldbus network.

4. The construction machine according to claim 3, wherein the control system is a machine control system configured as a fieldbus network master and wherein control algorithms for the tracking base and the tracking target are implemented as library code executed by the fieldbus network master.

5. The construction machine according to claim 3, wherein control algorithms for the tracking base and the tracking target are implemented on a fieldbus slave comprising an electronic processing device connected to the fieldbus network in a control cabinet.

6. The construction machine according to claim 3, wherein control algorithms for the tracking base and the tracking target are implemented on a fieldbus slave comprising an electronic processing device connected to the fieldbus network and installed in either the tracking base or the tracking target.

7. The construction machine according to claim 1, wherein the tracking system is a laser tracking system.

8. The construction machine according to claim 7, wherein:
  a) the tracking base includes:
    i) a tracking head having:
      (1) a radiation source arranged to send a radiation beam to the tracking target; and,
      (2) a base sensor that senses reflected radiation; and, ii) head angle sensors that sense an orientation of the tracking head; and, b) the tracking target includes a reflector that reflects the radiation beam to the tracking base.

9. The construction machine according to claim 8, wherein the tracking system controller:

a) receives sensor data from the tracking base indicative of measurements from the base sensor and the head angle sensors via the fieldbus network; and, b) determines the position and/or orientation of the track- ing target relative to the tracking base using the sensor data.

10. The construction machine according to claim 9, wherein for every clock cycle of the control system, the control system:

a) receives the position and/or orientation of the tracking target relative to the tracking base from the tracking system controller;

b) determines the robot base pose;

c) determines the expected robot base pose;

d) calculates the deviation; and e) sends control signals to the robot arm based at least in part on the deviation.

11. The construction machine according to claim 8, wherein the tracking base includes at least one tracking head actuator that controls a tracking head orientation and wherein the tracking system controller controls the at least one tracking head actuator in response to movement of the tracking target so that the tracking head tracks the tracking target.

12. The construction machine according to claim 11, wherein the tracking target includes at least one tracking target actuator that controls a tracking target orientation and wherein the tracking system controller controls the at least one tracking target actuator in response to movement of the tracking target so that the tracking target tracks a head of the tracking base.

13. The construction machine according to claim 1, wherein the tracking base is connected to the tracking target via the fieldbus network.

14. The construction machine according to claim 13, wherein the tracking base and the tracking target are con- figured as fieldbus network slaves.

15. The construction machine according to claim 14, wherein servo drives used to move the axes of the tracking base and the tracking target are connected to, controlled by and communicate encoder measurements directly to the fieldbus network.

16. The construction machine according to claim 1, wherein the fieldbus network includes fieldbus network cabling extending from the vehicle to the robot arm via the boom and connecting drives, actuators and sensors therea- long.

17. The construction machine according to claim 16, wherein the fieldbus network cabling also supplies power so that communication and power are in a single cable.

18. The construction machine according to claim 1, wherein the robot arm is a parallel kinematic robot.

19. The construction machine according to claim 18, wherein the end effector is a nozzle and said interactions being performed include placing material via the nozzle.

* * * * *